United States Patent
Yamada et al.

(10) Patent No.: US 7,903,947 B2
(45) Date of Patent: Mar. 8, 2011

(54) RECORDING APPARATUS AND METHOD, PLAYBACK APPARATUS AND METHOD, RECORDING MEDIUM, AND COMPUTER-READABLE MEDIUM FOR RECORDING AND PLAYING BACK MOVING IMAGES

(75) Inventors: Makoto Yamada, Tokyo (JP); Hideo Obata, Kanagawa (JP); Eiji Tadokoro, Chiba (JP); Manabu Ukai, Tokyo (JP); Takayuki Sato, Kanagawa (JP); Seigo Fukushima, Kanagawa (JP); Kenichi Okamura, Tokyo (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 10/578,347

(22) PCT Filed: Jun. 15, 2005

(86) PCT No.: PCT/JP2005/010939
§ 371 (c)(1),
(2), (4) Date: May 5, 2006

(87) PCT Pub. No.: WO2006/027880
PCT Pub. Date: Mar. 16, 2006

(65) Prior Publication Data
US 2008/0292267 A1    Nov. 27, 2008

(30) Foreign Application Priority Data
Sep. 6, 2004 (JP) .................... P2004-258638

(51) Int. Cl.
*H04N 5/92* (2006.01)
*H04N 5/76* (2006.01)
*H04N 5/84* (2006.01)
*H04N 5/89* (2006.01)

(52) U.S. Cl. .................. 386/326; 386/332; 386/341

(58) Field of Classification Search .................... 386/52, 386/56, 70, 82, 83, 105, 125
See application file for complete search history.

(56) References Cited

U.S. PATENT DOCUMENTS

| | | | | |
|---|---|---|---|---|
| 5,532,833 | A * | 7/1996 | Hong et al. | 386/77 |
| 6,298,173 | B1 * | 10/2001 | Lopresti | 382/305 |
| 6,307,550 | B1 * | 10/2001 | Chen et al. | 345/418 |
| 6,360,057 | B1 * | 3/2002 | Tsumagari et al. | 386/95 |

(Continued)

FOREIGN PATENT DOCUMENTS

EP    1441356    7/2004

(Continued)

OTHER PUBLICATIONS

Supplementary European Search Report, European Patent Office, May 29, 2009.

(Continued)

*Primary Examiner* — Peter-Anthony Pappas
*Assistant Examiner* — Gelek Topgyal
(74) *Attorney, Agent, or Firm* — Finnegan, Henderson, Farabow, Garrett & Dunner, L.L.P.

(57) ABSTRACT

The present invention relates to a recording apparatus and a method, a playback apparatus and a method, a recording medium, and a program capable of quickly playing back a picture associated with a unit in which a moving image is encoded. An extraction section 51 extracts one picture from each GOP. A number-of-pixels conversion section 40 reduces the amount of information of the extracted picture by thinning out pixels. A static-image compression section 41 encodes the picture whose amount of information has been reduced by a JPEG technique. A microcomputer 31 associates the encoded picture with the GOP from which the picture has been extracted and controls recording of the picture associated with the GOP onto a disk 45 on which the moving image is to be recorded. The present invention can be applied to a recording apparatus for recording a moving image onto a data recording medium.

15 Claims, 53 Drawing Sheets

U.S. PATENT DOCUMENTS

| | | | |
|---|---|---|---|
| 6,553,180 B1 * | 4/2003 | Kikuchi et al. | 386/95 |
| 7,110,025 B1 * | 9/2006 | Loui et al. | 348/220.1 |
| 7,647,459 B2 * | 1/2010 | Zhang et al. | 711/161 |
| 2001/0005434 A1 | 6/2001 | Noguchi et al. | |
| 2002/0126994 A1 * | 9/2002 | Gunji et al. | 386/83 |
| 2002/0145959 A1 * | 10/2002 | Tsukihashi | 369/47.29 |
| 2003/0228133 A1 * | 12/2003 | Nakajima | 386/52 |
| 2005/0002655 A1 | 1/2005 | Noguchi et al. | |
| 2009/0022479 A1 | 1/2009 | Kaku | |

FOREIGN PATENT DOCUMENTS

| | | |
|---|---|---|
| JP | 2000175158 | 6/2000 |
| JP | 2001-160947 | 6/2001 |
| JP | 2001-189915 | 7/2001 |
| JP | 2002-158965 | 5/2002 |
| JP | 2003-168283 | 6/2003 |
| JP | 2003-264773 | 9/2003 |
| WO | WO 9740623 | 10/1997 |
| WO | WO 2005046230 | 5/2005 |

OTHER PUBLICATIONS

English Translation of the Office Action from Chinese Patent Office for corresponding Chinese Application No. 200580001277.5, Jul. 25, 2008.

* cited by examiner

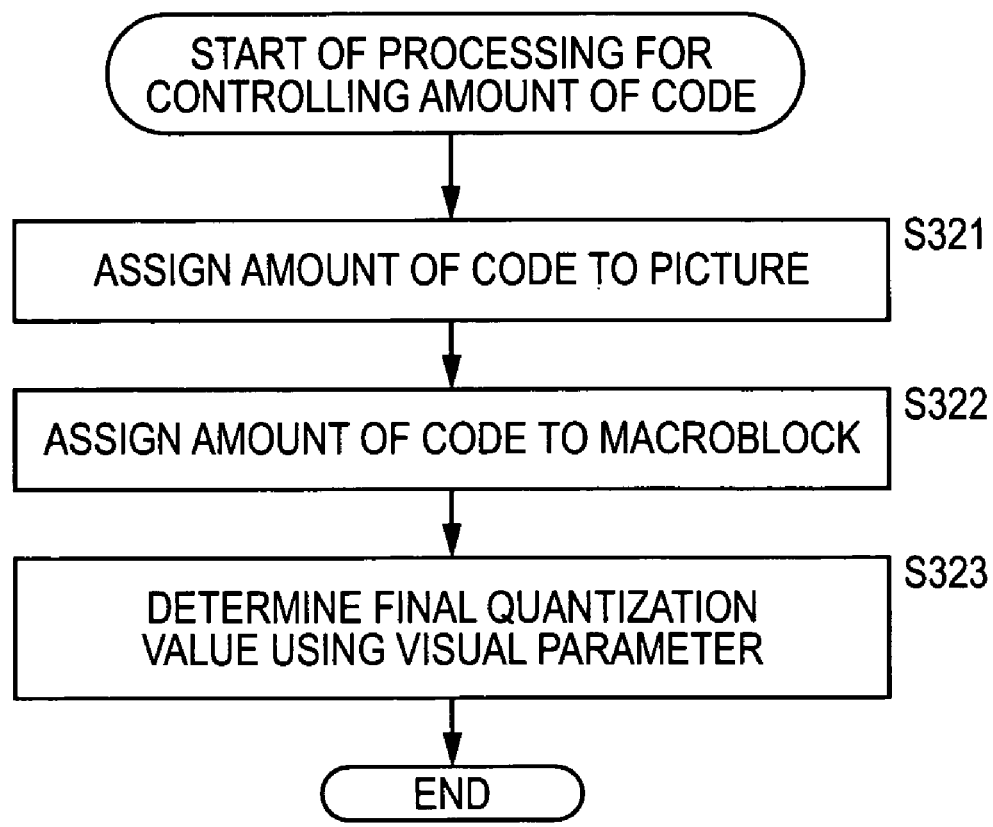
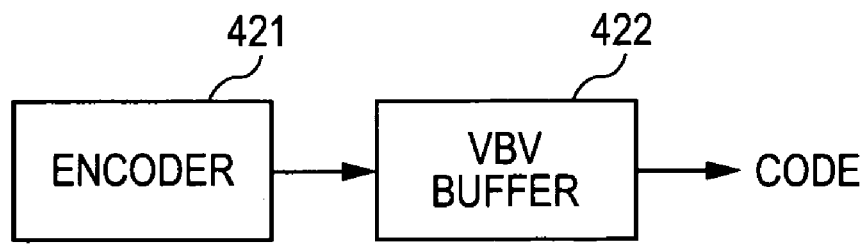

RECORDING APPARATUS AND METHOD, PLAYBACK APPARATUS AND METHOD, RECORDING MEDIUM, AND COMPUTER-READABLE MEDIUM FOR RECORDING AND PLAYING BACK MOVING IMAGES

TECHNICAL FIELD

The present invention relates to recording apparatuses and methods, playback apparatuses and methods, recording media, and programs, and in particular to a recording apparatus and a method, a playback apparatus and a method, a recording medium, and a program for recording moving images on a data recording medium or playing back moving images recorded on a data recording medium.

BACKGROUND ART

It is a long time since consumer devices for digitally recording moving images were commonly used. Nowadays, major data recording media for recording such moving images are shifting from tapes to disks. Since (data of) moving images are randomly accessible by the use of data recording media in the form of disks, images at positions far away on the time axis for playback of the moving images can be quickly played back. More specifically, so-called a playback start point can be located quickly and so-called nondestructively edited contents can now be produced more easily by picking up and merging desired portions of a moving image.

To locate a playback start point or an edit point of a recorded moving image, the moving image needs to be played back. This means that if the moving image is encoded, the moving image needs to be decoded before it can be displayed.

However, when a moving image encoded as a program stream of the MPEG (Moving Pictures Experts Group) 2 technique is to be decoded, a portion to be decoded needs to be located and extracted from the data stream before it can be decoded since the moving image is encoded in units of GOP (Group of Pictures). Control required for this purpose is complicated and computationally time-consuming.

As described above, it is difficult to quickly perform the image at a desired point of an encoded moving image.

On the other hand, various recording techniques for recording encoded moving images on a data recording medium are proposed.

FIG. 1 is a diagram depicting a recording technique for recording a moving image in a contiguous area of a data recording medium at predetermined time intervals for playing back the moving image.

A stream unit 11-1 to a stream unit 11-6 are data produced by dividing the moving image at predetermined time intervals for playing back the moving image. Each of the stream unit 11-1 to the stream unit 11-6 is recorded in a contiguous area of the data recording medium.

When the moving image recorded by the recording technique shown in FIG. 1 is to be read out from the data recording medium, the stream unit 11-1 to the stream unit 11-6 are read out sequentially. When one of the stream unit 11-1 to the stream unit 11-6 is read out first and then another of the stream unit 11-1 to the stream unit 11-6 is to be read out, a seek time or a rotational latency is required between the two stream units.

FIG. 2 is a flowchart illustrating known processing for locating and displaying an edit point. In step S11, a management information file storing management information indicating recording positions of the moving image on the data recording medium is read out. In step S12, stream data in the first frame is read out from the data recording medium in the form of a disk based on the read out management information file.

In step S13, the read-out stream data is stored in a buffer. In step S14, the encoded stream data is decompressed (decoded). In step S15, moving image data and audio data obtained by decompressing the stream data are stored in the buffer downstream. In step S16, the moving image data and audio data are sequentially read out from the buffer downstream to display a moving image based on the moving image data and output audio based on the audio data.

In step S17, it is determined whether a user has issued an instruction for shifting to the subsequent point. If it is determined in step S17 that the user has not issued an instruction for shifting to the subsequent point, displaying the moving image and outputting the audio are continued and the flow returns to step S17 to repeat the determination processing.

If it is determined in step S17 that the user has issued an instruction for shifting to the subsequent point, the flow proceeds to step S18, where stream data in the frame at the specified point is read out from the data recording medium in the form of a disk based on the read-out management information file.

In step S19, the read-out stream data is stored in the buffer. In step S20, the encoded stream data is decompressed (decoded). In step S21, moving image data and audio data obtained by decompressing the stream data are stored in the buffer downstream. In step S22, the moving image data and audio data are sequentially read out from the buffer downstream to display the moving image at the specified point based on the moving image data and output the audio at the specified point based on the audio data.

The procedure returns to step S17, where the processing of reading out stream data in the frame at the specified point from the data recording medium in the form of a disk according to an instruction from the user and decoding the stream data to display a moving image and output audio is repeated.

Also, there is another recording method for generating ClipMark composed of marks indicating distinctive images extracted from an input AV stream as management information for managing the AV stream, and furthermore, for generating PlayListMark composed of marks indicating any images specified by a user from among playback sections corresponding to PlayList defining combinations of predetermined sections in the AV stream to record ClipMark and PlayListMark on a recording medium as separate tables (e.g., refer to Patent Document 1).

[Patent Document 1] Japanese Unexamined Patent Application Publication No. 2002-158965

DISCLOSURE OF INVENTION

Problems to be Solved by the Invention

As described above, when a start point or an edit point of an encoded moving image is to be located, it is difficult to quickly display the encoded moving image since it needs to be decoded first before it can be displayed. As a result, locating a start point or searching for an edit point takes a long time.

The present invention has been conceived in light of these circumstances and is directed to quickly play back images associated with units of images, i.e., the units in which a moving image is encoded, to allow a user to view the content at a desired point in time for playback of the moving image.

Means for Solving the Problems

A recording apparatus according to the present invention includes extraction means for extracting an image from a unit in which a moving image is encoded, the unit including a constant number of images; reduction means for reducing the amount of information of the extracted image; encoding means for encoding the image whose amount of information is reduced by a predetermined encoding scheme; association means for associating the encoded image with the unit from which the image is extracted by the extraction means; and recording control means for controlling recording of the image associated with the unit onto a data recording medium for recording the moving image.

The association means can be a track associated with a track of the moving image and can associate the encoded image with the unit by arranging the encoded image in a track in a predetermined file format.

The association means can associate the encoded image with the unit by associating a range of time for playback of the unit of the moving image with the encoded image.

The recording control means can control recording of the moving image onto the data recording medium such that the moving image in a predetermined time for playback is recorded in a first contiguous area of the data recording medium and can control recording of the image onto the data recording medium such that the image is recorded in a second contiguous area of the data recording medium when the amount of data of the encoded image exceeds a predetermined threshold if the recording of the moving image in the first area of the data recording medium is ended.

The encoding means can encode the image by a compression and encoding scheme for a static image.

The encoding means can encode the image by a compression and encoding scheme for a moving image such that decoding is possible only with the image.

The reduction means can reduce the amount of information of the image by thinning out pixels of the image.

The reduction means can reduce the amount of information of the image by removing a high-frequency component of the image.

A recording method according to the present invention includes an extraction step of extracting an image from a unit in which a moving image is encoded, the unit including a constant number of images; a reduction step of reducing the amount of information of the extracted image; an encoding step of encoding the image whose amount of information is reduced by a predetermined encoding scheme; an association step of associating the encoded image with the unit from which the image is extracted in the extraction step; and a recording control step of controlling recording of the image associated with the unit onto a data recording medium for recording the moving image.

A program on a first recording medium according to the present invention includes an extraction step of extracting an image from a unit in which a moving image is encoded, the unit including a constant number of images; a reduction step of reducing the amount of information of the extracted image; an encoding step of encoding the image whose amount of information is reduced by a predetermined encoding scheme; an association step of associating the encoded image with the unit from which the image is extracted in the extraction step; and a recording control step of controlling recording of the image associated with the unit onto a data recording medium for recording the moving image.

A first program according to the present invention causes a computer to perform an extraction step of extracting an image from a unit in which a moving image is encoded, the unit including a constant number of images; a reduction step of reducing the amount of information of the extracted image; an encoding step of encoding the image whose amount of information is reduced by a predetermined encoding scheme; an association step of associating the encoded image with the unit from which the image is extracted in the extraction step; and a recording control step of controlling recording of the image associated with the unit onto a data recording medium for recording the moving image.

A playback apparatus according to the present invention includes reading control means for controlling reading an image from a data recording medium recording a moving image and the image, the image being extracted from a unit in which the moving image is encoded, the unit including a constant number of images, the amount of information of the image being reduced, the image being encoded by a predetermined encoding scheme, the image being associated with each unit, and the reading being based on an instruction from a user and a relationship with the unit of the moving image; decoding means for decoding the read out image; and display control means for controlling display of the decoded image.

The reading control means can control reading the image from the data recording medium so as to read only the image if the user directs a fast-forward operation or a rewind operation.

The decoding means can decode the image encoded by a compression and encoding scheme for a static image.

The decoding means can decode the image encoded by a compression and encoding scheme for the moving image such that decoding is possible only with the image.

A playback method according to the present invention includes a reading control step of controlling reading an image from a data recording medium recording a moving image and the image, the image being extracted from a unit in which the moving image is encoded, the unit including a constant number of images, the amount of information of the image being reduced, the image being encoded by a predetermined encoding scheme, the image being associated with each unit, and the reading being based on an instruction from a user and a relationship with the unit of the moving image; a decoding step of decoding the read out image; and a display control step of controlling display of the decoded image.

A program on a second recording medium according to the present invention includes a reading control step of controlling reading an image from a data recording medium recording a moving image and the image, the image being extracted from a unit in which the moving image is encoded, the unit including a constant number of images, the amount of information of the image being reduced, the image being encoded by a predetermined encoding scheme, the image being associated with each unit, and the reading being based on an instruction from a user and a relationship with the unit of the moving image; a decoding step of decoding the read out image; and a display control step of controlling display of the decoded image.

A second program according to the present invention causes a computer to perform a reading control step of controlling reading an image from a data recording medium recording a moving image and the image, the image being extracted from a unit in which the moving image is encoded, the unit including a constant number of images, the amount of information of the image being reduced, the image being encoded by a predetermined encoding scheme, the image being associated with each unit, and the reading being based on an instruction from a user and a relationship with the unit of the moving image; a decoding step of decoding the read out image; and a display control step of controlling display of the decoded image.

The recording apparatus may be an independent apparatus or may be a block for performing recording in a recording and playback apparatus. The playback apparatus may be an independent apparatus or may be a block for performing playback in a recording and playback apparatus.

In the recording apparatus and method, first recording medium, and first program according to the present invention, an image is extracted from a unit in which a moving image is encoded, the unit including a constant number of images; the amount of information of the extracted image is reduced; the image whose amount of information is reduced is encoded by a predetermined encoding scheme; the encoded image is associated with the unit from which the image is extracted; and recording of the image associated with the unit onto a data recording medium for recording the moving image is controlled.

In the recording apparatus and method, second recording medium, and second program according to the present invention, reading an image from a data recording medium recording a moving image and the image is controlled, wherein the image is extracted from a unit in which the moving image is encoded, the unit including a constant number of images, the amount of information of the image is reduced, the image is encoded by a predetermined encoding scheme, the image is associated with each unit, and the reading is based on an instruction from a user and a relationship with the unit of the moving image. Furthermore, the read-out image is decoded and display of the decoded image is controlled.

ADVANTAGES

As described above, according to the first present invention, images according to the moving image can be recorded on the data recording medium.

Furthermore, according to the first present invention, the images associated with the unit can be quickly played back when the moving image is to be played back. As a result, the user can view the content at a desired point in time for playback of the moving image.

According to the second present invention, images according to the moving image can be played back.

Furthermore, according to the second present invention, images associated with the unit can be quickly played back. As a result, the user can view the content at a desired point in time for playback of the moving image.

BRIEF DESCRIPTION OF THE DRAWINGS

FIG. 42 is a flowchart illustrating the processing of controlling the amount of code.

FIG. 43 is a block diagram depicting the structure of a VBV model.

Figure 1:
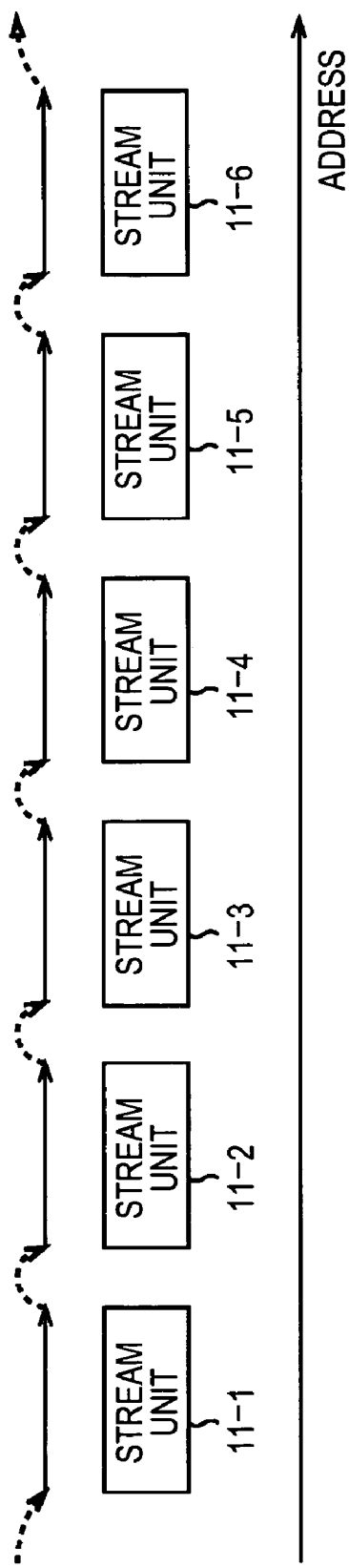
FIG. 1 is a diagram depicting a known recording technique.
Figure 2:
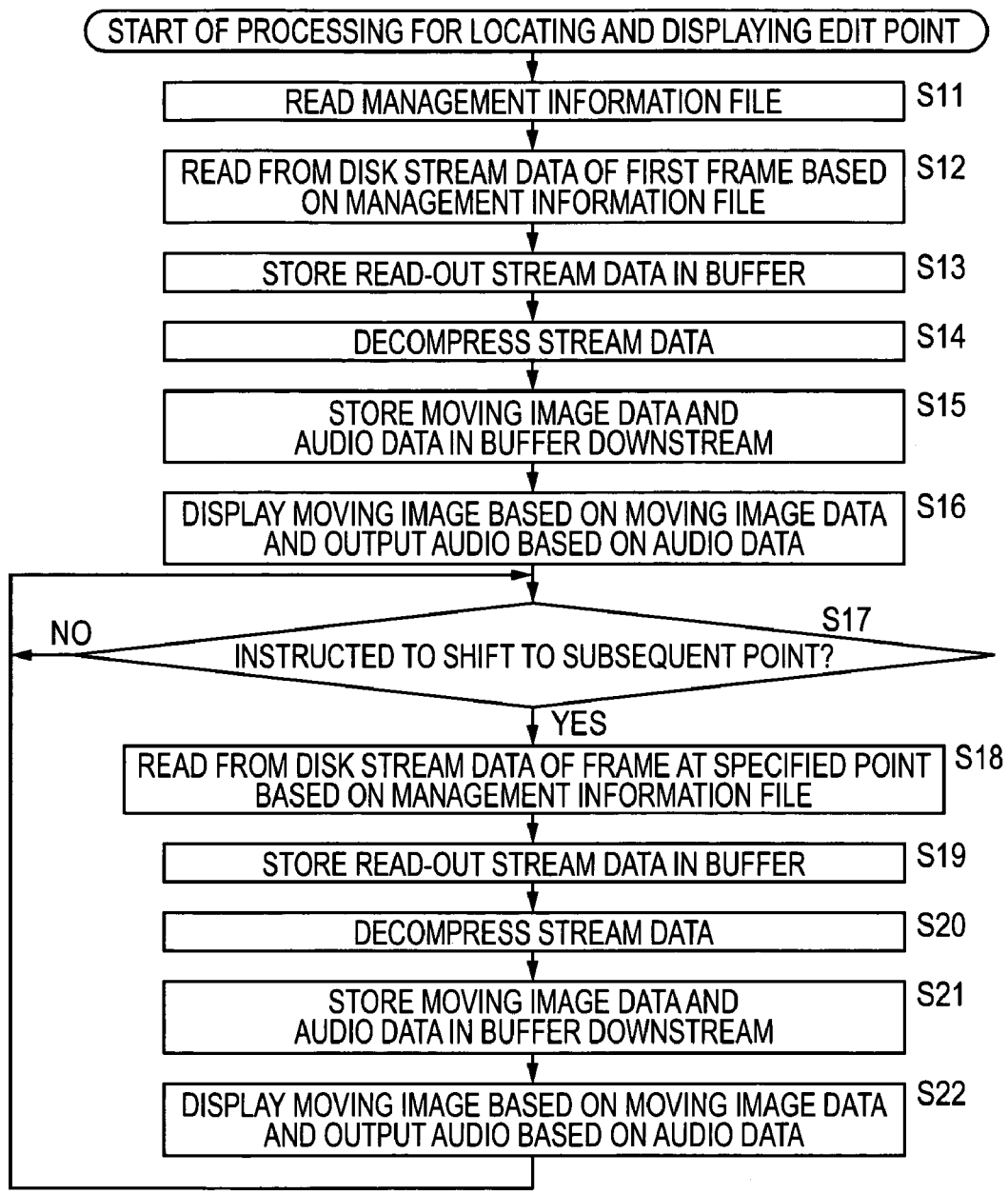
FIG. 2 is a flowchart illustrating the known process of locating and displaying an edition point.

REFERENCE NUMERALS 31 microcomputer, 35 buffer memory, 38 moving-image compression section, 40 number-of-pixels conversion section, 41 static-image compression section, 42 audio compression section, 43 buffer memory, 44 drive, 45 disk, 48 disk, 51 extraction section, 81 thumbnail data, 101 file in PLF format, 111 file, 121 file in static image package format, 131 track management file, 141 location-related data file, 151 location-related data file, 162 thumbnail data recording area, 203 moving-image decompression section, 204 static-image decompression section, 205 audio decompression section, 206 image output interface, 302 I-picture selection and decoding section, 303 resolution conversion section, 304 JPEG encoding section, 305 file-format conversion section, 322 I-picture determination section, 323 selector, 324 variable-length code decoder, 325 dequantization section, 326 inverse-DCT processing section, 341 low-pass filter, 342 pixel-thinning section, 381 I-picture encoding section, 402 visual-parameter detection section, 403 DCT processing section, 404 control section, 405 quantization section, 406 variable-length encoding section, 407 buffer, 451 I-picture selection and decoding section, 452 frequency-characteristic conversion section, 453 I-picture encoding section, 472 I-picture determination section, 473 selector, 474 variable-length code decoder, 475 dequantization section, 491 horizontal filter, 492 vertical filter, 501 control section, 502 quantization section, 503 variable-length encoding section, 504 buffer, 521 file-format conversion section, 522 JPEG decoding section, 561 file-format conversion section, 562 I-picture decoding section, 591 pixel-thinning section

BEST MODE FOR CARRYING OUT THE INVENTION

Figure 3:
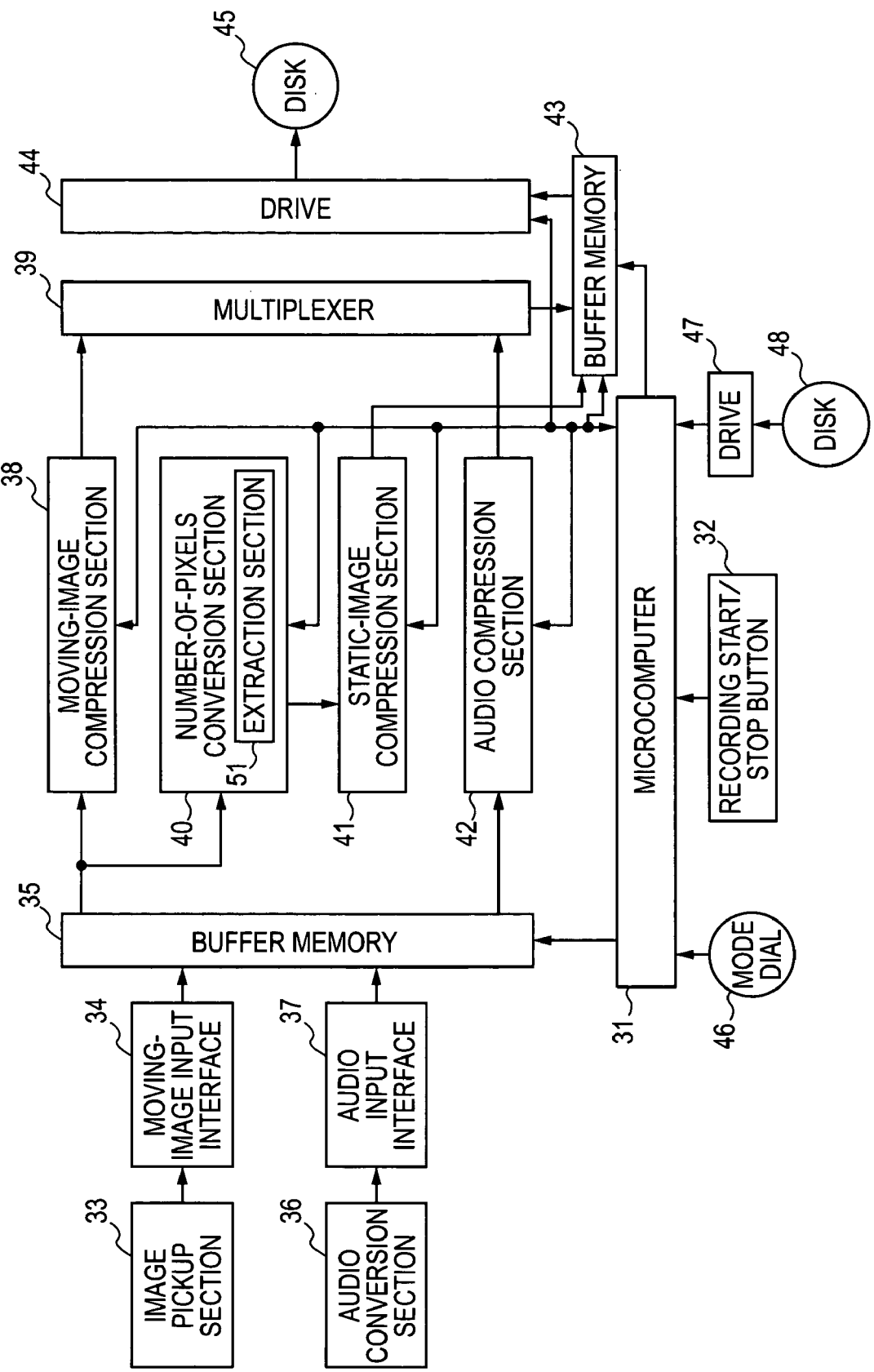
FIG. 3 is a block diagram depicting a structure of one embodiment of a recording apparatus according to the present invention.

FIG. 3 is a block diagram depicting a structure of one embodiment of a recording apparatus according to the present invention. The recording apparatus shown in FIG. 3 is constructed so as to include a microcomputer 31 to a mode dial 46.

The microcomputer 31 is so-called a built-in microcomputer including, for example, a ROM (Read Only Memory), a RAM (Random Access Memory), a serial interface, or a parallel interface. The microcomputer 31 executes a predetermined control program to comprehensively control the recording apparatus. The microcomputer 31 executes the predetermined control program to issue an operating command to each section of the recording apparatus based on a signal from a recording start/stop button 32 in accordance with an operation of a user. The microcomputer 31 executes the predetermined control program to adjust the file format of data stored in a buffer 43.

An image pickup section 33 includes an optical system, such as a lens and an aperture, and an imaging element, such as a CCD (Charge Coupled Device) or a CMOS (Complementary Metal-Oxide Semiconductor) sensor and captures an image of a subject as a moving image to supply the image signal of the moving image thus obtained to a moving-image input interface 34. The moving-image input interface 34 is an interface between the image pickup section 33 and a buffer memory 35. It converts an image signal supplied from the image pickup section 33 into moving image data in a predetermined format, such as applying analog-to-digital or serial-to-parallel conversion to the image signal, and supplies the image data to the buffer memory 35.

An audio conversion section 36 includes, for example, a microphone. It acquires sound from the subject or sound surrounding the subject, supplies an audio signal corresponding to the acquired sound to an audio input interface 37. The audio signal output from the audio conversion section 36 is synchronized with an image signal output from the image pickup section 33. The audio input interface 37 is an interface between the audio conversion section 36 and the buffer memory 35. It converts an audio signal supplied from the audio conversion section 36 into audio data in a predetermined format, such as applying analog-to-digital or serial-to-parallel conversion to the audio signal, and supplies the audio data to the buffer memory 35.

The buffer memory 35 includes, for example, a semiconductor memory and temporarily stores image data supplied from the moving-image input interface 34 and audio data supplied from the audio input interface 37. The buffer memory 35 supplies the stored image data to a moving-image compression section 38 and a number-of-pixels conversion section 40. Furthermore, the buffer memory 35 supplies the stored audio data to an audio compression section 42.

Under the control of the microcomputer 31, the moving-image compression section 38 compresses and encodes the image data for a moving image supplied from the buffer memory 35 through a predetermined technique and supplies the compressed and encoded image data to a multiplexer 39. For example, the moving-image compression section 38 compresses and encodes image data of a moving image supplied from the buffer memory 35 through the MPEG2 technique and supplies the compressed and encoded image data to the multiplexer 39.

Under the control of the microcomputer 31, the number-of-pixels conversion section 40 extracts a predetermined picture (frame or field) from the image data of a moving image and converts the number of pixels of the extracted picture. For example, the number-of-pixels conversion section 40 converts the number of pixels of the extracted picture by thinning out pixels from the picture.

Figure 4:
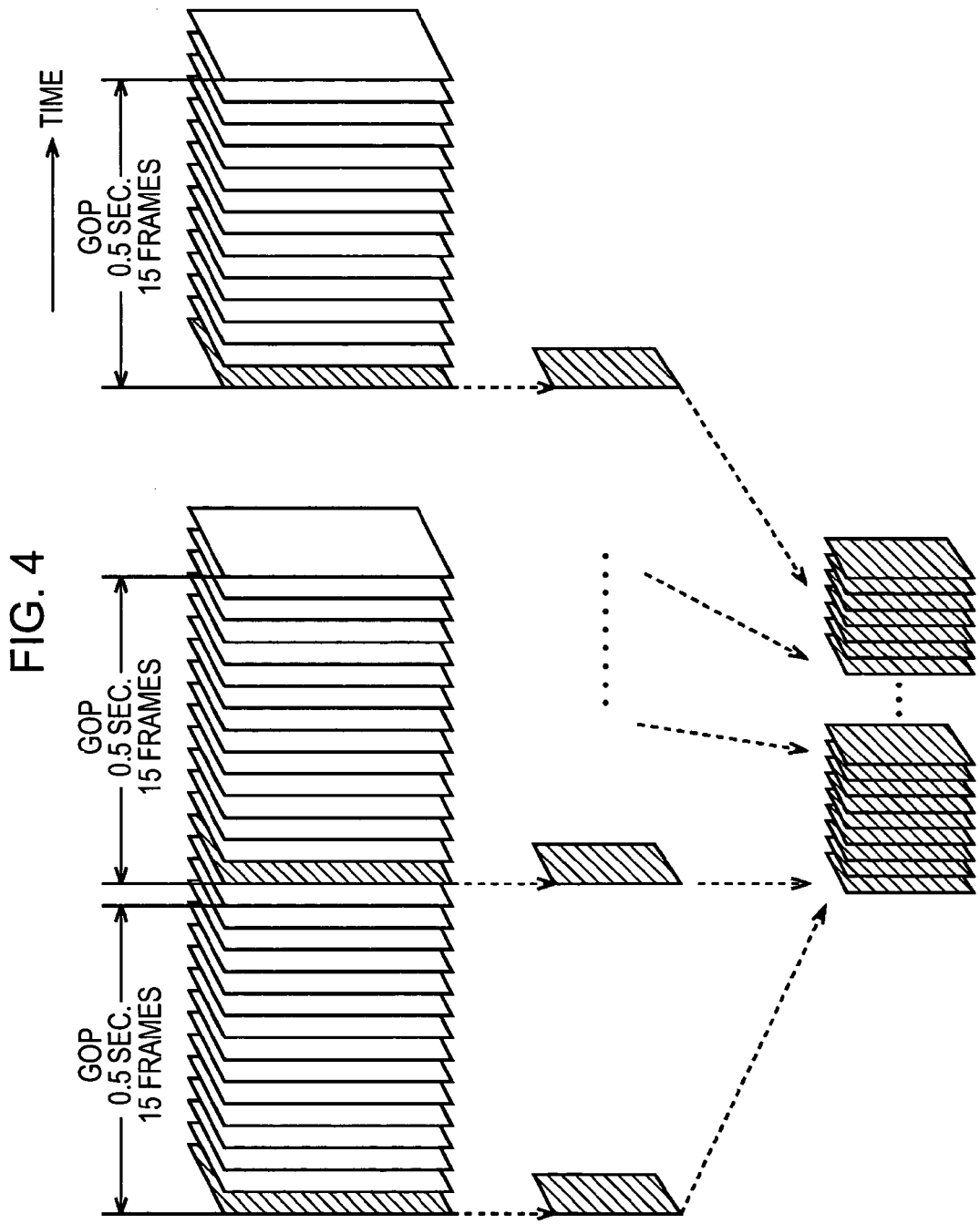
FIG. 4 is a diagram depicting extraction of one frame (picture) from one GOP.

The number-of-pixels conversion section 40 is provided with an extraction section 51. For example, as shown in FIG. 4, the extraction section 51 extracts one frame (picture) from one GOP of the image data for a moving image compressed and encoded by the moving-image compression section 38 in accordance with the MPEG2 technique.

More specifically, for example, if the moving-image compression section 38 compresses and encodes a moving image with 30 frames per second in units of GOP composed of continuous 15 frames, the extraction section 51 extracts one frame from the 15 frames constituting each GOP.

For example, the number-of-pixels conversion section 40 converts the number of pixels of the frame extracted from each GOP by thinning out pixels of the frame.

The number-of-images conversion section 40 supplies the image data whose number of pixels has been converted to a static-image compression section 41. Under the control of the microcomputer 31, the static-image compression section 41 encodes the image data supplied from the number-of-pixels conversion section 40 by means of a compression and encoding scheme for compressing static images. For example, the static-image compression section 41 encodes the image data supplied from the number-of-pixels conversion section 40 in accordance with the JPEG (Joint Photographic Experts Group) technique. The static-image compression section 41 supplies the encoded image data as thumbnail data to the buffer memory 43.

Under the control of the microcomputer 31, the audio compression section 42 compresses and encodes the audio data supplied from the buffer memory 35 by means of a predetermined technique and supplies the compressed and encoded audio data to the multiplexer 39. The audio data output from the audio compression section 42 is synchronized with the image data output from the moving-image compression section 38. For example, the audio compression section 42 compresses and encodes the audio data supplied from the buffer memory 35 in accordance with the AC3 (Audio Code Number 3 (Dolby Digital™) technique and supplies the compressed and encoded audio data to the multiplexer 39.

The multiplexer 39 multiplexes the image data supplied from the moving-image compression section 38 and the audio data supplied from the audio compression section 42 and supplies the multiplexed image data and audio data to the buffer memory 43. For example, the multiplexer 39 multiplexes image data and audio data as an MPEG2 system stream format and supplies to the buffer memory 43 the data in MPEG2 system stream format composed of the image data and audio data generated by multiplexing.

The buffer memory 43 temporarily stores the multiplexed image data and audio data supplied from the multiplexer 39, as well as the thumbnail data supplied from the static-image compression section 41.

The microcomputer 31 adjusts the format of the thumbnail data stored in the buffer memory 43 into a predetermined file format. The file format of thumbnail data will be described later with reference to FIG. 7 to FIG. 13.

A drive 44 reads out the multiplexed image data and audio data, as well as the thumbnail data converted into a predetermined file format, from the buffer memory 43 and records them on a disk 45, which is one example of a data recording medium. The disk 45 is, for example, a magnetic disk, an optical disk, or a magneto-optical disk.

Figure 5:
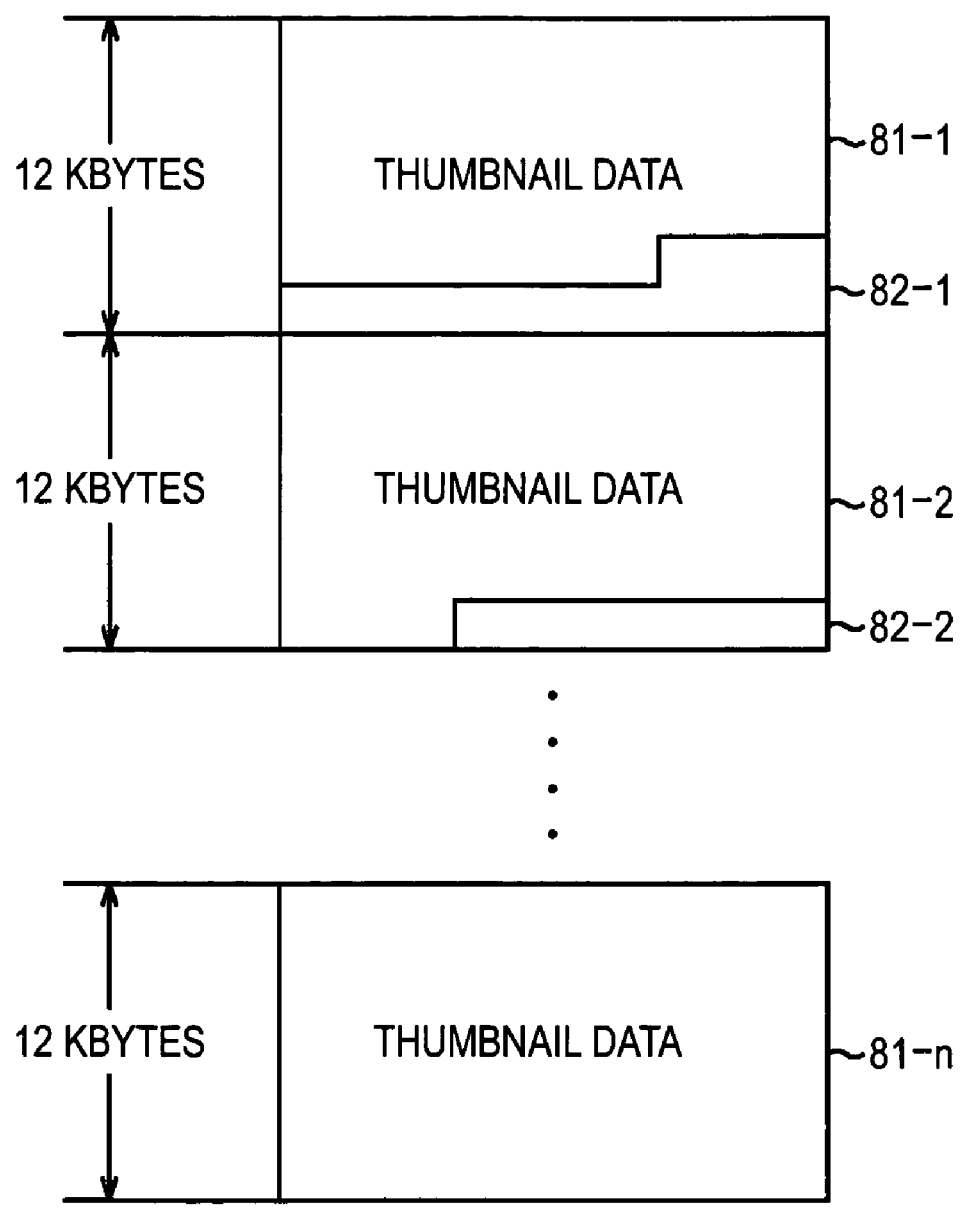
FIG. 5 is a diagram depicting one example of thumbnail data recorded on a disk.

FIG. 5 is a diagram depicting one example of thumbnail data recorded on the disk 45. Each of thumbnail data 81-1 to thumbnail data 81-n is data for displaying one thumbnail. On the disk 45, in a case where error correction is carried out by the ECC (Error Correction Coding) in units of 12 kilobytes, each of the thumbnail data 81-1 to the thumbnail data 81-n is compressed to a size equal to or smaller than kilobytes.

Here, the unit in which data is subjected to error correction by, for example, the ECC (Error Correction Coding) is recorded in one cluster, which is a unit in which records of data are managed.

Each of the thumbnail data 81-1 to the thumbnail data 81-n is recorded on the disk 45 in one cluster as the unit in which error correction is carried out by the ECC. In this case, if any of the thumbnail data 81-1 to the thumbnail data 81-n is smaller than 12 kilobytes, a data string is added to the data that is smaller than 12 kilobytes of the thumbnail data 81-1 to the thumbnail data 81-n so that the size of the data is increased to 12 kilobytes. Each of the thumbnail data 81-1 to the thumbnail data 81-n increased to 12 kilobytes as a result of a data string being added is recorded on the disk 45 in one cluster as the unit in which error correction is carried out by the ECC.

In the example shown in FIG. 5, since the thumbnail data 81-1 is smaller than 12 kilobytes, a data string is add so that the size of the thumbnail data 81-1 is increased to 12 kilobytes and then the 12 kilobytes thumbnail data 81-1 is recorded in one cluster.

In the example shown in FIG. 5, since the thumbnail data 81-n is 12 kilobytes, no data string is added and the thumbnail data 81-n is recorded as-is in one cluster.

In this manner, since it is sufficient to read data from one cluster when one of the thumbnail data 81-1 to the thumbnail data 81-n is to be read out, the thumbnail data 81-1 to the thumbnail data 81-n can be read out more quickly from the disk 45.

Hereinafter, the thumbnail data 81-1 to the thumbnail data 81-n are referred to just as the thumbnail data 81 if it is not necessary to differentiate them from one another.

The mode dial 46 supplies a signal for specifying the operation mode of the recording apparatus to the microcomputer 31 according to an operation of the user. By changing the operation mode, for example, the number of pixels in one frame (picture) of recorded image data is changed or whether thumbnail data is recorded or not can be changed.

A drive 47 is installed in the recording apparatus as required. From a disk 48 on which the control program is recorded, the drive 47 reads out the program and supplies it to the microcomputer 31. The microcomputer 31 stores the program read out from the disk 48 on the built-in rewritable ROM or RAM and executes the program. The functions of the drive 47 and the disk 48 can be achieved by the drive 44 and disk 45.

Figure 6:
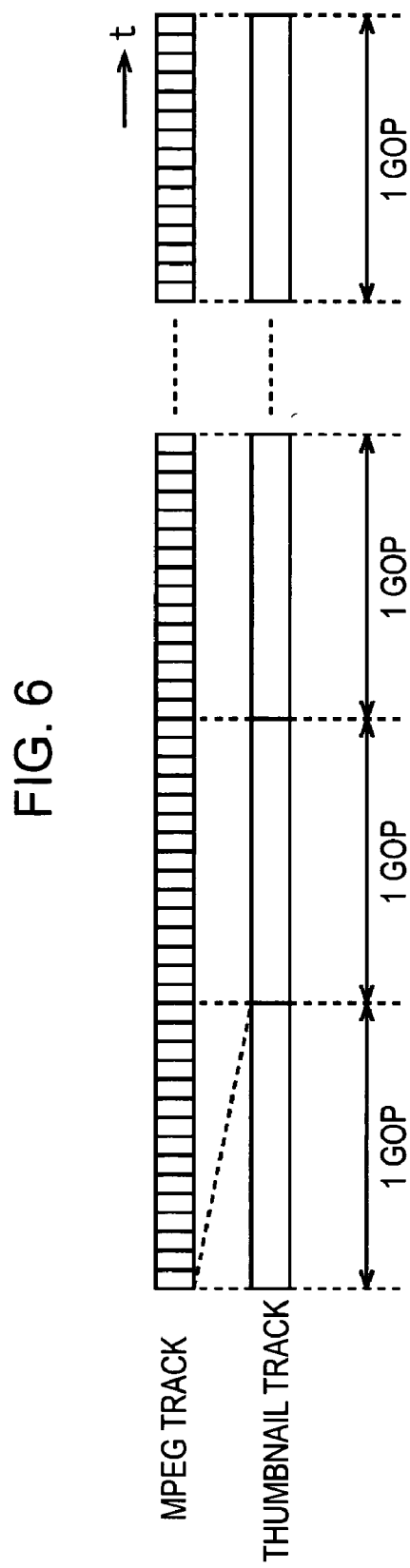
FIG. 6 is a diagram depicting synchronization between thumbnail data and multiplexed moving image data and audio data.

FIG. 6 is a diagram depicting synchronization between the multiplexed moving image data and audio data and the thumbnail data. In FIG. 6, an MPEG track is composed of moving image data and audio data, and a thumbnail track is composed of thumbnail data. In FIG. 6, one rectangle indicates one image. The term "track" means a sequence of images or sounds.

For example, if moving image data constituting data in MPEG2 system stream format is encoded in units of GOP composed of 15 frames and thumbnail data is generated from one of the frames in each GOP, one GOP in an MPEG2 system stream corresponds to one item of thumbnail data. In this case, one item of thumbnail data corresponds to a period of 0.5 second in playback of the moving image.

The file format of the thumbnail data 81 associated with one GOP will now be described with reference to FIG. 7 to FIG. 13.

As a file format for the thumbnail data 81, the Quick Time™ file format can be used. Hereinafter, the Quick Time™ file format is referred to as the QT file format.

In the QT file format, moving image data, audio data, static image data, or the like is individually blocked, and furthermore, management information for managing such blocked moving image data, audio data, static image data, or the like is also individually arranged into blocks. Such a block is a basic data unit and is called an atom. Blocked moving image data, audio data, static image data, or the like is managed on a track-by-track basis, and the information is called a track atom. Furthermore, information for managing a plurality of tracks as one item of moving image data is called a movie atom.

One movie data atom corresponds to one track.

Figure 7:
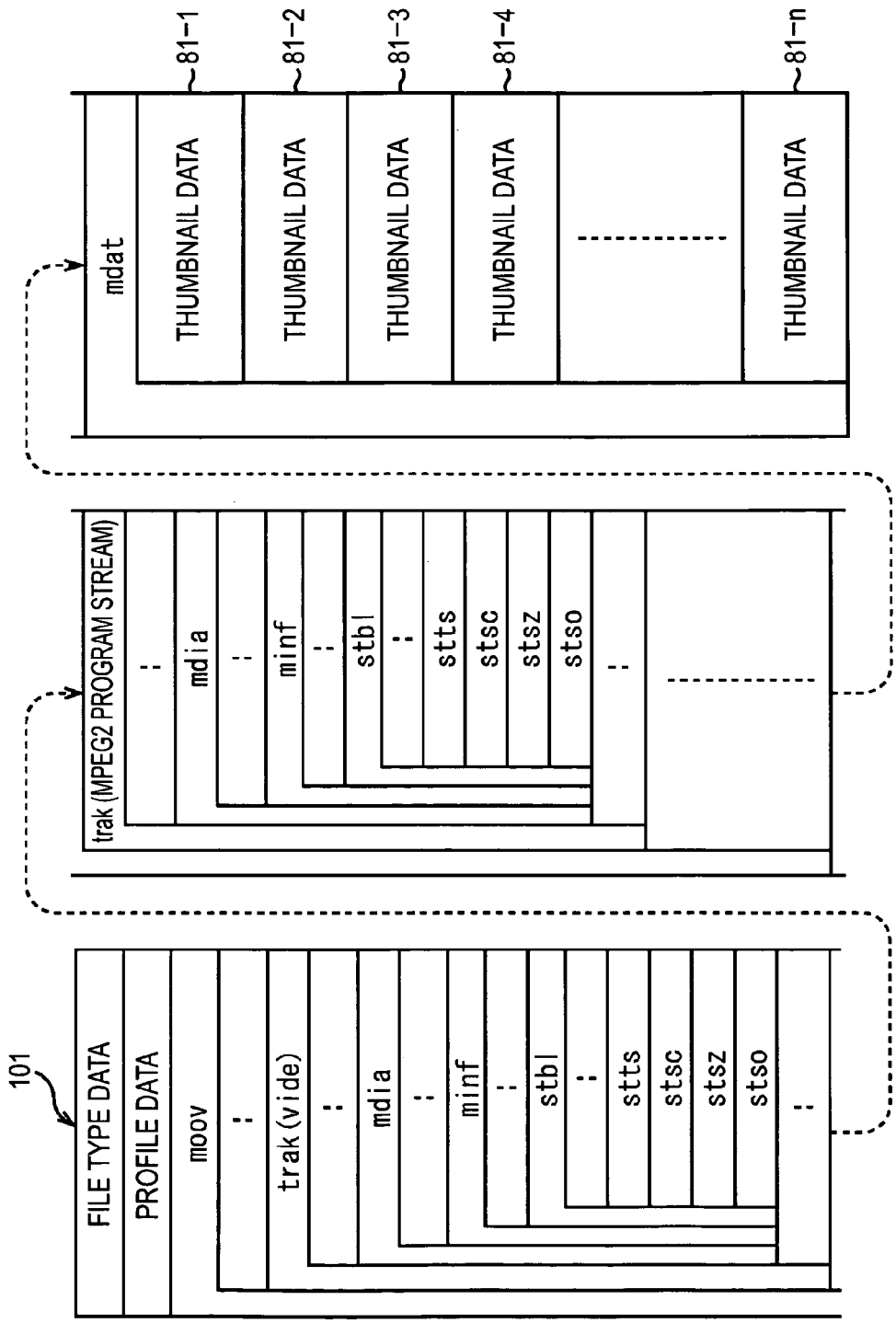
FIG. 7 is a diagram depicting an example of a file in PLF format.

FIG. 7 is a diagram depicting an example of a file in Playlist File (PLF) format, as one example of QT file format, for storing the thumbnail data 81. In the head of a file 101 in PLF format for storing the thumbnail data 81, data (file type data in the figure) for describing the file type is arranged. The data for describing the file type is followed by data (profile data in the figure) for describing the file profile.

For example, the data for describing the file type can be in a format in compliance with the MP4 extension (ISO14496-14) of BaseMediaFileFormat (ISO14496-12) of the ISO (International Organization for Standardization). In addition, for example, a value indicating the PLF format is set in the data for describing the file profile.

In the file 101 in PLF format, the data for describing the file profile is followed by a movie atom (data indicated by moov in the figure). The track atom (data indicated by trak (vide) in the figure) of a video track arranged in the movie atom of FIG. 7 is management information of thumbnail data 81. A track atom (data indicated by trak (MPEG2 program stream) in the figure) of an MPEG2 system stream (MPEG2 program stream) track arranged in the movie atom of FIG. 7 is management information about the MPEG2 system stream in which moving image data and audio data are multiplexed.

In a media atom (data indicated by mdia in the figure) of the track atom, management information for managing the compression scheme, storage location, display time, and the like of the corresponding movie data atom is stored. In a media information atom (data indicated by minf in the figure) of the media atom, various types of information associated with a sample, which is the minimum management unit, is arranged. For example, in the MPEG2 system stream program stream) track, the sample is one frame, and in the video track of the thumbnail data 81, the sample is one item of thumbnail data 81.

In a sample table atom (data indicated by stbl in the figure) of the media information atom, various types of information associated with individual samples is arranged. In a time sample atom (data indicated by stts in the figure) of the sample table atom, a relationship between each sample and a time in playback is described. In a sample chunk atom (data indicated by stsc in the figure) of the sample table atom, a relationship between samples and a chunk composed of the samples is described.

Here, the term "chunk" means a data unit, in a track, composed of a collection of a plurality of samples.

In addition, in a sample size atom (data indicated by stsz in the figure) of the sample table atom, the amount of data in each sample is described. In a chunk offset atom (data indicated by stco in the figure) of the sample table atom, information about the location of each chunk with respect to the head of the file is described.

Furthermore, the thumbnail data 81-1 to the thumbnail data 81-n are stored in the file 101 in PLF format as a movie data atom (data indicated by mdat in the figure). In the file 101 in PLF format, the thumbnail data 81-1 to the thumbnail data 81-n are sequentially arranged.

More specifically, in the time sample table atom of the track atom of the movie atom shown in FIG. 7, a time in playback of each of the thumbnail data 81-1 to the thumbnail data 81-n, which are the movie data atom, is described.

Because of this, each of the thumbnail data 81-1 to the thumbnail data 81-n can be played back in conjunction with one GOP of the MPEG2 system stream, as shown in FIG. 6.

The number of files recorded on the disk 45 can be reduced by storing the thumbnail data 81-1 to the thumbnail data 81-n in the file 101 in PLF format as described above.

Figure 8:
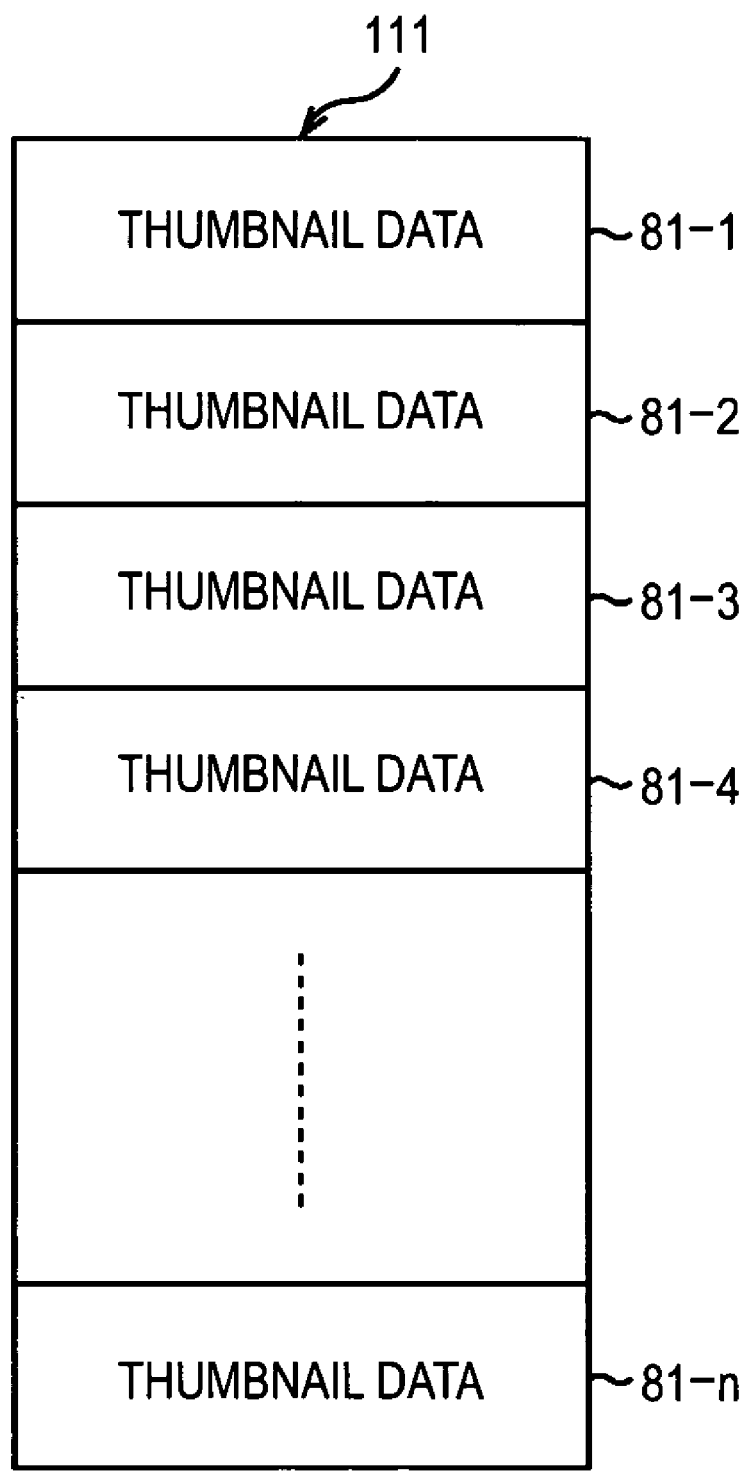
FIG. 8 is a diagram depicting a file storing thumbnail data separately from a file in PLF format.

FIG. 8 is a diagram depicting a file storing the thumbnail data 81 separately from the file 101 in PLF format. A file 111 shown in FIG. 8 is a file for storing the thumbnail data 81-1 to the thumbnail data 81-n that is referred to from the file 101 in PLF format. In the file 111, the thumbnail data 81-1 to the thumbnail data 81-n are sequentially arranged.

In this case, in the media information atom (data indicated by minf in the figure) of the track atom in the file 101 in PLF format, management information for referring to the file 111, such as the storage location (path and file name) of the file 111, is stored.

By doing so, instead of storing the thumbnail data 81 as the movie data atom in the file 101 in PLF format, the thumbnail data 81 can be recorded as the file 111 in a unique format externally referred to and played back based on the file 101 in PLF format. Also in this case, since a time in playback of each of the thumbnail data 81-1 to the thumbnail data 81-n stored in the file 111 is described in the file 101 in PLF format, each of the thumbnail data 81-1 to the thumbnail data 81-n can be played back in conjunction with one GOP of the MPEG2 system stream, as shown in FIG. 6.

In addition, the thumbnail data 81 can also be stored in a file in static image package format as a file referred to by the file 101 in PLF format.

Figure 9:
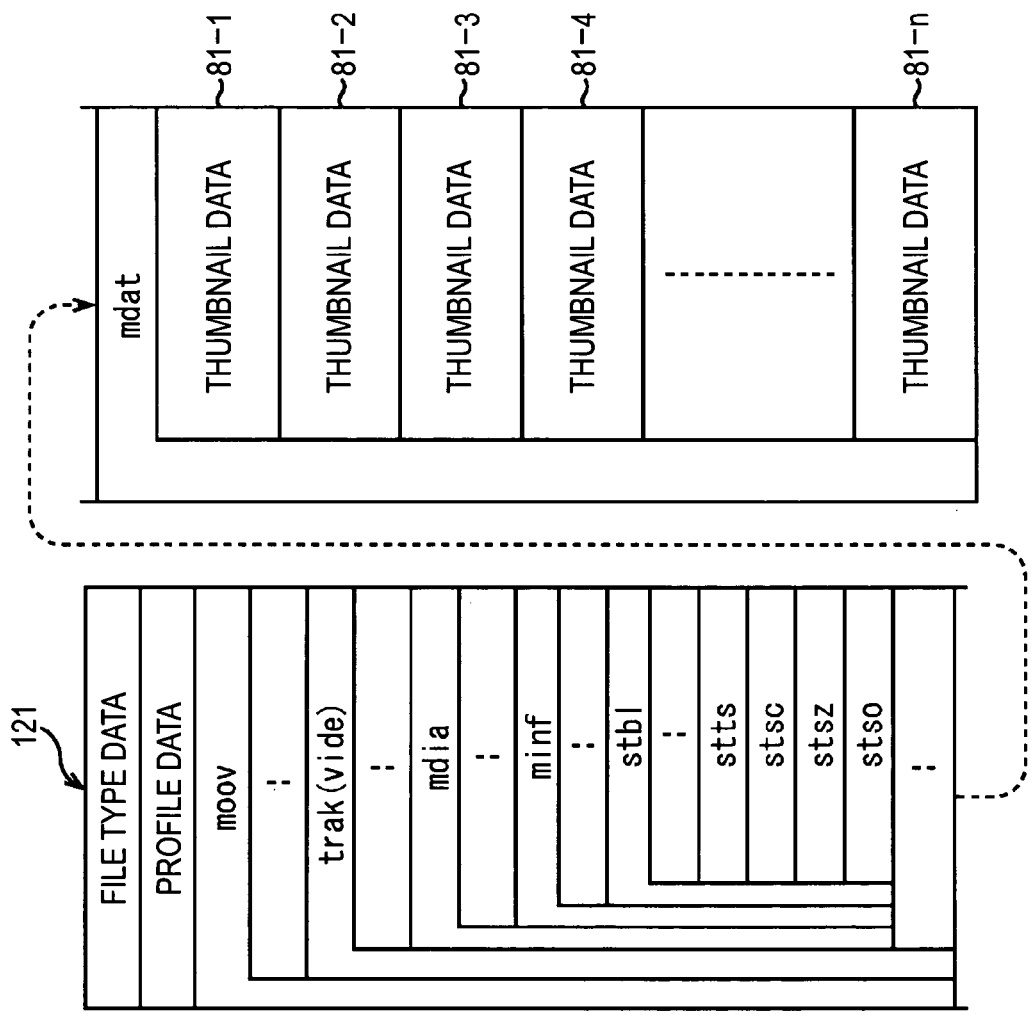
FIG. 9 is a diagram depicting an example of file in static image package format.

FIG. 9 is a diagram depicting an example of a file in static image package format for storing the thumbnail data 81. A file 121 in static image package format, which is a file in static image package format, has the same data structure as that of the file 101 in PLF format. In FIG. 9, the same data as that shown in FIG. 7 is denoted by the same name, and thus a description thereof will be omitted.

A value indicating the static image package format is set to the data for describing the file profile in the file in static image package format.

In the file 121 in static image package format, a-track atom (data indicated by trak (vide) in the figure), which is management information for the thumbnail data 81, is stored. Since the file 121 in static image package format is a file referred to by the file 101 in PLF format, the track atom of the MPEG2 system stream is not stored in the file 121 in static image package format.

The track atom in the file 121 in static image package format is described as in the track atom of the file 101 in PLF format. Furthermore, in the file 121 in static image package format, the thumbnail data 81-1 to the thumbnail data 81-*n* are stored as the movie data atom (data indicated by mdat in the figure).

Furthermore, the thumbnail data 81-1 to the thumbnail data 81-*n* may be stored in a file in location-related data file format, which is a file format for storing a plurality of items of metadata or image data individually associated with each location, serving as a time range of a moving image, and a time in playback may be described by means of a file in track management file format for storing track-related management information.

Figure 10:
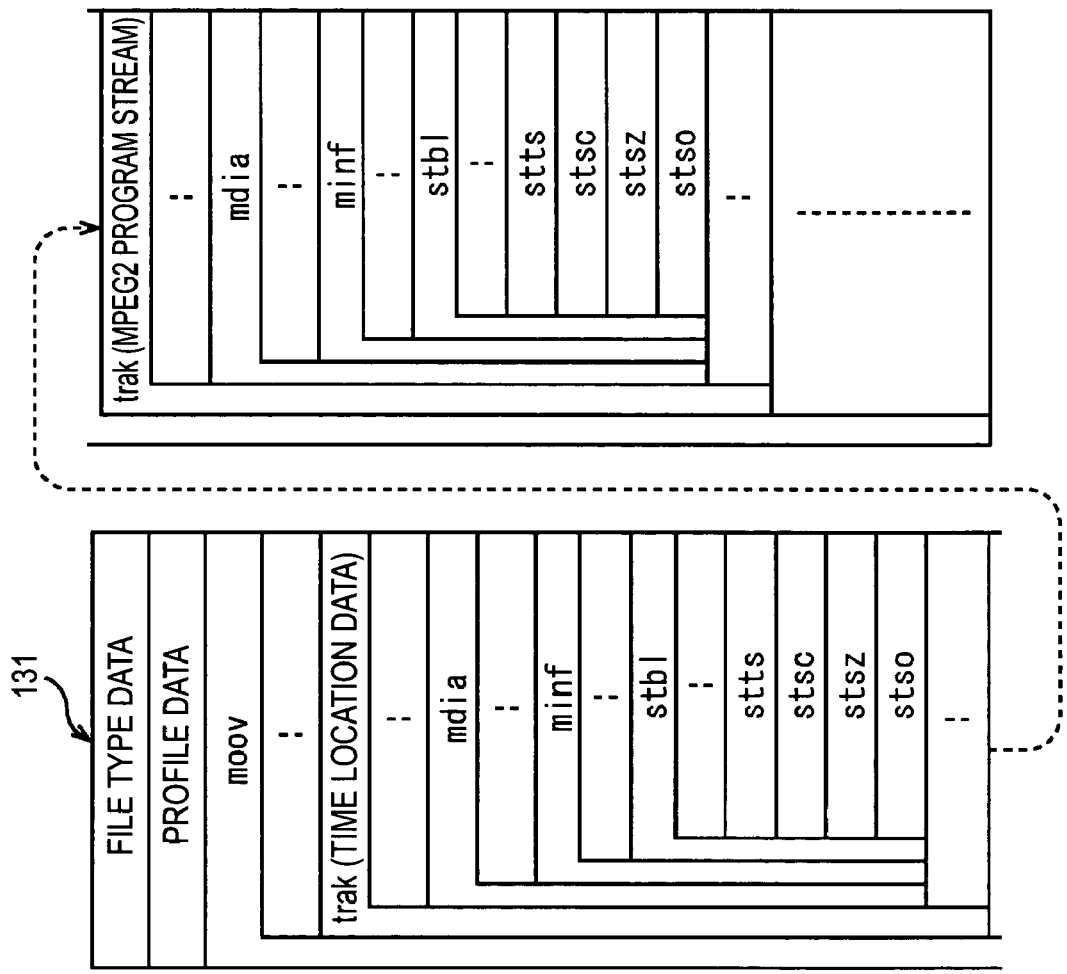
FIG. 10 is a diagram depicting an example of a file in track management file format.
Figure 11:
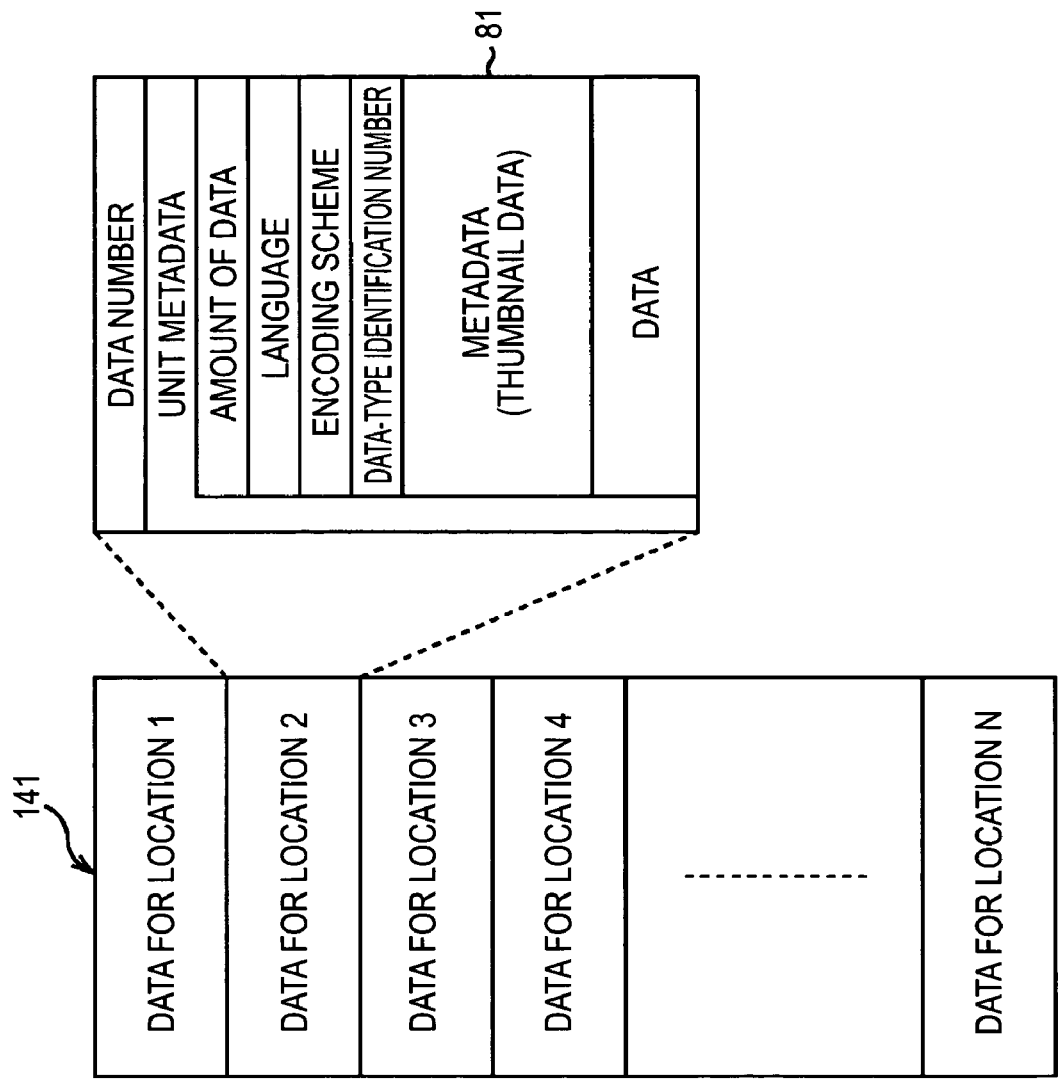
FIG. 11 is a diagram depicting an example of a location-related data file.

FIG. 10 is a diagram depicting an example of a file in track management file format in this case. FIG. 11 is a diagram depicting an example of a file in location-related data file format in this case.

Since a video track cannot be used in a track management file 131 shown in FIG. 10, the first track atom (data indicated by trak (time location data) in the figure) in the track management file 131 is management information for a location-related data file 141 shown in FIG. 11, and the subsequent track atom (data indicated by trak (MPEG2 program stream) in the figure) in the track management file 131 is management information for the MPEG2 system stream in which moving image data and audio data are multiplexed.

In the track atom for the location-related data file 141, a sample corresponds to each item of data for a plurality of locations stored in the location-related data file 141. In other words, information about each item of data for a plurality of locations in the location-related data file 141 is stored in the media information atom (data indicated by minf in the figure) of the track atom for the location-related data file 141. The relationship between each item of data for a plurality of locations in the location-related data file 141, corresponding to a sample, and a time in playback is described in the time sample atom (data indicated by stts in the figure) of the sample table atom of the media information atom in the track atom for the location-related data file 141.

As shown in FIG. 11, data is stored at each location in the location-related data file 141.

Figure 12:
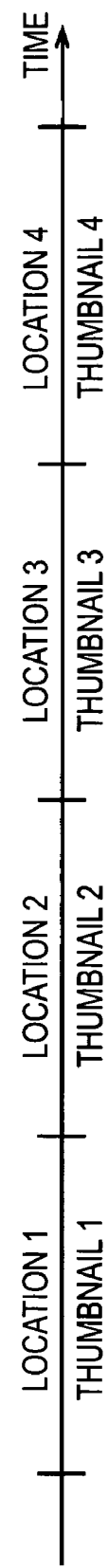
FIG. 12 is a diagram depicting locations.

In the current description, the term "location" means a time range in a moving image, as shown in FIG. 12, and a plurality of locations is sequentially arranged in order without overlapping each other or having gaps therebetween. In short, a range in time can be specified by specifying locations in sequence.

When the track management file 131 and the location-related data file 141 are to be used, one thumbnail (thumbnail data 81) is associated with one location.

For example, as shown in FIG. 12, a thumbnail 1 (e.g., the thumbnail data 81-1) is associated with a first location 1, a thumbnail 2 (e.g., the thumbnail data 81-2) is associated with a location 2 subsequent to the location 1, a thumbnail 3 (e.g., the thumbnail data 81-3) is associated with a location 3 subsequent to the location 2, and similarly, a thumbnail n (e.g., the thumbnail data 81-*n*) is associated with n-th location n.

As shown in FIG. 11, a data number indicating the order of data and unit metadata (metadata unit) are arranged in the location-related data file 141 as data for each location. In the unit metadata, the data amount of unit metadata, language used for description, metadata encoding scheme, data-type identification number for identifying the type of the metadata, the thumbnail data 81 serving as the metadata, and data other than the thumbnail data 81 are arranged in sequence. Data other than the thumbnail data 81 arranged next to the thumbnail data 81 may or may not be stored in the unit metadata.

Therefore, each of the thumbnail data 81-1 to the thumbnail data 81-*n* can be played back in conjunction with a location by storing management information for referring to the location-related data file 141, such as the storage location (path and file name) of the location-related data file 141, in the media atom (data indicated by mdia in FIG. 10) of the track atom of the track management file 131 in track management file format and by arranging information about each item of data for the location in the location-related data file 141 (e.g., the number of the data and information indicating the relationship between the number of the data and a time in playback) in the sample table atom (data indicated by stbl in FIG. 10).

If the location is the time at which each GOP of the MPEG2 system stream is played back, each of the thumbnail data 81-1 to the thumbnail data 81-*n* can be played back in conjunction with one GOP of the MPEG2 system stream, as shown in FIG. 6.

Alternatively, the thumbnail data 81 stored in an external file may further be referred to from a file in location-related data file format, rather than storing the thumbnail data 81 in the file in location-related data file format.

Figure 13:
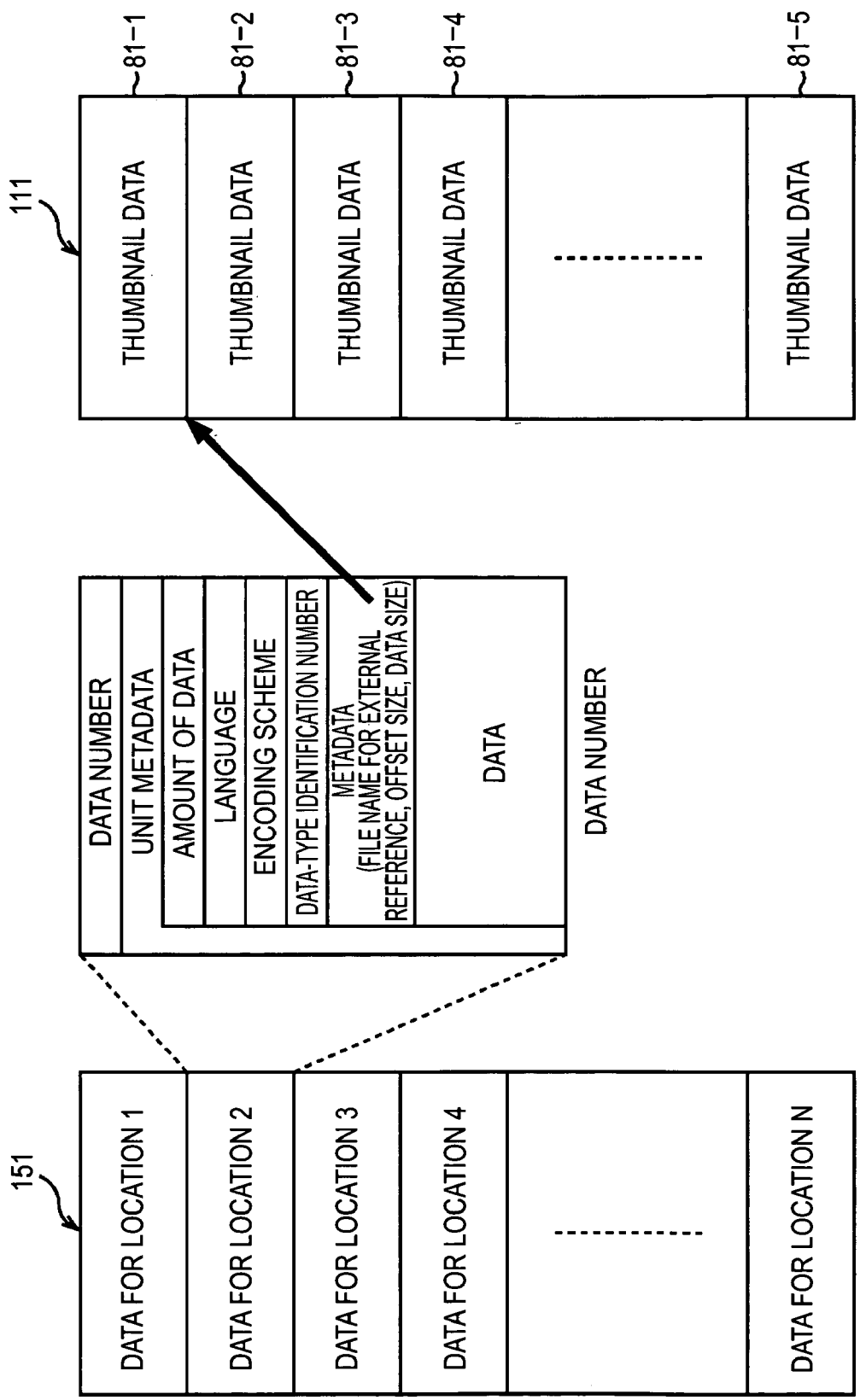
FIG. 13 is a diagram depicting an example of a location-related data file further referring to thumbnail data stored in an external file and a reference file storing thumbnail data.

FIG. 13 is a diagram depicting an example of a location-related data file 151 for further referring to the thumbnail data 81 stored in an external file without storing the thumbnail data 81 therein and a reference file 111 storing the thumbnail data 81.

In the location-related data file 151, the data number and unit metadata (metadata unit) are arranged as data for each location. In the unit metadata, the data amount of unit metadata, language used for description, metadata encoding scheme, data-type identification number for identifying the type of the metadata, and the metadata are arranged in sequence. The metadata of the location-related data file 151 is composed of the file name (including the path) of the file 111, offset of each item of the thumbnail data 81 in the file 111, and the data size of each item of the thumbnail data 81 in the file 111.

The offset in the metadata indicates the amount of data from the beginning of the file 111 to the beginning of the thumbnail data 81 referred to from the metadata. The data size in the metadata indicates the data amount of the thumbnail data 81 referred to from the metadata.

The layout on the disk 45 of the MPEG2 system stream and the thumbnail data 81 recorded on the disk 45 will now be described.

The MPEG2 system stream is recorded in a contiguous area on the disk 45 at predetermined intervals for playing back the moving image of the MPEG2 system stream.

Figure 14:
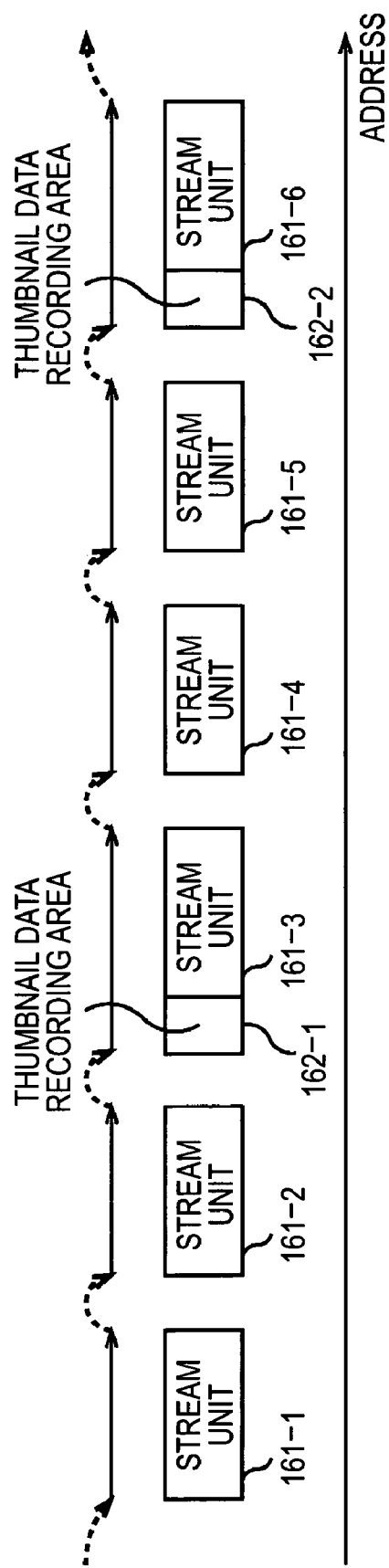
FIG. 14 is a diagram depicting thumbnail data recording areas in which thumbnail data is recorded.

A stream unit 161-1 to a stream unit 161-6 shown in FIG. 14 indicate units in which the MPEG2 system stream is recorded, i.e., predetermined time intervals of 10 second to 20 second, for playing back the moving image. The MPEG2 system stream is divided into one recording unit (e.g., any of the stream unit 161-1 to stream unit 161-6) at predetermined intervals for playing back the moving image and is recorded on the disk 45. In other words, each of the stream unit 161-1 to the stream unit 161-6 is data of the moving image generated by dividing the moving image at predetermined intervals for playing back the moving image.

Hereinafter, the stream unit 161-1 to the stream unit are referred to just as the stream unit 161 if it is not necessary to differentiate them from one another.

The stream unit 161 is recorded in one contiguous area on the disk 45.

As shown in FIG. 14, the thumbnail data 81 is recorded in a thumbnail data recording area 162-1 and a thumbnail data recording area 162-2, which are areas contiguous to the respective stream units 161. For example, the thumbnail data recording area 162-1 and the thumbnail data recording area 162-2 are provided adjacent to the front portions of the respective stream units 161 at the physical address of the disk 45.

By doing so, when the thumbnail data 81 is read out and then the stream unit 161 is read out, the stream unit 161 can be read out immediately after the thumbnail data 81 has been read out, without requiring a seek time or disk rotational latency. This technique allows the number of seek operations or the number of rotational delays in a case where the thumbnail data 81 is recorded to be the same as the number of seek operations or the number of rotational delays in a case where the thumbnail data 81 is not recorded. Thus, this recording technique is suitable if the disk 45 is a disk having a relatively longer access time (seek or rotational latency), such as an optical disk.

Hereinafter, the thumbnail data recording area 162-1 and the thumbnail data recording area 162-2 are referred to just as the thumbnail data recording area 162 if it is not necessary to differentiate them from each other.

Figure 15:
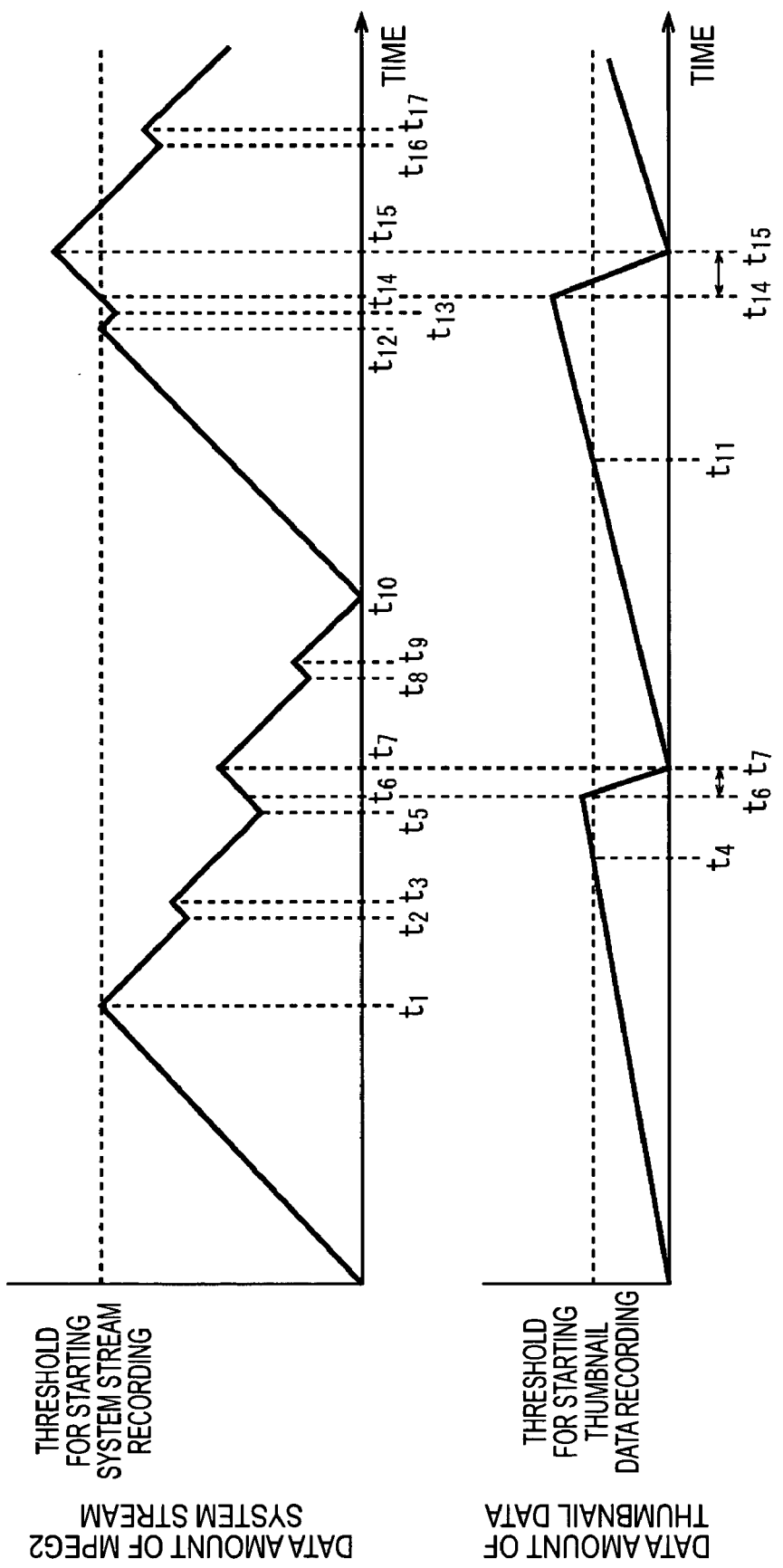
FIG. 15 is a diagram depicting the process of recording thumbnail data 81 adjacent to a stream unit on a disk.

FIG. 15 is a diagram depicting the process of recording the thumbnail data 81 adjacent to the stream unit 161 on the disk 45.

The buffer memory 43 is provided with a buffer for storing the MPEG2 system stream and a buffer for storing the thumbnail data 81 individually. For example, the two buffers in the buffer memory 43 may be provided as separate hardware devices. Alternatively, the two buffers may be logically provided by dividing an area into two at a predetermined address of the buffer memory 43 in the form of a single hardware device.

The upper graph in FIG. 15 depicts a time-lapse change in the amount of buffered MPEG2 system stream data, and the lower graph in FIG. 15 depicts a time-lapse change in the amount of buffered thumbnail data 81. The vertical axis in FIG. 15 denotes the amount of data, and the horizontal axis in FIG. 15 denotes time.

When time t1 is reached a predetermined time after recording has been started, the amount of buffered MPEG2 system stream data is equal to or larger than the threshold for starting system stream recording. Therefore, recording of the buffered MPEG2 system stream onto the disk 45 as the stream unit 161-1 is started. At time t2, since recording of the MPEG2 system stream has reached the end of the stream unit 161-1, a seek operation is performed or disk rotation is awaited during the period from time t2 to time t3. Thereafter, recording of the buffered MPEG2 system stream in the subsequent stream unit 161-2 is started at time t3.

It is assumed that the amount of buffered thumbnail data 81 is equal to or larger than the threshold for starting thumbnail data recording at time t4, at which the MPEG2 system stream is being recorded in the stream unit 161-2. While recording the MPEG2 system stream on the disk 45, the recording apparatus does not monitor the amount of thumbnail data 81.

Since recording of the MPEG2 system stream has reached the end of the stream unit 161-2 at time t5, the recording apparatus determines at time t5 whether the amount of buffered thumbnail data 81 is equal to or larger than the threshold for starting thumbnail data recording.

Since the amount of thumbnail data 81 is equal to or larger than the threshold for starting thumbnail data recording at time t5, a seek operation is performed or disk rotation is awaited based on the determination result during the period from time t5 to time t6, and at time t6, recording of the buffered thumbnail data 81 in the thumbnail data recording area 162-1 is started.

As described with reference to FIG. 5, the thumbnail data 81 is recorded on the disk 45 in one cluster as the unit in which error correction is carried out by the ECC. In this case, if the thumbnail data 81 is smaller than 12 kilobytes, any data string is added to the thumbnail data 81 smaller than 12 kilobytes to increase the size to 12 kilobytes.

The thumbnail data recording area 162-1 is a contiguous area composed of one or a plurality of clusters, and one or a plurality of items of thumbnail data 81 is recorded in the thumbnail data recording area 162-1.

Since recording of the thumbnail data 81 in the thumbnail data recording area 162-1 is ended at time t7, recording of the buffered MPEG2 system stream in the stream unit 161-3 subsequent to the thumbnail data recording area 162-1 is started.

Since recording of the MPEG2 system stream has reached the end of the stream unit 161-3 at time t8, a seek operation is performed or disk rotation is awaited during the period from time t8 to time t9, and at time t9, recording of the buffered MPEG2 system stream in the subsequent stream unit 161-4 is started.

Since the amount of buffered MPEG2 system stream is equal to or smaller than one cluster at time t10, recording of the MPEG2 system stream in the stream unit 161-4 is suspended, and a standby mode continues until the buffer is filled with the MPEG2 system stream.

It is assumed that the amount of buffered thumbnail data 81 is equal to or larger than the threshold for starting thumbnail data recording at time t11, at which recording the MPEG2 system stream in the stream unit 161-4 is suspended. While recording the MPEG2 system stream is suspended, the recording apparatus does not monitor the amount of thumbnail data 81.

At time t12, since the amount of buffered MPEG2 system stream is equal to or larger than the threshold for starting system stream recording, the suspended recording of the buffered MPEG2 system stream in the stream unit 161-4 is resumed.

When recording of the MPEG2 system stream has reached the end of the stream unit 161-4 at time t13, the recording apparatus determines whether the amount of buffered thumbnail data 81 is equal to or larger than the threshold for starting thumbnail data recording.

Since the amount of thumbnail data 81 is equal to or larger than the threshold for starting thumbnail data recording at time t13, a seek operation is performed or disk rotation is awaited based on the determination result during the period from time t13 to time t14, and at time t14, recording of the buffered thumbnail data 81 in the thumbnail data recording area 162-2 is started.

Since recording of the thumbnail data 81 in the thumbnail data recording area 162-2 is ended at time t15, recording of the buffered MPEG2 system stream in the stream unit 161-5 subsequent to the thumbnail data recording area 162-2 is started.

When the thumbnail data 81 is to be recorded in the thumbnail data recording area 162-2, the thumbnail data 81 smaller than 12 kilobytes is padded with any data string, as in the thumbnail data recording area 162-1, so that the size is increased to 12 kilobytes and then each item of the thumbnail data 81 is recorded in one cluster. The thumbnail data recording area 162-2 is a contiguous area composed of one or a plurality of clusters, and one or a plurality of items of thumbnail data 81 is recorded in the thumbnail data recording area 162-2.

At time t16, since recording of the MPEG2 system stream has reached the end of the stream unit 161-5, a seek operation is performed or disk rotation is awaited during the period from time t16 to time t17. Thereafter, recording of the buffered MPEG2 system stream in the subsequent stream unit 161-6 is started at time t17.

Alternatively, recording may be performed at a position away from the stream unit 161 where the thumbnail data recording areas 162 are adjacent to each other.

Figure 16:
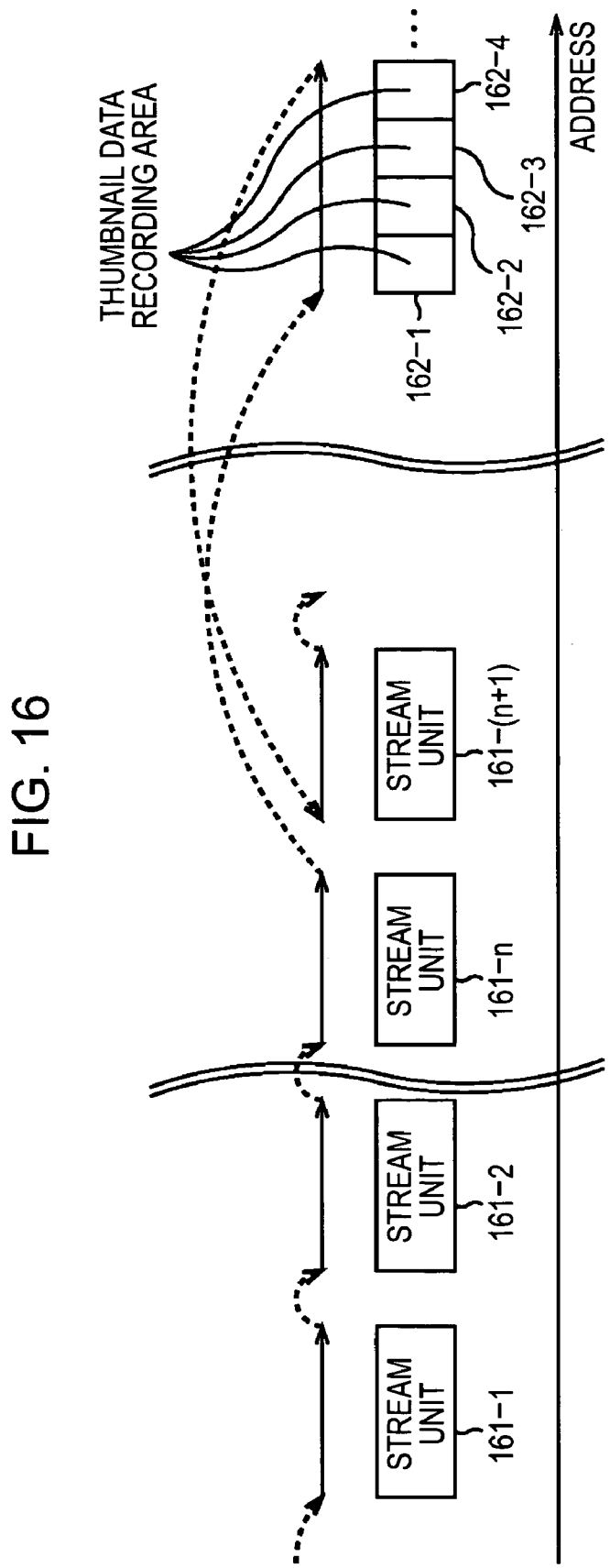
FIG. 16 is a diagram depicting a thumbnail data recording area in which thumbnail data is recorded.

FIG. 16 is a diagram depicting an example of thumbnail data recording areas 162 in which adjacent recording is performed. Thumbnail data recording area 162-1 to thumbnail data recording area 162-4 are provided adjacent to each other at a position away from the stream unit 161-1 to the stream unit 161-(*n*+1).

By doing so, even when many items of thumbnail data 81 are read out from the disk 45, many items of thumbnail data 81 can be read out quickly from the disk 45, without requiring a seek time or disk rotational latency. Although this technique causes the number of seek operations or the number of rotational delays in a case where the thumbnail data 81 is recorded to become larger than the number of seek operations or the number of rotational delays in a case where the thumbnail data 81 is not recorded, the thumbnail data 81 can be read out by sequentially accessing a plurality of thumbnail data recording areas 162. Thus, this recording technique is suitable if the disk 45 is a disk having a relatively short access time (seek or rotational latency), such as a hard disk.

Figure 17:
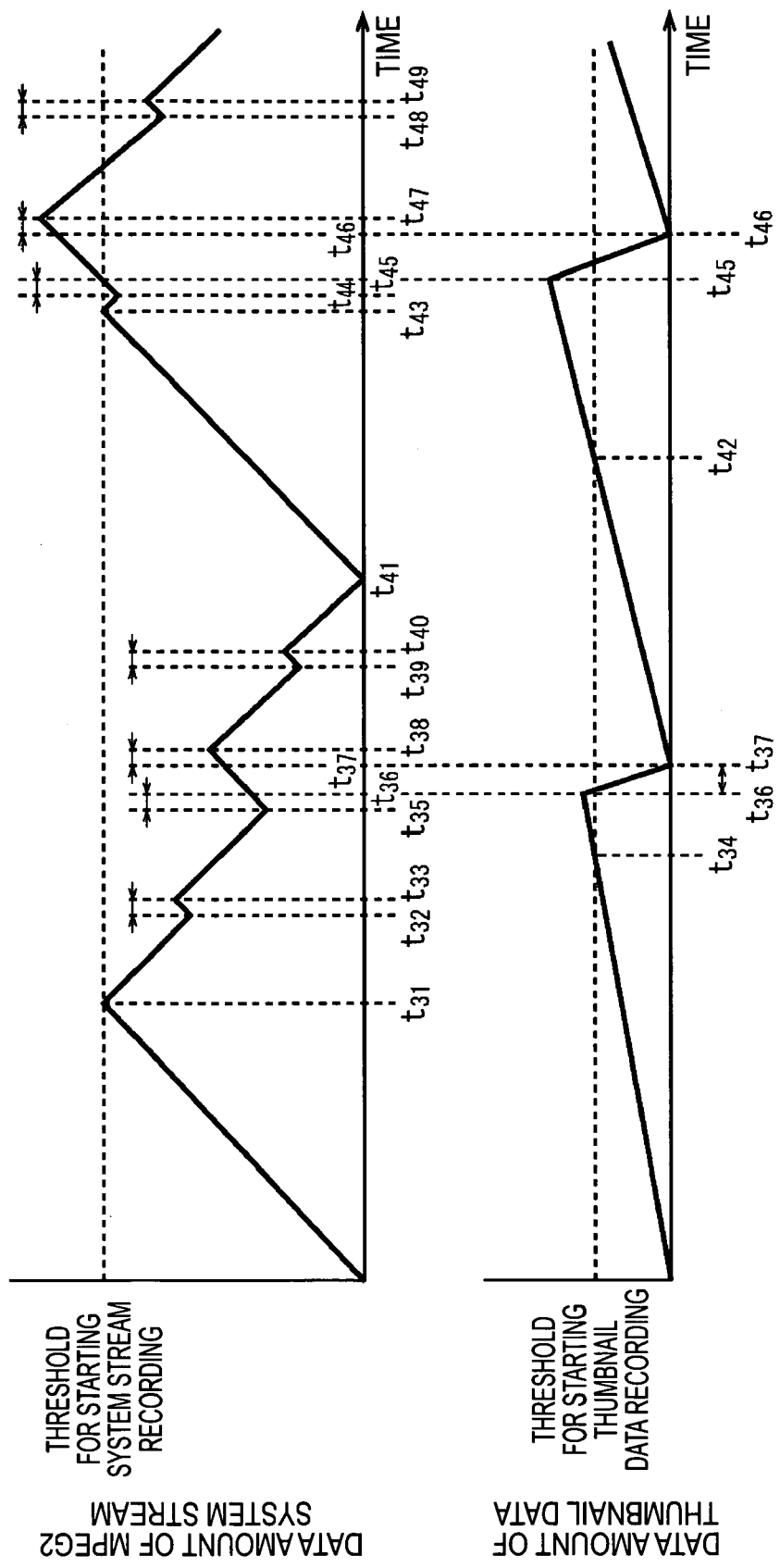
FIG. 17 is a diagram depicting the process of recording onto a disk in a case where thumbnail data are recorded together at a position away from a stream unit.

FIG. 17 is a diagram depicting the process of recording onto the disk 45 in a case where the thumbnail data 81 are recorded together at a position away from the stream unit 161. Also in this case, the buffer memory 43 is provided with a buffer for storing the MPEG2 system stream and a buffer for storing the thumbnail data 81 individually.

The upper graph in FIG. 17 depicts a time-lapse change in the amount of buffered MPEG2 system stream data, and the lower graph in FIG. 15 depicts a time-lapse change in the amount of buffered thumbnail data 81. The vertical axis in FIG. 17 denotes the amount of data, and the horizontal axis in FIG. 15 denotes time.

When time t31 is reached a predetermined time after recording has been started, the amount of buffered MPEG2 system stream data is equal to or larger than the threshold for starting system stream recording. Therefore, recording of the buffered MPEG2 system stream onto the disk 45 as the stream unit 161-1 is started. At time t32, since recording of the MPEG2 system stream has reached the end of the stream unit 161-1, a seek operation is performed or disk rotation is awaited during the period from time t32 to time t33. Thereafter, recording of the buffered MPEG2 system stream in the subsequent stream unit 161-2 is started at time t33.

It is assumed that the amount of buffered thumbnail data 81 is equal to or larger than the threshold for starting thumbnail data recording at time t34, at which the MPEG2 system stream is being recorded in the stream unit 161-2. While recording the MPEG2 system stream on the disk 45, the recording apparatus does not monitor the amount of thumbnail data 81.

Since recording of the MPEG2 system stream has reached the end of the stream unit 161-2 at time t35, the recording apparatus determines at time t35 whether the amount of buffered thumbnail data 81 is equal to or larger than the threshold for starting thumbnail data recording.

Since the amount of thumbnail data 81 is equal to or larger than the threshold for starting thumbnail data recording at time t35, a seek operation is performed based on the determination result during the period from time t35 to time t36, and at time t36, recording of the buffered thumbnail data 81 in the thumbnail data recording area 162-1 is started.

Also in this case, as described with reference to FIG. 5, the thumbnail data 81 is recorded on the disk 45 in one cluster as the unit in which error correction is carried out by the ECC such that the cluster is padded. The thumbnail data recording area 162-1 is a contiguous area composed of one or a plurality of clusters, and one or a plurality of items of thumbnail data 81 is recorded in the thumbnail data recording area 162-1.

Since recording of the thumbnail data 81 in the thumbnail data recording area 162-1 is ended at time t37, a seek operation is performed during the period from time t37 to time t38 and at time t38, recording of the buffered MPEG2 system stream in the stream unit 161-3 at a position away from the thumbnail data recording area 162-1 is started.

Since recording of the MPEG2 system stream has reached the end of the stream unit 161-3 at time t39, a seek operation is performed or disk rotation is awaited during the period from time t39 to time t40, and at time t40, recording of the buffered MPEG2 system stream in the subsequent stream unit 161-4 is started.

Since the amount of buffered MPEG2 system stream is equal to or smaller than one cluster at time t41, recording of the MPEG2 system stream in the stream unit 161-4 is suspended, and a standby mode continues until the buffer is filled with the MPEG2 system stream.

It is assumed that the amount of buffered thumbnail data 81 is equal to or larger than the threshold for starting thumbnail data recording at time t42, at which recording the MPEG2 system stream in the stream unit 161-4 is suspended. While recording the MPEG2 system stream is suspended, the recording apparatus does not monitor the amount of thumbnail data 81.

At time t43, since the amount of buffered MPEG2 system stream is equal to or larger than the threshold for starting system stream recording, the suspended recording of the buffered MPEG2 system stream in the stream unit 161-4 is resumed.

When recording of the MPEG2 system stream has reached the end of the stream unit 161-4 at time t44, the recording apparatus determines whether the amount of buffered thumbnail data 81 is equal to or larger than the threshold for starting thumbnail data recording.

Since the amount of thumbnail data 81 is equal to or larger than the threshold for starting thumbnail data recording at time t44, a seek operation is performed based on the determination result during the period from time t44 to time t45, and at time t45, recording of the buffered thumbnail data 81 in the thumbnail data recording area 162-2 is started.

Since recording of the thumbnail data 81 in the thumbnail data recording area 162-2 is ended at time t46, a seek operation is performed during the period from time t46 to time t47, and at time t47, recording of the buffered MPEG2 system stream in the stream unit 161-5 at a position away from the thumbnail data recording area 162-2 is started.

At time t48, since recording of the MPEG2 system stream has reached the end of the stream unit 161-5, a seek operation is performed or disk rotation is awaited during the period from time t48 to time t49. Thereafter, recording of the buffered MPEG2 system stream in the subsequent stream unit 161-6 is started at time t49.

Processing by the recording apparatus will now be described with reference to a flowchart.

Figure 18:
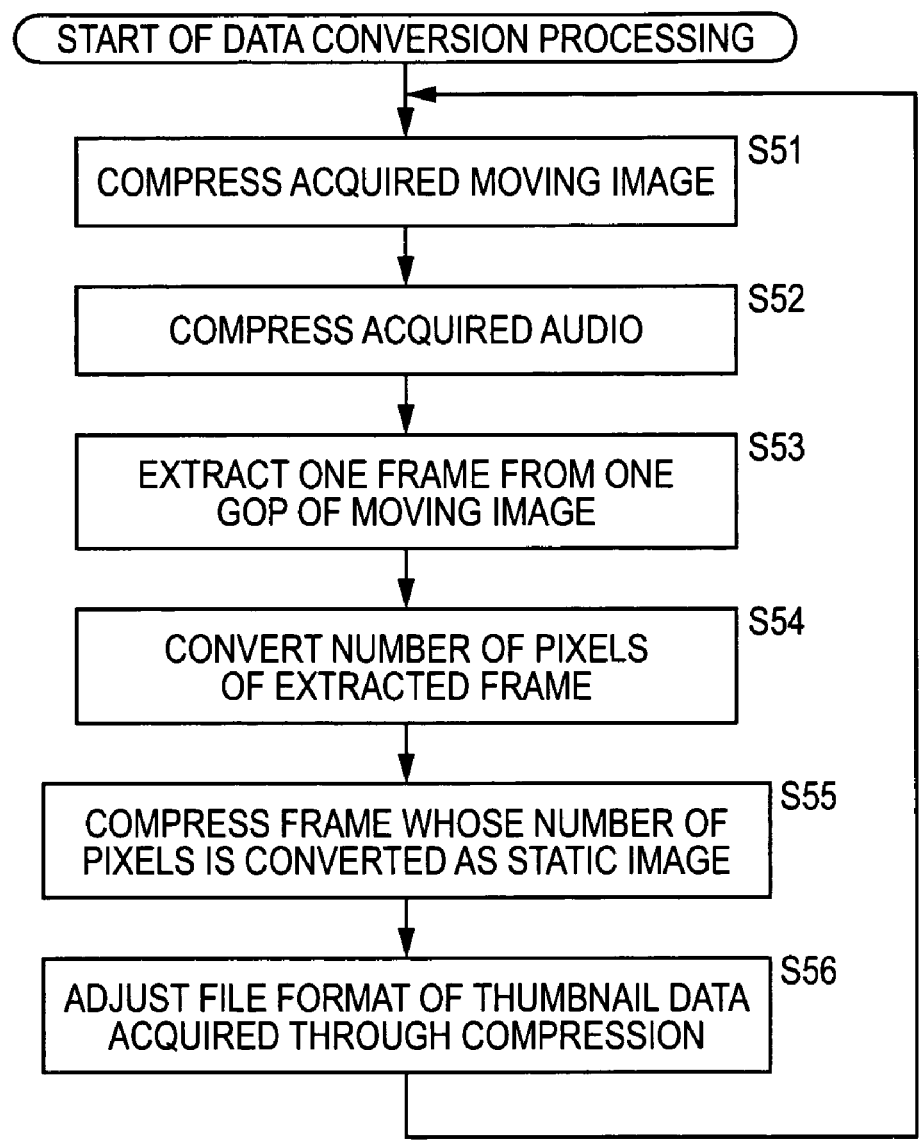
FIG. 18 is a flowchart illustrating data conversion processing.

FIG. 18 is a flowchart illustrating the process of converting data by the recording apparatus. In step S51, the moving-image compression section 38 compresses the acquired moving image in accordance with the MPEG2 technique. In step S52, the audio compression section 42 compresses the acquired sound in accordance with the AC3 technique.

In step S53, from the moving image data stored in the buffer memory 35, the extraction section 51 of the number-of-pixels conversion section 40 extracts one picture (frame) from one GOP of the moving image to be compressed in the moving-image compression section 38. For example, if the number of pictures (frames) constituting a GOP is predetermined in the moving-image compression section 38, one picture (frame) is extracted for the number of pictures (frames). Furthermore, for example, the extraction section 51 may extract one picture (frame) from one GOP of the moving image based on a signal indicating the boundary between GOPs from the moving-image compression section 38.

In step S54, the number-of-pixels conversion section 40 converts the number of pixels of the extracted frame. In step S54, from among the pixels of the extracted frame, the number-of-pixels conversion section 40 converts the number of pixels of the extracted frame by, for example, thinning out pixels at predetermined positions on the frame. More specifically, in step S54, the number-of-pixels conversion section 40 calculates the mean value of the pixel values of four pixels, adjacent to one another, composed of two pixels in the vertical direction and two pixels in the horizontal direction from among the pixels of the extracted frame and then thins out three pixels from the four pixels by setting the calculated mean value to one pixel replacing the four pixels to convert the number of pixels of the frame.

In step S54, the number-of-pixels conversion section 40 can perform conversion to produce a frame composed of any number of pixels and, therefore, the number of pixels of a resultant frame does not limit the present invention.

In step S55, the static-image compression section 41 compresses the frame whose number of pixels has been converted as a static image in accordance with the JPEG technique to generate thumbnail data. The static-image compression section 41 stores the generated thumbnail data in the buffer memory 43.

In step S56, the microcomputer 31 adjusts the file format of the thumbnail data acquired through compression. For example, in step S56, the microcomputer 31 can adjust the file format of the thumbnail data acquired through compression to the PLF format, file format referred to from the file 101 in PLF format, static image package format, or the location-related data file 141 referred to from the track management file 131.

If the thumbnail data is adjusted to a file format referred to from another file, the microcomputer 31 generates a file for referring to the thumbnail data and the generated file is also recorded on the disk 45 as thumbnail data.

Although, in the above description, the processing from step S51 to step S55 is carried out by the moving-image compression section 38 to the audio compression section 42 and the extraction section 51, the microcomputer 31 may carry out the processing from step S51 to step S55 by executing the control program.

Figure 19:
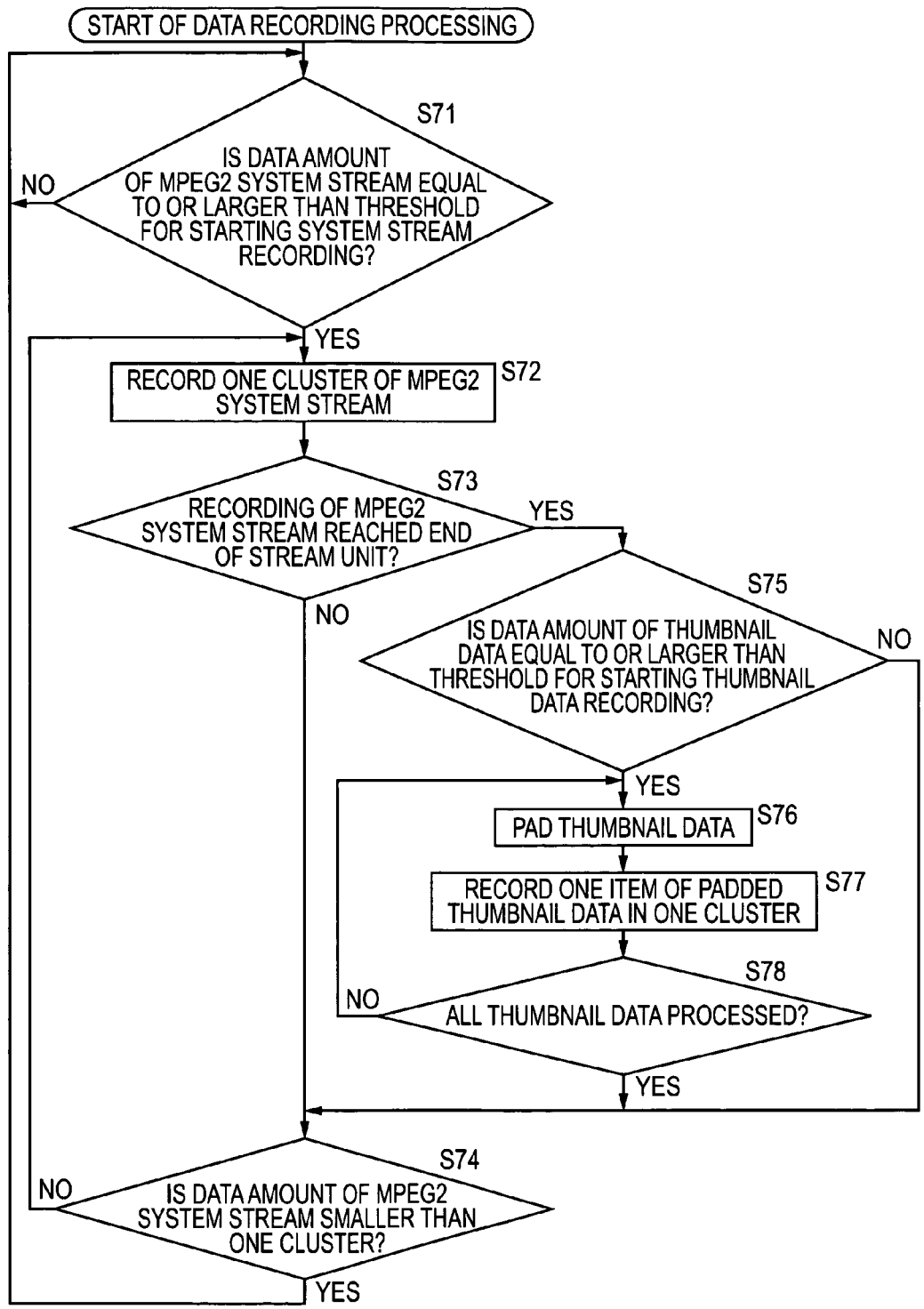
FIG. 19 is a flowchart illustrating data recording processing.

FIG. 19 is a flowchart for illustrating the process of recording data by the microcomputer 31 for executing the control program. In step S71, the control program acquires the amount of stored MPEG2 system stream data from the buffer memory 43 and determines whether the amount of MPEG2 system stream data stored in the buffer memory 43 is equal to or larger than a predetermined threshold for starting system stream recording.

If it is determine in step S71 that the amount of MPEG2 system stream data stored in the buffer memory 43 is below the threshold for starting system stream recording, the procedure returns to step S71, where the determination processing is repeated until the amount of MPEG2 system stream data is equal to or larger than the threshold for starting system stream recording.

If it is determined in step S71 that the amount of the MPEG2 system stream data stored in the buffer memory 43 is equal to or larger than the threshold for starting system stream recording, the flow proceeds to step S72, where the control program causes the drive 44 to record onto the disk one cluster of MPEG2 system stream stored in the buffer memory 43.

In step S73, the control program determines whether recording of the MPEG2 system stream has reached the end of the stream unit. If it is determined that the recording of the MPEG2 system stream has not reached the end of the stream unit, the flow proceeds to step S74. In step S74, the control program determines whether the amount of MPEG2 system stream data stored in the buffer memory 43 is below one cluster.

If it is determined in step S74 that the amount of MPEG2 system stream data stored in the buffer memory 43 is not below one cluster, it means that the MPEG2 system stream can further be stored in the stream unit. Therefore, the flow returns to step S72, where the process of recording the MPEG2 system stream onto the cluster is repeated.

As a result of the processing from step S72 to step S74 being repeated, the MPEG2 system stream is recorded up to the end of the stream unit.

If it is determined in step S74 that the amount of MPEG2 system stream data stored in the buffer memory 43 is below one cluster, no more of the MPEG2 system stream can be recorded in the stream unit. As a result, the flow returns to step S71 to continue a standby mode until the buffer memory 43 is filled with the MPEG2 system stream, and the above-described processing is repeated.

When the MPEG2 system stream is recorded halfway in the stream unit and the procedure returns to step S71 as a result of the determination in step S74, the MPEG2 system stream is recorded, in the processing of the subsequent step S72, following the stream unit in which the MPEG2 system stream has been recorded halfway.

On the other hand, if it is determined in step S73 that recording of the MPEG2 system stream has reached the end of the stream unit, the flow proceeds to step S75, where the control program determines whether the amount of thumbnail data is equal to or larger than a predetermined threshold for starting thumbnail data recording. If it is determined in step S75 that the amount of thumbnail data is equal to or larger than the threshold for starting thumbnail data recording, the flow proceeds to step S76, where the control program pads the thumbnail data such that one item of thumbnail data is the same size as the unit in which error correction is carried out by the ECC, for example, 12 kilobytes.

In step S77, the control program causes the drive 44 to record one padded item of thumbnail data in one cluster of the disk 45.

In step S78, the control program determines whether there is no more thumbnail data stored in the buffer memory 43. If it is determined that there remains thumbnail data stored in the buffer memory 43, the flow returns to step S76 to further record the thumbnail data in the thumbnail data recording area 162, which is a contiguous area, and the process of recording the thumbnail data is repeated.

If it is determined in step S78 that there is no more thumbnail data stored in the buffer memory 43, no more of the thumbnail data can be recorded. Therefore, the flow proceeds to step S74, where the process of determining whether the MPEG2 system stream which can be recorded on the disk 45 is stored in the buffer memory 43 is carried out and the above-described processing is repeated.

If it is determined in step S75 that the amount of thumbnail data is below the threshold for starting thumbnail data recording, it is not necessary to record thumbnail data on the disk 45, and the flow proceeds to step S74, where the process of determining whether the MPEG2 system stream which can be recorded on the disk 45 is stored in the buffer memory 43 is carried out and the above-described processing is repeated.

As described above, with the recording apparatus, thumbnail data corresponding to the frame extracted from a unit composed of a plurality of frames (pictures), i.e., the unit in which a moving image is encoded, is recorded on the disk 45 in association with the extracted unit.

Next, a playback apparatus for reading out thumbnail data from the disk 45 on which thumbnail data corresponding to the frame extracted from a unit composed of a plurality of frames (pictures), i.e., the unit in which a moving image is encoded, is recorded will be described.

The playback apparatus for reading out thumbnail data from the disk 45 can be realized as a recording and playback apparatus including the functions correspond to the recording apparatus whose structure has been described with reference to FIG. 3.

Figure 20:
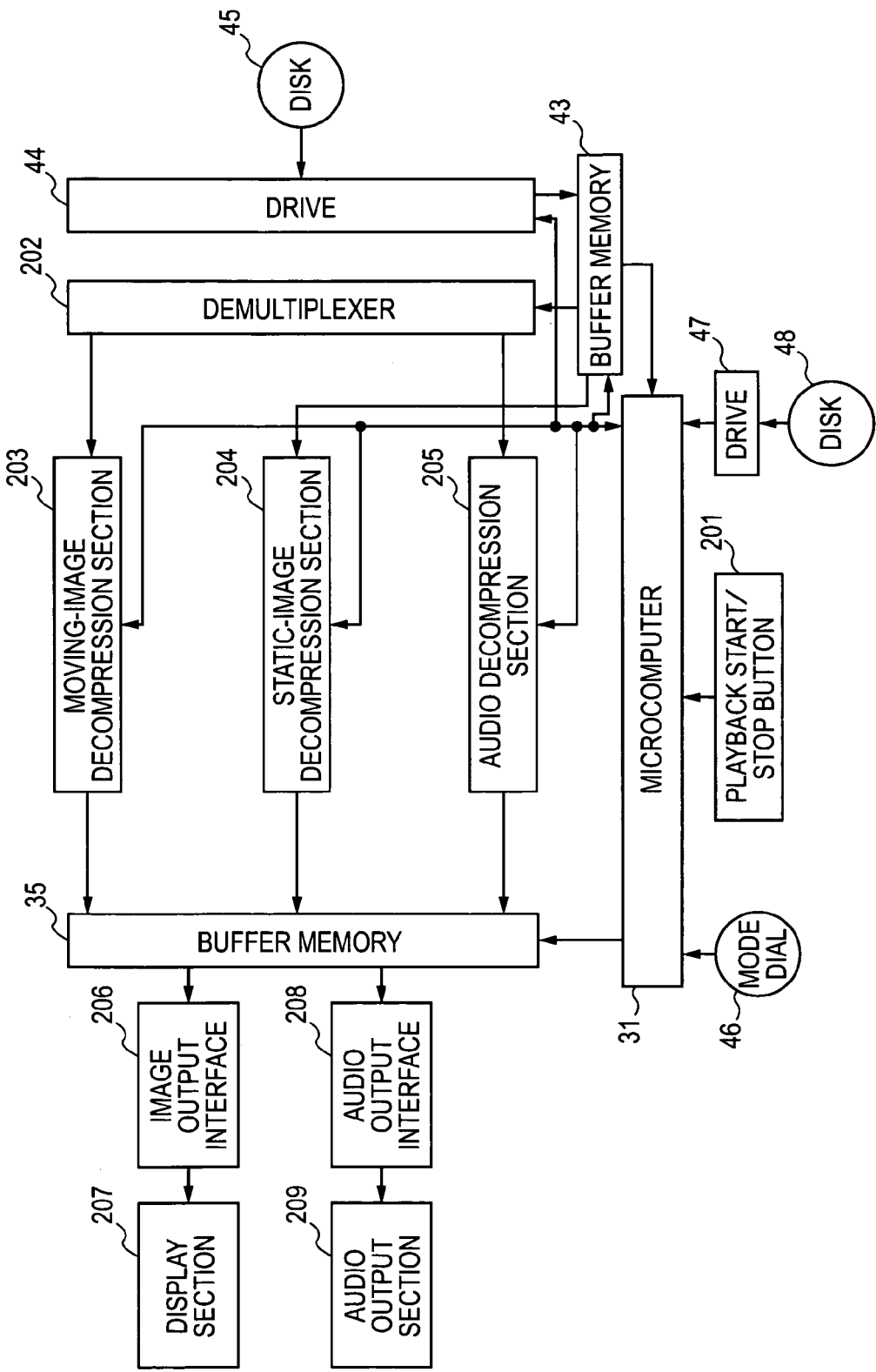
FIG. 20 is a block diagram depicting a structure of one embodiment of a playback block in a recording and playback apparatus according to the present invention.

FIG. 20 is a block diagram depicting a structure of one embodiment of a playback block in a recording and playback apparatus according to the present invention, where the recording and playback apparatus includes the functions of the recording apparatus whose structure has been described with reference to FIG. 3. The same components as those shown in FIG. 3 are denoted by the same symbols, and thus a description thereof will be omitted.

The microcomputer 31 executes the predetermined control program to issue a command for operation to each section of the playback block in the recording and playback apparatus based on a signal from the playback start/stop button 201 according to an operation of the user.

Under the control of the microcomputer 31, the drive 44 reads out an MPEG2 system stream and thumbnail data from the mounted disk 45. The drive 44 stores the read-out MPEG2 system stream and thumbnail data in the buffer memory 43.

A demultiplexer 202 separates moving image data and audio data multiplexed in the MPEG2 system stream stored in the buffer memory 43, supplies the separated moving image data to a moving-image decompression section 203, and furthermore, supplies the separated audio data to an audio decompression section 205.

Under the control of the microcomputer 31, the moving-image decompression section 203 performs decompression by decoding the moving image data supplied from the demultiplexer 202, which is compressed and encoded through a predetermined technique for compressing and encoding moving image data, and supplies the decoded moving image data to the buffer memory 35. For example, the moving-image decompression section 203 decodes the moving image data compressed and encoded in accordance with the MPEG2 technique and supplies the decoded moving image data (so-called, baseband moving image data) to the buffer memory 35.

Under the control of the microcomputer 31, a static-image decompression section 204 acquires thumbnail data from the buffer memory 43 storing the thumbnail data, performs decompression by decoding the thumbnail data compressed and encoded in accordance with a predetermined technique for compressing and encoding static image data, and supplies the decoded thumbnail data to the buffer memory 35. For example, the static-image decompression section 204 decodes thumbnail data compressed and encoded in accordance with the JPEG technique and supplies the decoded thumbnail data to the buffer memory 35.

Under the control of the microcomputer 31, the audio decompression section 205 performs decompression by decoding the audio data supplied from the demultiplexer 202, which is compressed and encoded through a predetermined technique for compressing and encoding audio data, and supplies the decoded audio data to the buffer memory 35. For example, the audio decompression section 205 decodes audio data compressed and encoded in accordance with the AC3 technique and supplies the decoded audio data to the buffer memory 35.

An image output interface 206 is an interface between the buffer memory 35 and a display section 207, performs, for example, parallel-to-serial conversion of the image data supplied from the buffer memory 35 to convert the image data into image data (image signal) in predetermined format that can be used by the display section 207, and supplies the resultant image data to the display section 207. The image output interface 206 controls display of the image in the display section 207.

The display section 207 includes, for example, a liquid crystal display unit or an organic EL (Electro Luminescence) display unit and displays moving images and static images based on image data supplied through the image output interface 206.

An audio output interface 208 is an interface between the buffer memory 35 and an audio output section 209, performs, for example, parallel-to-serial conversion or digital-to-analog conversion of the audio data supplied from the buffer memory 35 to convert the audio data into audio data (audio signal) in predetermined format that can be used by the audio output section 209, and supplies the resultant audio data (audio signal) to the audio output section 209.

The audio output section 209 includes an audio amplifier or a loudspeaker and outputs sound based on audio data (audio signal) supplied through the audio output interface 208.

Figure 21:
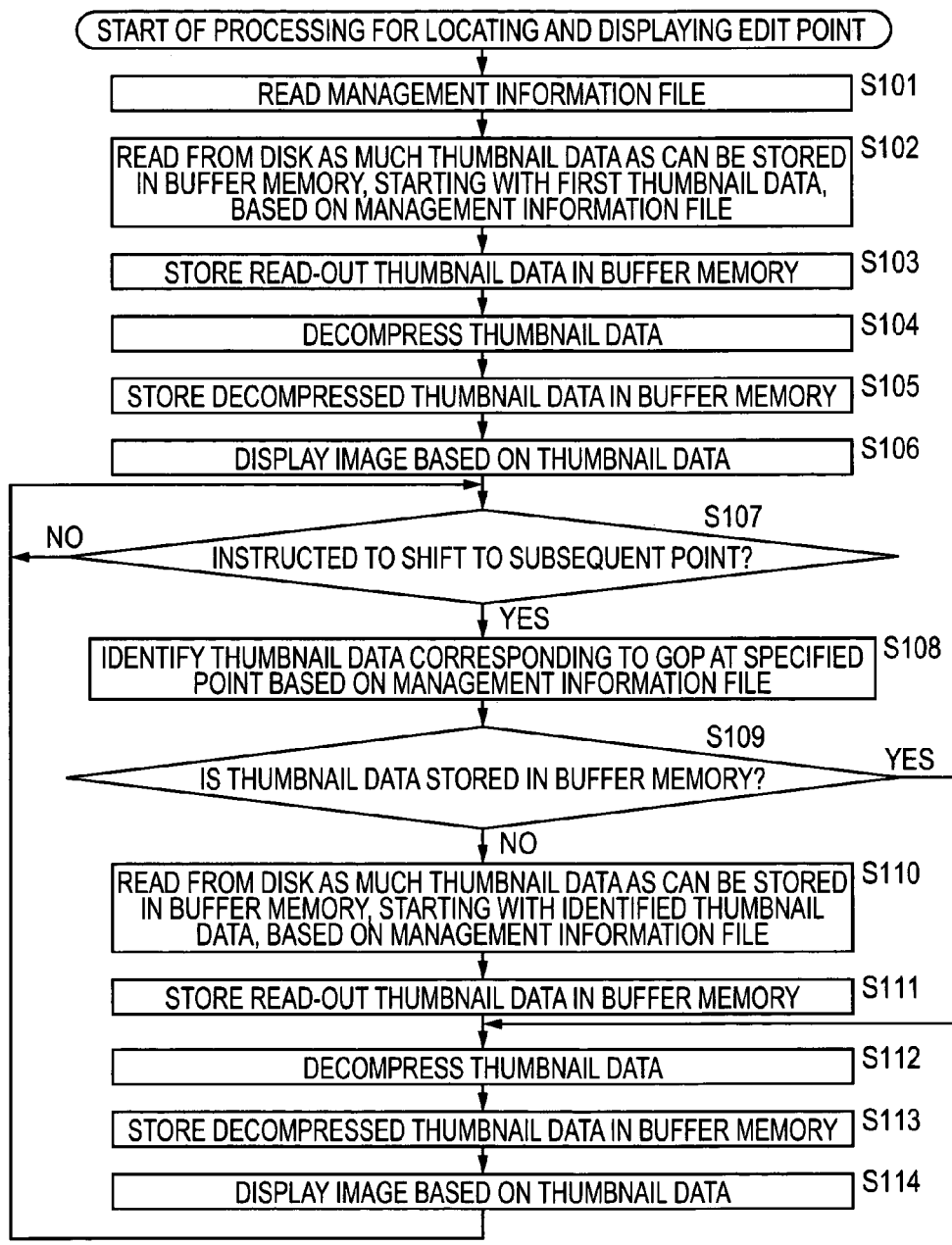
FIG. 21 is a flowchart illustrating the process of locating and displaying an edit point.

FIG. 21 is a flowchart illustrating the process of locating and displaying an edit point by the microcomputer 31 for executing the control program, the static-image decompression section 204, and the display section 207.

In step S101, the control program causes the drive 44 to read out a management information file from the disk 45. For example, in step S101, the control program causes the drive 44 to read out from the disk 45 the file 101 in PLF format for referring to the thumbnail data 81 stored in an external file or the track management file 131, serving as a management information file, shown in FIG. 10. The drive 44 stores the read-out management information file in the buffer memory 43.

In step S102, the control program causes the drive 44 to read out from the disk 45 as much thumbnail data 81 as can be stored in the buffer memory 43, starting with the first item of thumbnail data 81, based on the management information file acquired from the buffer memory 43.

In step S103, the control program causes the drive 44 to store the read-out thumbnail data 81 in the buffer memory 43. In step S104, the static-image decompression section 204 acquires the thumbnail data 81 from the buffer memory 43 storing the thumbnail data 81 and decompresses the acquired thumbnail data 81. For example, the static-image decompression section 204 performs decompression by decoding the thumbnail data 81 compressed and encoded in accordance with the JPEG technique.

In step S105, the static-image decompression section 204 stores the decompressed thumbnail data 81 in the buffer memory 35. In step S106, the image output interface 206 controls display of the image in the display section 207 based on the thumbnail data 81 acquired from the buffer memory 35 to allow the display section 207 to display the image.

In step S107, the control program determines whether an instruction for shifting to the subsequent point has been issued based on a signal from the playback start/stop button 201 according to an operation of the user. If it is determined in step S107 that no instruction for shifting to the subsequent point has been issued, displaying the image is continued and the flow returns to step S107 to repeat the determination processing.

If it is determined in step S107 that an instruction for shifting to the subsequent point has been issued, the flow proceeds to step S108, where the control program identifies the thumbnail data 81 corresponding to the GOP at the specified point based on the read-out management information file.

In step S109, the control program determines whether the identified thumbnail data 81 is stored in the buffer memory 43. If it is determined in step S109 that the identified thumbnail data 81 is not stored in the buffer memory 43, the flow proceeds to step S110, where the control program causes the drive 44 to read out from the disk 45 as much thumbnail data 81 as can be stored in the buffer memory 43, starting with the identified thumbnail data, based on the management information file acquired from the buffer memory 43.

In step S110, the control program can cause the drive 44 to read out a plurality of items of thumbnail data 81 from one item of thumbnail data recording area 162 on the disk 45 through one processing operation.

As described with reference to FIG. 5, since the thumbnail data 81 increased to 12 kilobytes as a result of any data string being added is recorded on the disk 45 in one cluster as a unit in which error correction is carried out by the ECC, the control program can calculate the physical address of the cluster in which the thumbnail data 81 to be read out subsequently is recorded through a simple arithmetic operation. As a result, the thumbnail data 81 can be read out more quickly.

In step S111, the control program causes the drive 44 to store the read-out thumbnail data 81 in the buffer memory 43, and the procedure proceeds to step S112.

If it is determined in step S109 that the identified thumbnail data 81 is stored in the buffer memory 43, it is not necessary to read the thumbnail data 81 from the disk 45, and therefore, the processing from step S110 and step S111 is skipped and the procedure proceeds to step S112.

In step S112, the static-image decompression section 204 acquires the thumbnail data 81 from the buffer memory 43 storing the thumbnail data 81 and decompresses the acquired thumbnail data 81. For example, the static-image decompression section 204 performs decompression by decoding the thumbnail data 81 compressed and encoded in accordance with the JPEG technique.

In step S113, the static-image decompression section 204 stores the decompressed thumbnail data 81 in the buffer memory 35. In step S114, the display section 207 displays an image based on the thumbnail data 81 acquired from the buffer memory 35 through the image output interface 206.

The procedure returns to step S107, where the processing for reading from the disk 45 the thumbnail data corresponding to a GOP at the point specified according to an instruction from the user, decoding the thumbnail data 81, and displaying an image is repeated.

As described above, if only the thumbnail data 81 is read out from the disk 45, the desired thumbnail can be displayed more quickly. Furthermore, the thumbnail data 81 can be read out from the disk 45 together with the MPEG2 system stream.

Figure 22:
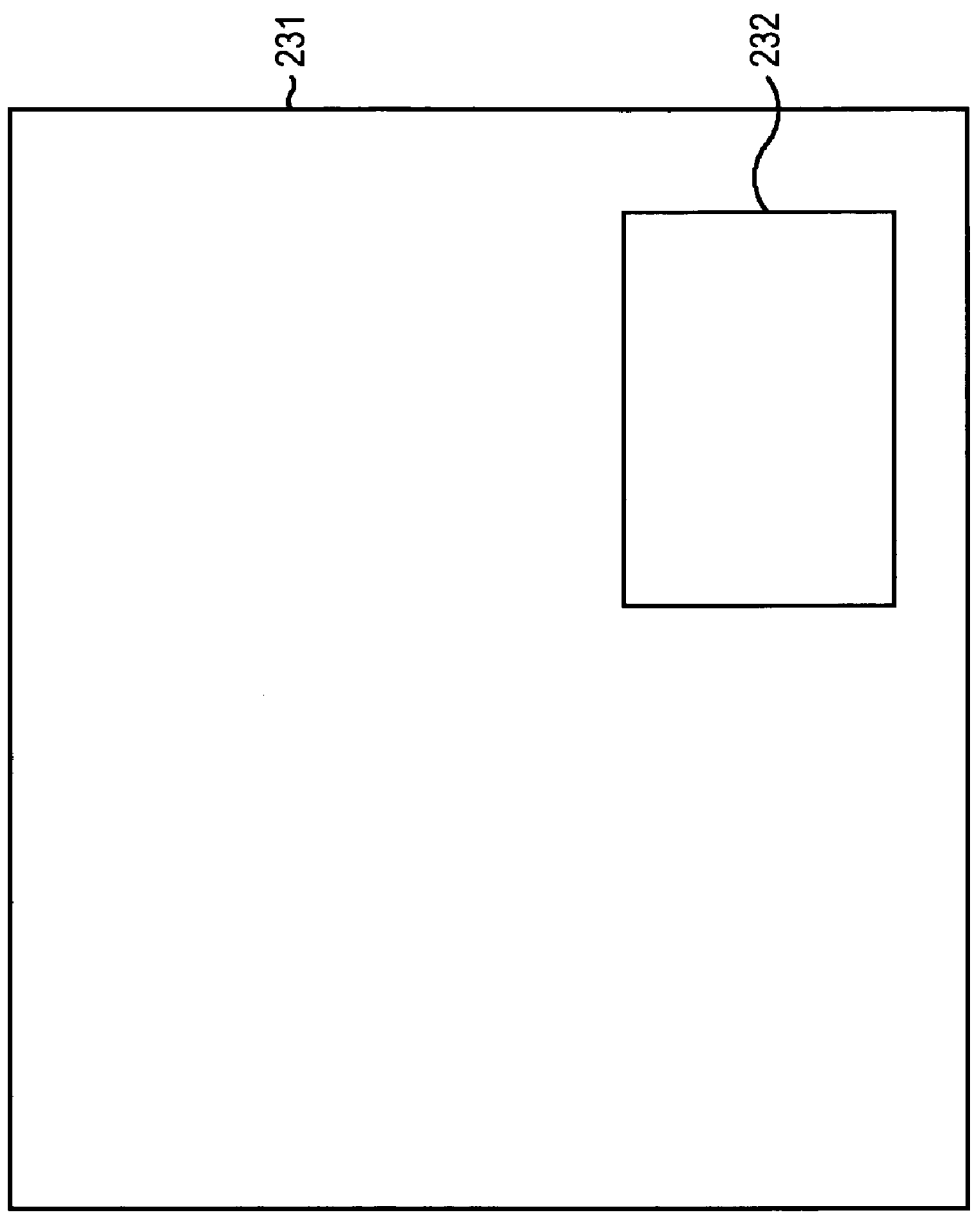
FIG. 22 is a diagram depicting an example of display of a thumbnail.

For example, in the processing of step S114, the display section 207 may display a moving image 231 on the entire screen and, furthermore, display a thumbnail 232 in a partial area of the screen, as shown in FIG. 22. In this case, for example, in the processing of step S114, the display section 207 displays the moving image 231 so that it is played back at a normal speed and furthermore, displays the thumbnail 232 corresponding to the GOP at the specified point in the partial area of the screen.

For example, if an instruction for a fast-forward or rewind operation is issued from the user, the display section 207 displays the moving image 231 so that it is played back at a normal speed and furthermore, displays the thumbnail 232 being fast-forwarded or rewound in the partial area of the screen.

In response to an instruction from the user, the playback apparatus can display on the display section 207 the moving image 231 from the GOP corresponding to the displayed thumbnail 232.

By doing so, the user can quickly perceive the overview of the moving image with the help of the thumbnail 232 corresponding to the GOP at the specified point and furthermore, can view detailed contents of the moving image due to the displayed moving image. As a result, locating the beginning of the moving image at a desired position or positioning an edit point can be quickly carried out.

The process of simultaneously reading out the thumbnail data 81 and the moving image data recorded on the disk 45 by means of the microcomputer 31 executing the control program will be described below.

The control program causes the drive 44 to read out from the disk 45 the track management file 131, serving as a management information file of the MPEG2 system stream, and the file management information of the file system. The control program causes the drive 44 to read out from the disk 45 the MPEG2 system stream in units of the stream unit based on the track management file 131, serving as the management information file of the MPEG2 system stream, and the file management information of the file system.

In this case, the control program allows the drive 44 to continue to read the MPEG2 system stream until reading the MPEG2 system stream from one stream unit 161 is completed. When reading the MPEG2 system stream from the one stream unit 161 is completed, the amount of MPEG2 system stream data stored in the buffer memory 43 is calculated.

The control program acquires the amount of MPEG2 system stream data to be read out subsequently and the playback time of the moving image based on the file in track management file format, serving as the management information file of the MPEG2 system stream, and the file management information of the file system. The control program acquires the physical address of the stream unit 161 in which the MPEG2 system stream to be read out subsequently is recorded and the physical address of the thumbnail data recording area 162 in which the thumbnail data 81 to be read out subsequently is recorded based on the track management file 131, serving as the management information file of the MPEG2 system stream, and the file management information of file system.

The control program calculate the estimated amount of MPEG2 system stream data to be stored in the buffer memory 43 at the time when the MPEG2 system stream is read out from the subsequent stream unit 161, in a case where the control program reads out the MPEG2 system stream from the subsequent stream unit 161 and stores it in the buffer memory 43, based on the amount of MPEG2 system stream data stored in the current buffer memory 43, the track management file 131, and the file management information of the file system. The control program determines whether the calculated and estimated amount of MPEG2 system stream data exceeds the upper limit value of the capacity of the buffer memory 43.

If it is determined that the estimated amount of MPEG2 system stream data exceeds the upper limit value of the capacity of the buffer memory 43, the control program causes the drive 44 to suspend reading the MPEG2 system stream from the stream unit 161 on the disk 45 and causes the drive 44 to read out the thumbnail data 81 from the thumbnail data recording area 162 on the disk 45. Thereafter, when reading the thumbnail data 81 from the thumbnail data recording area is ended, the control program causes the drive 44 to read out the MPEG2 system stream from the stream unit 161 on the disk 45.

On the other hand, if it is determined that the estimated amount of MPEG2 system stream data does not exceed the upper limit value of the capacity of the buffer memory 43, the control program causes the drive 44 to read out the MPEG2 system stream from the stream unit 161 on the disk 45.

As described above, the amount of MPEG2 system stream data expected to be stored in the buffer memory 43 at the time when reading the stream unit 161 of the AMPEG2 system stream to be read out subsequently is ended is obtained at the end of the stream unit 161, and data to be read out subsequently is determined according to the estimated amount of data. Therefore, the number of access operations by the drive 44 is reduced and the amount of data to be read out from the disk 45 per unit time increases, thus increasing the data reading efficiency.

Figure 23:
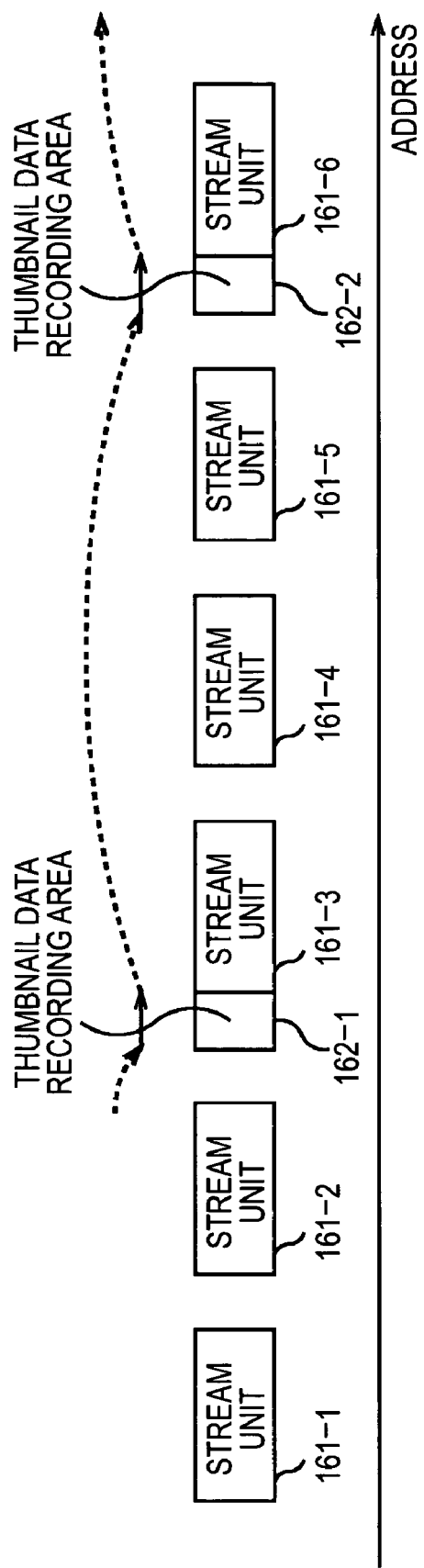
FIG. 23 is a diagram depicting reading out thumbnail data.

As shown in FIG. 14, when the thumbnail data 81 recorded in the thumbnail data recording area 162-1 and the thumbnail data recording area 162-2 is to be read out in a case where the stream unit 161-1 to the stream unit 161-6, as well as the thumbnail data recording area 162-1 and the thumbnail data recording area 162-2, are recorded on the disk 45 such that the thumbnail data recording area 162-1 is adjacent to the stream unit 161-3 and the thumbnail data recording area 162-2 is adjacent to the stream unit 161-6, the thumbnail data 81 recorded in the thumbnail data recording area 162-1, which is a contiguous area, is sequentially read out, and then a head (not shown) of the playback apparatus moves to the thumbnail data recording area 162-2 through a seek operation or a rotational delay of the disk 45 to sequentially read out the thumbnail data 81 recorded in the thumbnail data recording area 162-2, which is a contiguous area, as shown in FIG. 23.

Therefore, the thumbnail data 81 can be read out from the disk 45 very quickly, compared with a case where the stream unit 161-1 to the stream unit 161-6 are sequentially read out.

Figure 24:
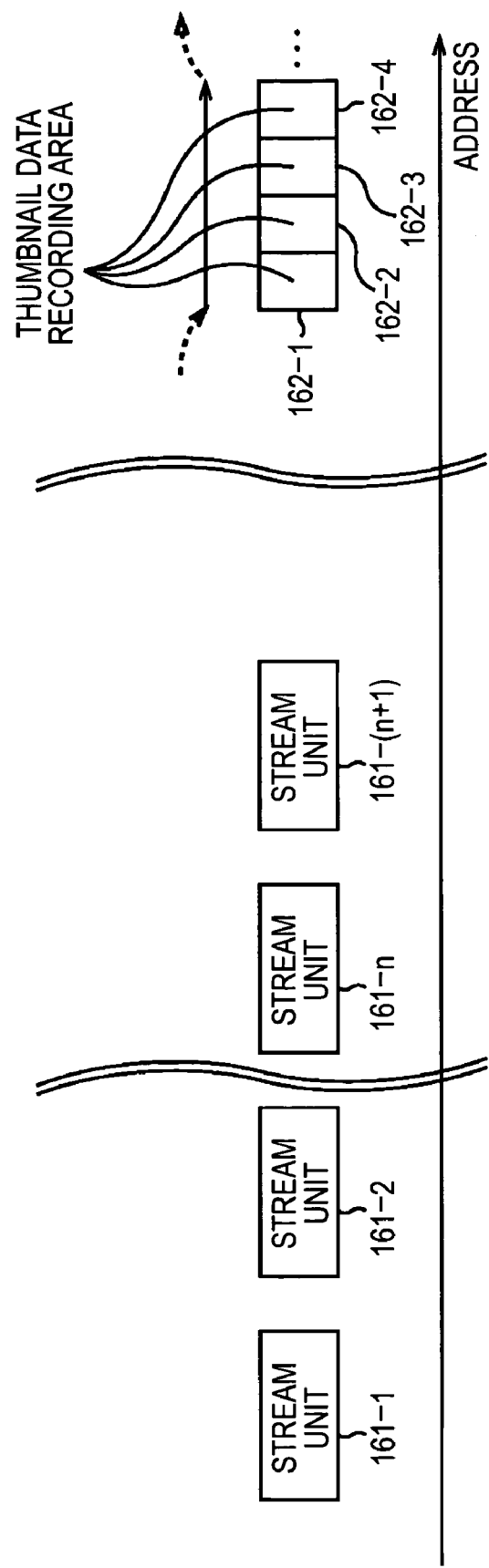
FIG. 24 is a diagram depicting reading out thumbnail data.

Furthermore, as shown in FIG. 16, when the thumbnail data 81 recorded in the thumbnail data recording area 162-1 to thumbnail data recording area 162-4 is to be read out in a case where the stream unit 161-1 to the stream unit 161-($n$+1), as well as the thumbnail data recording area 162-1 to thumbnail data recording area 162-4, are recorded on the disk 45 such that the thumbnail data recording area 162-1 to thumbnail data recording area 162-4 are recorded adjacent to one another at a position away from stream unit 161-1 to stream unit 161-($n$+1), the thumbnail data 81 recorded in the thumbnail data recording area 162-1 to the thumbnail data recording area 162-4 as a contiguous area is sequentially read out without causing a seek operation or rotational delay of the disk 45, as shown in FIG. 24.

Therefore, the thumbnail data 81 can be read out from the disk 45 even more quickly.

Figure 25:
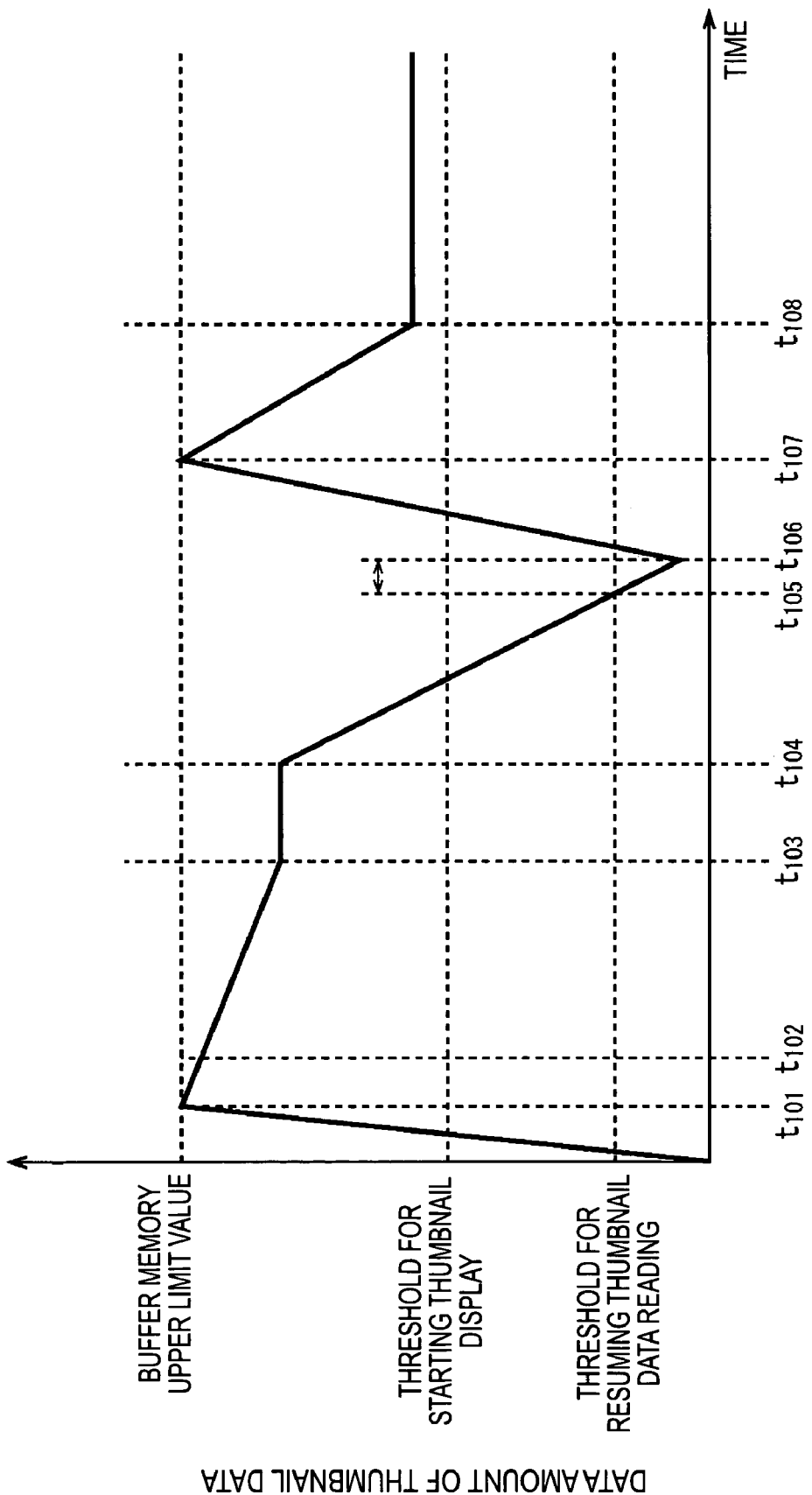
FIG. 25 is a diagram depicting a change in the amount of thumbnail data stored in a buffer memory during a fast-forward operation.

FIG. 25 is a diagram depicting a change in the amount of thumbnail data 81 stored in the buffer memory 43 for a fast-forward operation of thumbnails. The vertical axis in FIG. 25 denotes the amount of data, and the horizontal axis in FIG. 25 denotes time.

Here, the amount of thumbnail data 81 stored in the buffer memory 43 means the amount of data from the thumbnail data 81 for displaying the thumbnail subsequent to the currently displayed thumbnail to the thumbnail data 81 for displaying the rearmost (latest) thumbnail in time on the image.

When fast-forward processing is started, the drive 44 reads out the thumbnail data 81 from the disk 45 and stores it in the buffer memory 43. When the amount of thumbnail data 81 stored in the buffer memory 43 is equal to or larger than the threshold for starting thumbnail display, the process of displaying the thumbnails is started and the thumbnail data 81 is sequentially read out from the buffer memory 43.

The amount of thumbnail data 81 for displaying one thumbnail is small compared with the amount of data of the moving image. Furthermore, since one thumbnail corresponds to one GOP, the amount of thumbnail data 81 per unit time on the image is even smaller. Even after the process of displaying the thumbnails is started, the amount of thumbnail data 81 read out from the disk 45 for storage is large compared with the amount of thumbnail data 81 used for display.

Therefore, even after the process of displaying thumbnails is started, the amount of thumbnail data 81 stored in the buffer memory 43 increases over time as long as the thumbnail data 81 is read out from the disk 45.

For example, at time t101, when the amount of thumbnail data 81 stored in the buffer memory 43 is equal to the buffer upper limit value indicating the amount of data that can be stored in the buffer memory 43, the drive 44 suspends (terminates) reading the thumbnail data 81 from the disk 45 at time t101.

When the drive 44 suspends (terminates) reading the thumbnail data 81 from the disk 45, the amount of thumbnail data 81 stored in the buffer memory 43 decreases as the process of displaying the thumbnails proceeds.

For example, when display of the thumbnails is paused during the period from time t103 to time t104, the amount of thumbnail data 81 stored in the buffer memory 43 does not change during this period.

At time t104, if faster forward processing is specified, the amount of thumbnail data 81 used per unit time increases, and therefore, the amount of thumbnail data 81 stored in the buffer memory 43 decreases more quickly.

At time t105, when the amount of thumbnail data 81 stored in the buffer memory 43 reaches the threshold for resuming thumbnail data reading, the drive 44 starts reading the thumbnail data 81 from the disk 45. During the period from time t105 to time t106, when a seek operation is carried out, rotation of the disk 45 is awaited, and the head (not shown) reaches the position at which the thumbnail data 81 to be read out is recorded at time t106, the drive 44 starts reading the thumbnail data 81 from the disk 45 and stores the read-out thumbnail data 81 in the buffer memory 43.

For example, at time t107, when the amount of thumbnail data 81 stored in the buffer memory 43 is equal to the buffer upper limit value indicating the amount of data that can be stored in the buffer memory 43, the drive 44 suspends (terminates) reading the thumbnail data 81 from the disk 45.

For example, if display of the thumbnails is paused from time t108, the amount of thumbnail data 81 stored in the buffer memory 43 does not change thereafter.

Figure 26:
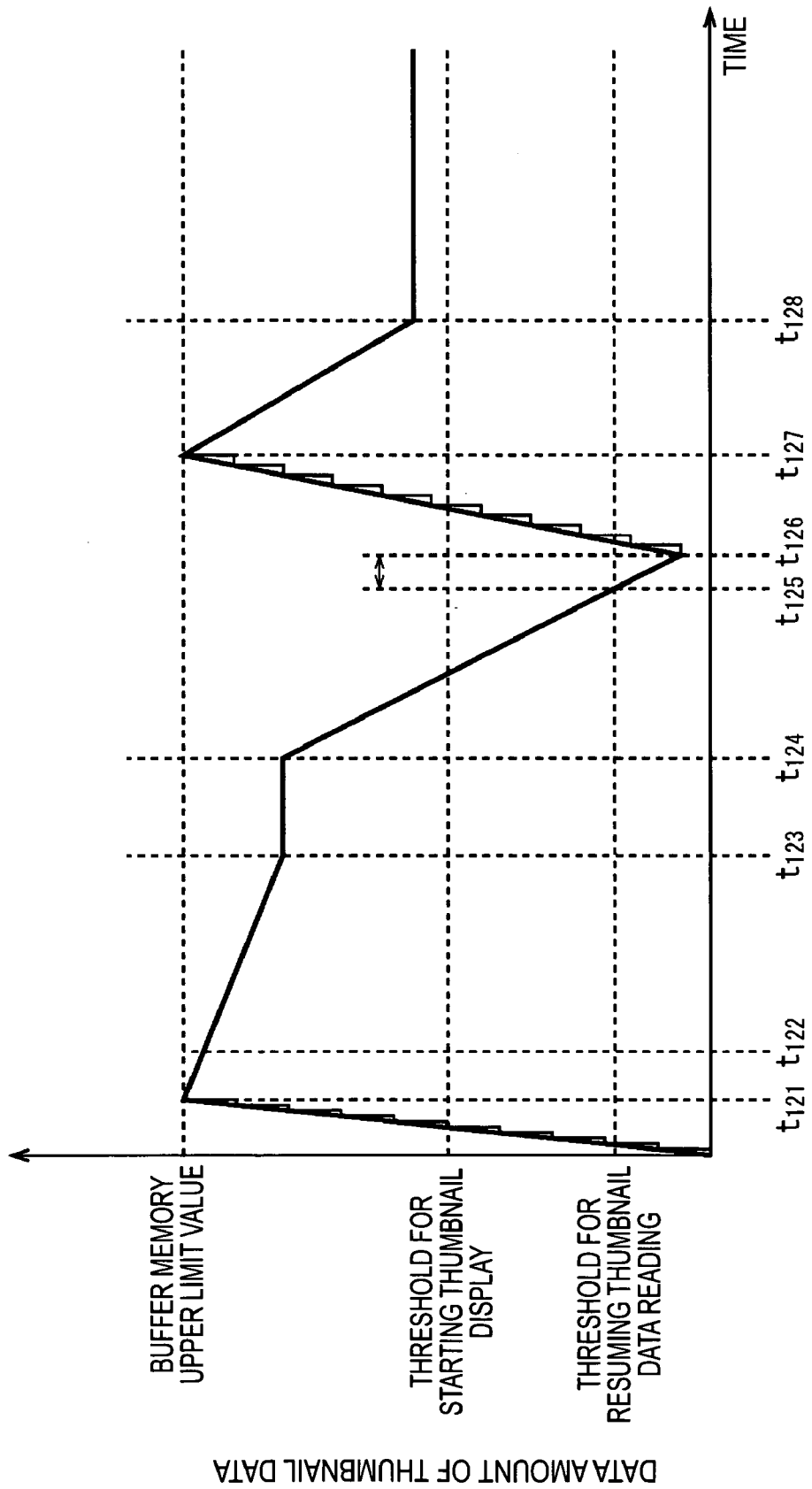
FIG. 26 is a diagram depicting a change in the amount of thumbnail data stored in a buffer memory during a rewind operation.

FIG. 26 is a diagram depicting a change in the amount of thumbnail data 81 stored in the buffer memory 43 during a rewind operation of the thumbnail. The vertical axis in FIG. 26 denotes the amount of data, and the horizontal axis in FIG. 26 denotes time.

Here, the amount of thumbnail data 81 stored in the buffer memory 43 means the amount of data from the thumbnail data 81 for displaying the thumbnail previous to the currently displayed thumbnail to the thumbnail data 81 for displaying the frontmost (earliest) thumbnail in time on the image.

When rewind processing is started, the drive 44 reads out the thumbnail data 81 from the disk 45 and stores it in the buffer memory 43. When the amount of thumbnail data 81 stored in the buffer memory 43 is equal to or larger than the threshold for starting thumbnail display, the process of displaying the thumbnails is started and the thumbnail data 81 is sequentially read out from the buffer memory 43.

Here, when a rewind operation is performed, the thumbnails are displayed in the direction opposite to the direction in which time on the image passes, and therefore, the thumbnail data 81 is also required in the direction opposite to the direction in which time on the image passes.

Figure 27:
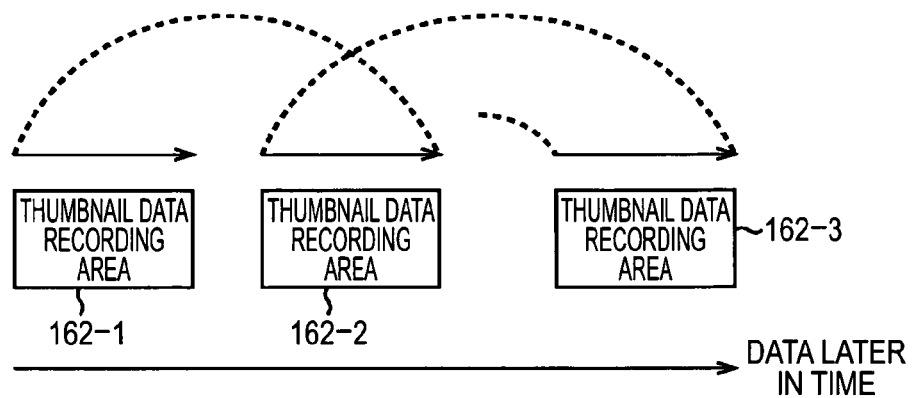
FIG. 27 is a diagram depicting reading out thumbnail data during a rewind operation.

As shown in FIG. 27, in a case where the thumbnail data 81 of the frontmost thumbnail in time on the image is recorded in the thumbnail data recording area 162-1; the thumbnail data 81 of the thumbnail subsequent to the thumbnail of the thumbnail data 81 recorded in the thumbnail data recording area 162-1 is recorded in the thumbnail data recording area 162-2 in time on the image; and the thumbnail data 81 of the thumbnail subsequent to the thumbnail of the thumbnail data 81 recorded in the thumbnail data recording area 162-2 is recorded in the thumbnail data recording area in time on the image, the drive 44 reads out the thumbnail data 81 from the thumbnail data recording area on the disk 45, performs a seek operation to the thumbnail data recording area 162-2, and reads out the thumbnail data 81 from the thumbnail data recording area when the head reaches the thumbnail data recording area 162-2. Furthermore, the drive 44 performs a seek operation up to the thumbnail data recording area 162-1 and reads out the thumbnail data 81 from the thumbnail data recording area 162-1 when the head reaches the thumbnail data recording area 162-1.

Figure 28:
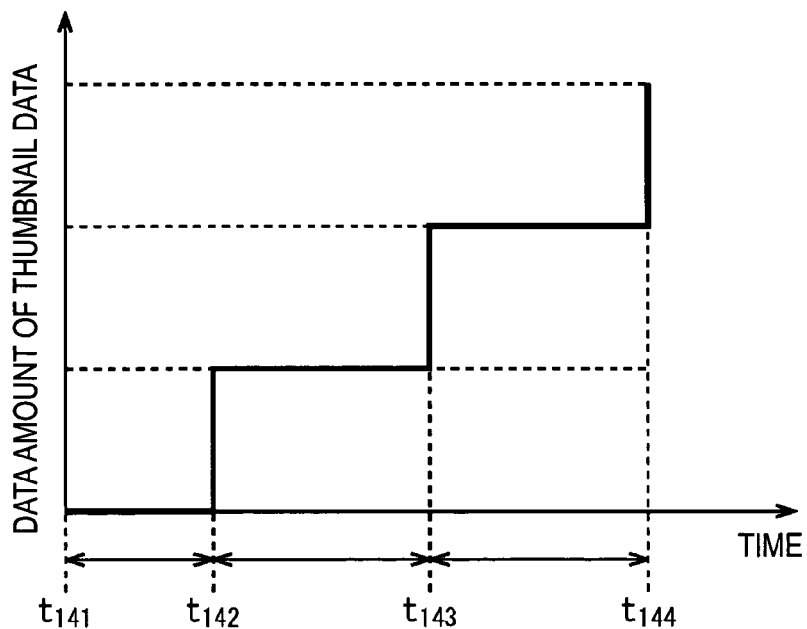
FIG. 28 is a diagram depicting in detail a change in the amount of thumbnail data stored in a buffer memory during a rewind operation.

Therefore, as shown in FIG. 28, when the thumbnail data 81 is read out from the thumbnail data recording area 162-3 during the period from time t141 to time t142 and the read out thumbnail data 81 is supplied to the buffer memory 43 at time t142, a constant amount of read-out thumbnail data 81 is stored in the buffer memory 43 at time t142. When the thumbnail data 81 is read out from the thumbnail data recording area 162-2 during the period from time t142 to time t143 and the read out thumbnail data 81 is supplied to the buffer memory 43 at time t143, a constant amount of read-out thumbnail data 81 is stored in the buffer memory 43 at time t143. Likewise, when the thumbnail data 81 is read out from the thumbnail data recording area 162-1 during the period from time t143 to time t144 and the read out thumbnail data 81 is supplied to the buffer memory 43 at time t144, a constant amount of read-out thumbnail data 81 is stored in the buffer memory 43 at time t144.

As described above, during a rewind operation, the amount of thumbnail data 81 stored in the buffer memory 43 increases in a staircase pattern over time.

Also during a rewind operation, the amount of thumbnail data 81 read out from the disk 45 is large compared with the amount of thumbnail data 81 used for display.

Therefore, even after the process of displaying thumbnails is started, the amount of thumbnail data 81 stored in the buffer memory 43 increases over time as long as the thumbnail data 81 is read out from the disk 45.

For example, at time t121, when the amount of thumbnail data 81 stored in the buffer memory 43 is equal to the buffer upper limit value indicating the amount of data that can be stored in the buffer memory 43, the drive 44 suspends (terminates) reading the thumbnail data 81 from the disk 45 at time t121.

When the drive 44 suspends (terminates) reading the thumbnail data 81 from the disk 45, the amount of thumbnail data 81 stored in the buffer memory 43 decreases as the process of displaying the thumbnails proceeds.

For example, when display of the thumbnails is paused during the period from time t123 to time t124, the amount of thumbnail data 81 stored in the buffer memory 43 does not change during this period.

At time t124, if faster rewind processing is specified, the amount of thumbnail data 81 used per unit time increases, and therefore, the amount of thumbnail data 81 stored in the buffer memory 43 decreases more quickly.

At time t125, when the amount of thumbnail data 81 stored in the buffer memory 43 reaches the threshold for resuming thumbnail data reading, the drive 44 starts reading the thumbnail data 81 from the disk 45. During the period from time t125 to time t126, when a seek operation is carried out, rotation of the disk 45 is awaited, and the head (not shown) reaches the position at which the thumbnail data 81 to be read out is recorded at time t126, the drive 44 starts reading the thumbnail data 81 from the disk 45 and stores the read-out thumbnail data 81 in the buffer memory 43.

For example, at time t127, when the amount of thumbnail data 81 stored in the buffer memory 43 is equal to the buffer upper limit value indicating the amount of data that can be stored in the buffer memory 43, the drive 44 suspends (terminates) reading the thumbnail data 81 from the disk 45.

For example, if display of the thumbnails is paused from time t128, the amount of thumbnail data 81 stored in the buffer memory 43 does not change thereafter.

Figure 29:
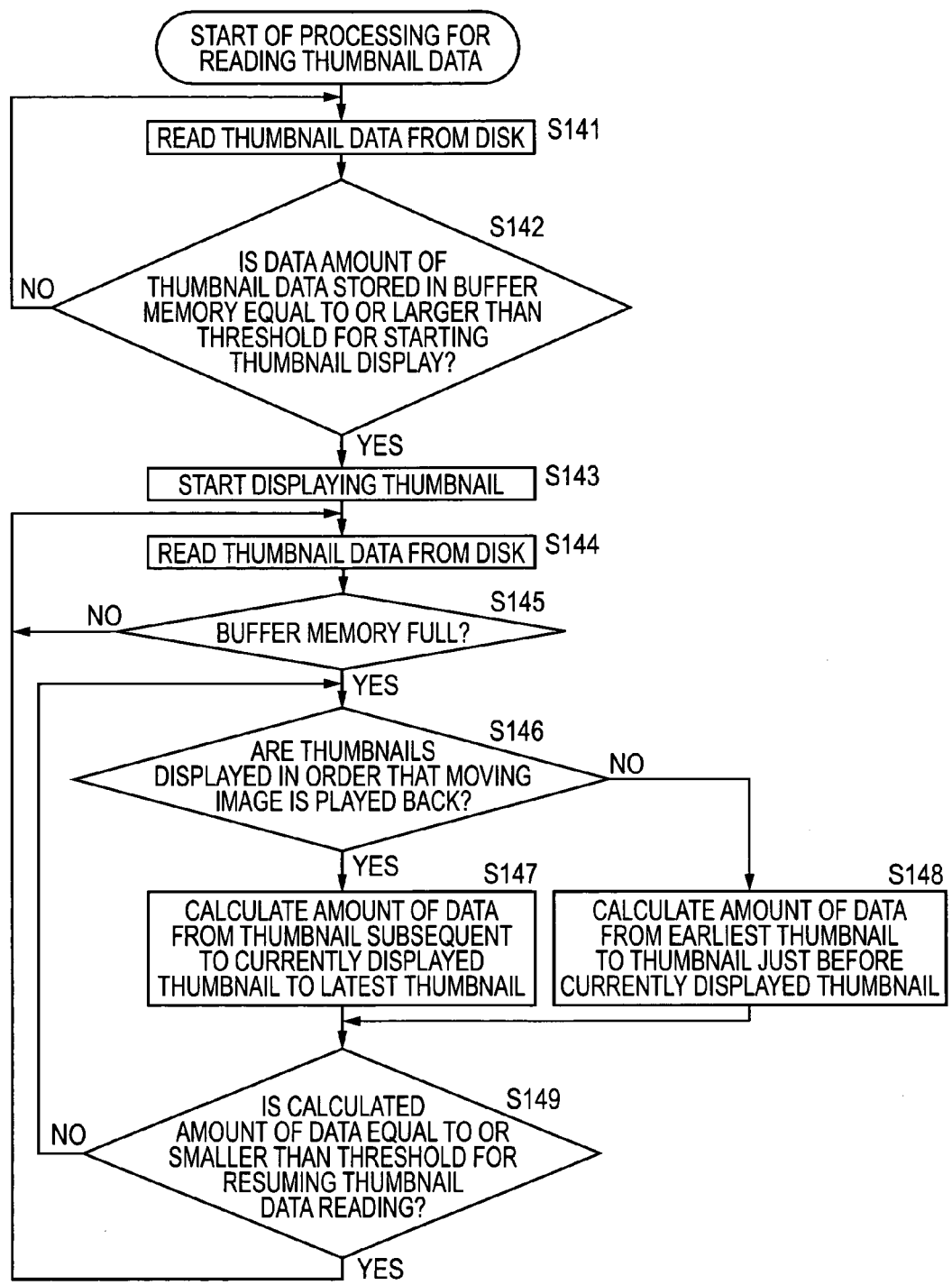
FIG. 29 is a flowchart illustrating the process of reading out thumbnail data.

FIG. 29 is a flowchart for illustrating the process of reading thumbnail data by the microcomputer 31 for executing the control program. In step S141, the control program causes the drive 44 to read the thumbnail data 81 from the disk 45. The drive 44 stores the read-out thumbnail data 81 in the buffer memory 43.

In step S142, the control program determines whether the amount of thumbnail data 81 stored in the buffer memory 43 is equal to or larger than the threshold for starting thumbnail display.

Here, in the case of fast-forward or normal playback, the amount of thumbnail data 81 stored in the buffer memory 43 means the amount of data from the thumbnail data 81 for displaying the thumbnail subsequent to the currently displayed thumbnail to the thumbnail data 81 for displaying the rearmost (latest) thumbnail in time on the image. In the case of rewind processing, the amount of thumbnail data 81 stored in the buffer memory 43 means the amount of data from the thumbnail data 81 for displaying the thumbnail previous to the currently displayed thumbnail to the thumbnail data 81 for displaying the frontmost (earliest) thumbnail in time on the image.

If it is determined in step S142 that the amount of thumbnail data 81 stored in the buffer memory 43 is below the threshold for starting thumbnail display, the flow proceeds to step S141, where the process of reading out the thumbnail data is repeated.

If it is determined in step S142 that the amount of thumbnail data stored in the buffer memory 43 is equal to or larger than the threshold for starting thumbnail display, the static-image decompression section 204 performs decompression by decoding the thumbnail data 81 stored in the buffer memory 43 and displays the thumbnail on the display section 207.

In step S144, the control program causes the drive 44 to read out the thumbnail data 81 from the disk 45. The drive 44 stores the read-out thumbnail data 81 in the buffer memory 43.

In step S145, the control program determines whether the buffer memory 43 is full. In other words, in step S145, the control program determines whether the amount of thumbnail data 81 stored in the buffer memory 43 has reached (is equal to) the buffer memory upper limit value.

If it is determined in step S145 that the buffer memory is not full, the procedure returns to step S144, where the process of reading the thumbnail data 81 is repeated.

If it is determined in step S145 that the buffer memory 43 is full, the buffer memory 43 cannot store any more thumbnail data 81. Therefore, the flow proceeds to step S146 without reading the thumbnail data 81, and the control program determines whether the thumbnails are displayed in the order of playing back the moving image, namely, in the order of fast-forward or normal playback operation.

If it is determined in step S146 that the thumbnails are displayed in the order of playing back the moving image, in other words, since the apparatus is in a fast-forward or normal playback mode, the flow proceeds to step S147, where from among the thumbnail data 81 stored in the buffer memory 43, the control program calculates the amount of thumbnail data 81 from the thumbnail subsequent to the currently displayed thumbnail to the rearmost (latest) thumbnail in time on the image. Thereafter, the flow proceeds to step S149.

If it is determined in step S146 that the thumbnails are not displayed in the order of playing back the moving image, in other words, since the apparatus is in a rewind playback mode, the flow proceeds to step S148, where from among the thumbnail data 81 stored in the buffer memory 43, the control program calculates the amount of thumbnail data 81 from the frontmost (earliest) thumbnail in time on the image to the thumbnail previous to the currently displayed thumbnail. Thereafter, the flow proceeds to step S149.

In step S149, the control program determines whether the calculated amount of data is equal to or smaller than the threshold for resuming thumbnail data reading. If it is determined in step S149 that the calculated amount of data is not equal to or below the threshold for resuming thumbnail data reading, it is not necessary read out the thumbnail data 81. Therefore, the flow returns to step S146, where the above-described processing is repeated.

If it is determined in step S149 that the calculated amount of data is equal to or smaller than the threshold for resuming thumbnail data reading, it is necessary to read out the thumbnail data 81. Therefore, the flow returns to step S144, where the process of reading the thumbnail data 81 is carried out.

The foregoing processing is described with reference to FIG. 30 to FIG. 34. If display of the thumbnail at time t0 on the image is directed during a fast-forward operation, the control program instructs the drive 44 to start reading with the thumbnail data 81 at time (t0−T1) a predetermined time T1 back from time t0 on the image.

Hereinafter, the thumbnail data 81 at time t is referred to as the thumbnail data t, as appropriate.

Reading is started with the thumbnail data (t0−T1) at time (t0−T1) a predetermined time T1 back from time t0 on the image in order to quickly start a rewind operation by responding to any instruction for a rewind operation.

The drive 44 reads out from the disk 45 the section from the thumbnail data (t0−T1) to the thumbnail data t0 at time t0 on the image, stores it in the buffer memory 43 in the form of a ring buffer, reads out the thumbnail data (t0+T1) from the thumbnail data t0 to time (t0+T1) the predetermined time T1 ahead from time t0, and stores it in the buffer memory 43 in the form of a ring buffer. For the sake of convenience, symbol A in FIG. 30 indicates the thumbnail data 81 stored in the buffer memory 43 corresponding to the section from time (t0−T1) on the image to time t0 on the image. For the sake of convenience, symbol B in FIG. 30 indicates the thumbnail data 81 stored in the buffer memory 43 corresponding to the section from time t0 on the image to time (t0+T1) on the image.

Thereafter, the drive 44 reads out the thumbnail data 81 from the disk 45 until the buffer memory 43 in the form of a ring buffer becomes full and stores the thumbnail data 81 in the buffer memory 43. For the sake of convenience, symbol C in FIG. 30 indicates the thumbnail data 81 stored in the buffer memory 43 corresponding to the section from time (t0+T1) on the image to time (t0+Tn) on the image.

Figure 30:
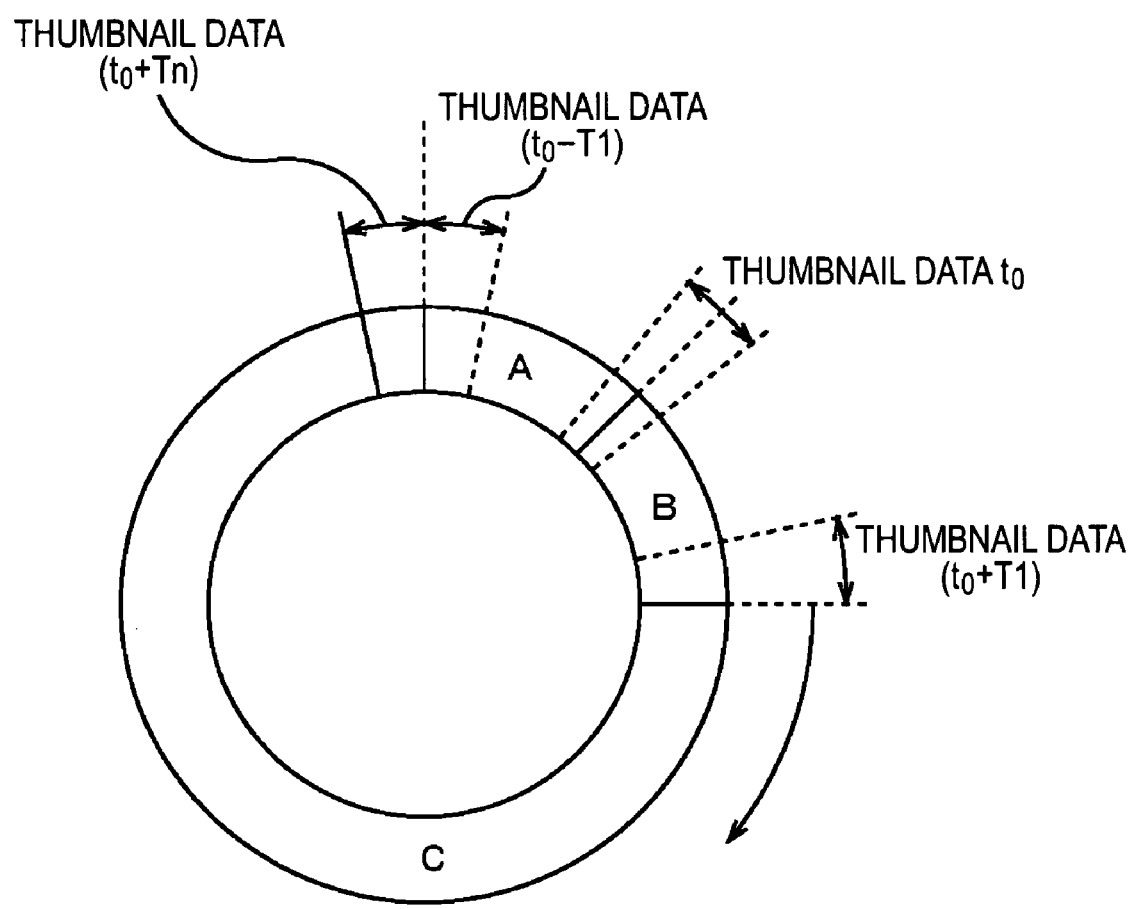
FIG. 30 is a diagram depicting storing thumbnail data in a buffer memory.
Figure 31:
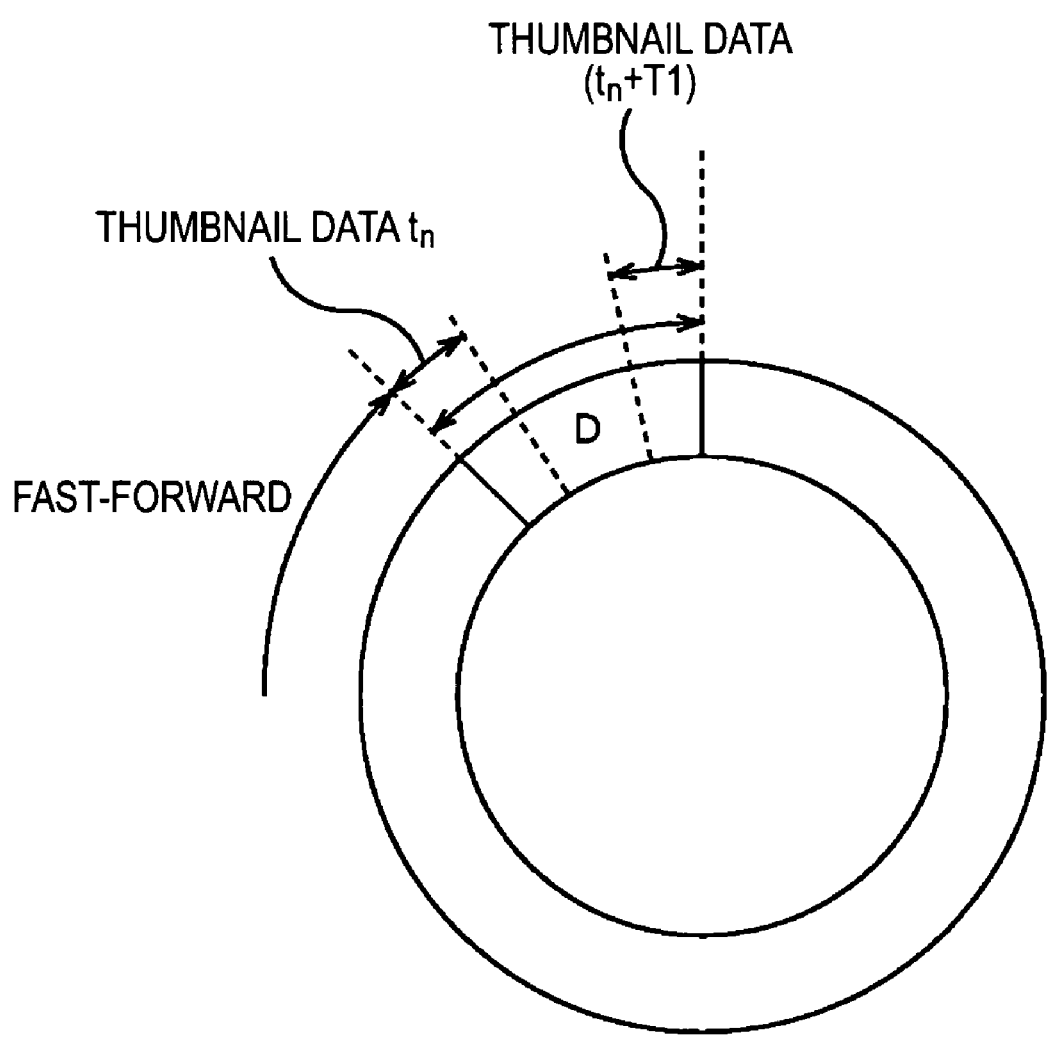
FIG. 31 is a diagram depicting storing thumbnail data in a buffer memory.

When a fast-forward operation is carried out and the thumbnail at time tn on the image is displayed, the thumbnail data 81 corresponding to the section from time t0 on the image to time tn on the image is used up (cannot be used for the subsequent fast-forward processing), as shown in FIG. 31. Therefore, the thumbnail data 81, stored in the buffer memory 43, that can be used for the subsequent fast-forward processing is, for example, only the thumbnail data (t(n+1)) to the thumbnail data (tn+T1). For the sake of convenience, symbol D in FIG. 30 indicates the thumbnail data 81 stored in the buffer memory 43 corresponding to the section from time tn on the image to time (tn+T1) on the image.

Figure 32:
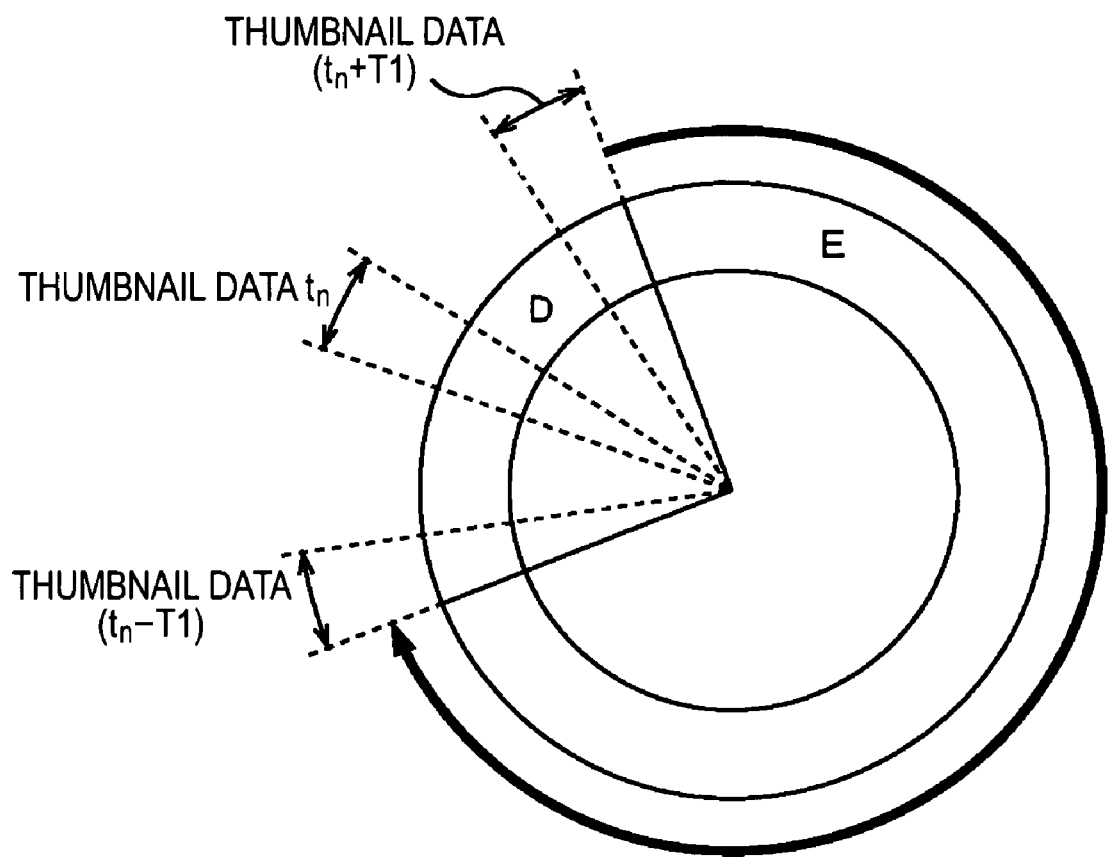
FIG. 32 is a diagram depicting storing thumbnail data in a buffer memory.

When the amount of thumbnail data 81 that can be used for the subsequent fast-forward processing is equal to or smaller than the threshold for resuming thumbnail data reading, as shown in FIG. 32, the drive 44 sequentially reads out from the disk 45 the thumbnail data 81 subsequent to the thumbnail data (tn+T1) and stores the read-out thumbnail data 81 in the buffer memory 43 until the buffer memory 43 in the form of a ring buffer is full, while preventing the section corresponding to the thumbnail data 81 from time (tn−T1) on the image to time (tn+T1) on the image from being overwritten. For the sake of convenience, symbol E in FIG. 30 indicates the thumbnail data 81 stored in the buffer memory 43 corresponding to time on the image from time (tn+T1+1) on the image.

Figure 33:
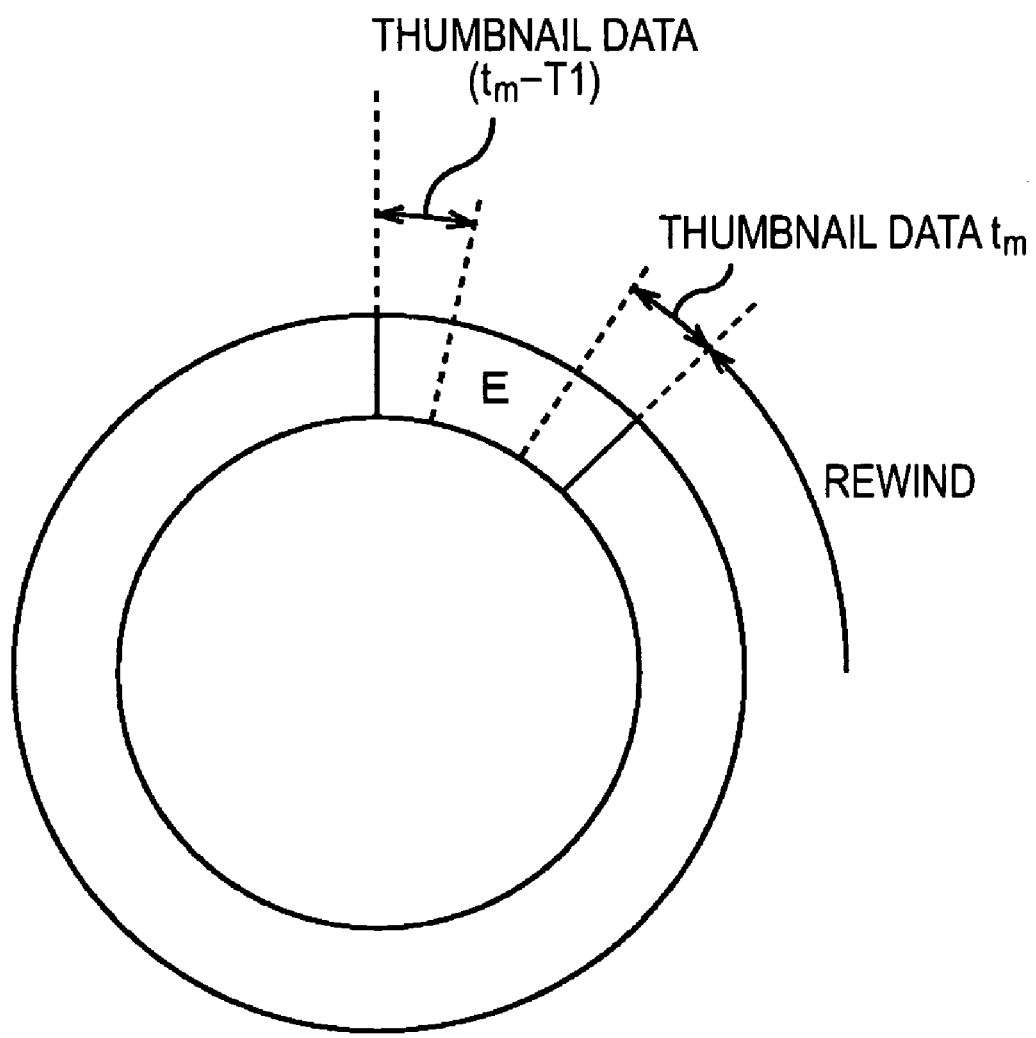
FIG. 33 is a diagram depicting storing thumbnail data in a buffer memory.

On the other hand, when the thumbnail at time tm on the image is displayed during a rewind operation and the thumbnail data 81 corresponding to the section up to time tm on the image is used up, as shown in FIG. 33, the thumbnail data 81, stored in the buffer memory 43, that can be used for the subsequent rewind processing is, for example, only the thumbnail data (t(m−1)) to the thumbnail data (tm−T1). For the sake of convenience, symbol E in FIG. 30 indicates the thumbnail data 81 stored in the buffer memory 43 corresponding to the section from time tm on the image to time (tm−T1) on the image.

Figure 34:
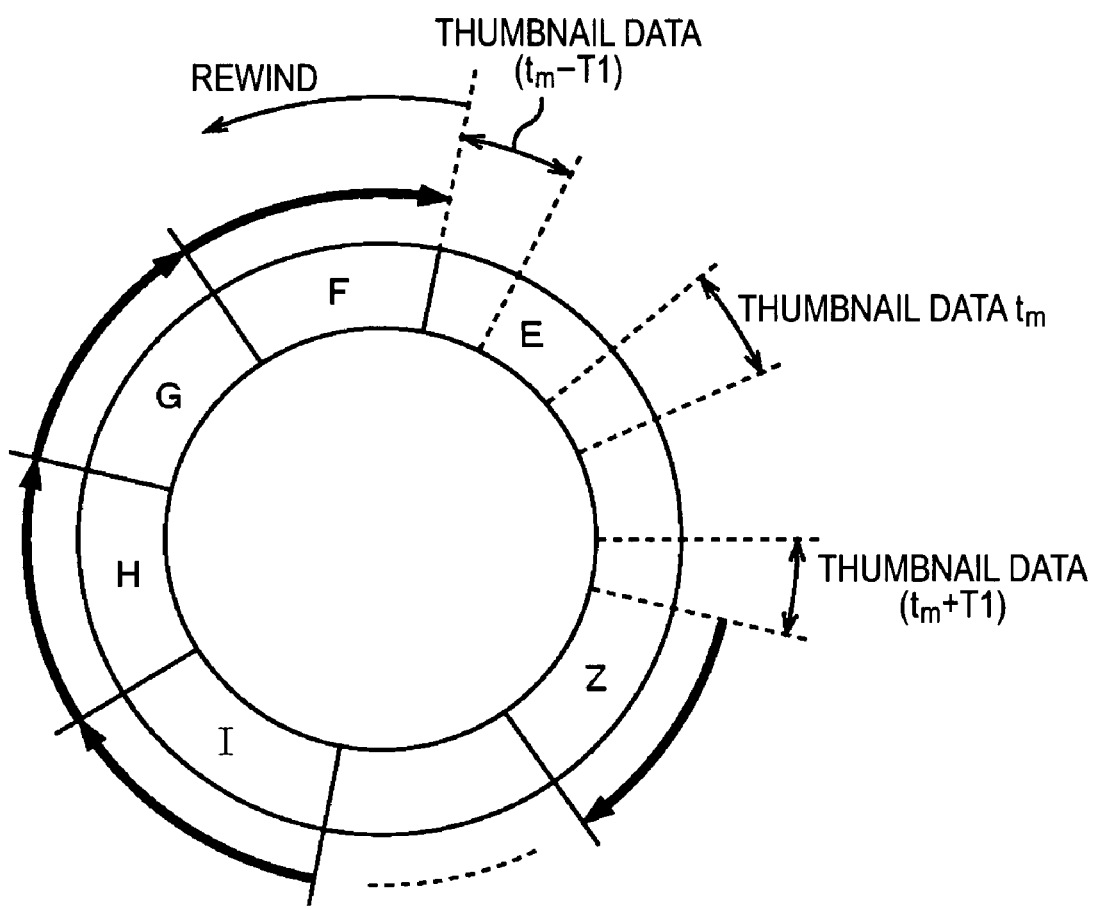
FIG. 34 is a diagram depicting storing thumbnail data in a buffer memory.

When the amount of thumbnail data 81 that can be used for the subsequent rewind processing is equal to or smaller than the threshold for resuming thumbnail data reading, as shown in FIG. 34, the drive 44 reads out from the disk 45 the thumbnail data 81 in the reverse direction, starting with the thumbnail data (tm−T1−1), and stores the read-out thumbnail data 81 in the buffer memory 43 until the buffer memory 43 in the form of a ring buffer is full, while preventing the section corresponding to the thumbnail data 81 from time (tm+T1) on the image to time (tm−T1) on the image from being overwritten.

In this case, since the thumbnail data 81 is read out on the basis of the thumbnail recording area 162, the thumbnail data 81, indicated by F in FIG. 30, including the thumbnail data (tm−T1−1) is stored in the buffer memory 43 in the order indicated by the thick arrows in FIG. 34, and then the thumbnail data 81, indicated by G followed by the thumbnail data 81 indicated by F in FIG. 30, is stored in the buffer memory 43. In the same manner, the thumbnail data 81 is read out from the disk 45 and stored in the buffer memory 43 going backward in time on the image.

A recording apparatus in a case where thumbnails corresponding to moving image data recorded on the disk 45 are generated and then recorded on the disk 45 will now be described.

Figure 35:
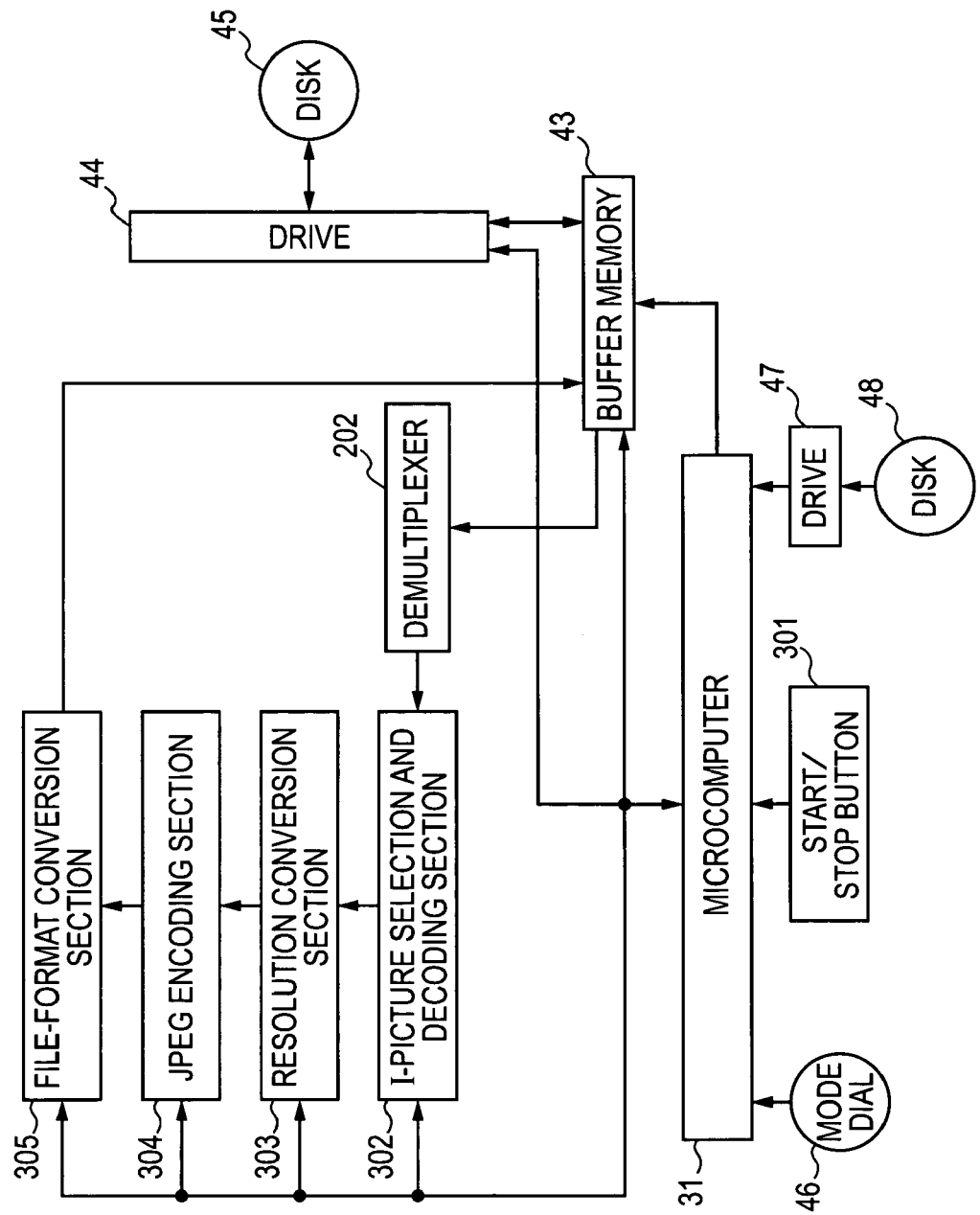
FIG. 35 is a block diagram depicting a structure of one embodiment of a recording and playback apparatus, according to the present invention, for reading out an MPEG2 program stream from a disk on which the MPEG2 program stream is recorded and generating thumbnail data corresponding to the MPEG2 program stream to record it on the disk.

FIG. 35 is a block diagram depicting a structure of one embodiment of a recording and playback apparatus, according to the present invention, for reading out an MPEG2 program stream from the disk 45 on which the MPEG2 program stream is recorded and generating thumbnail data corresponding to the MPEG2 program stream to record it on the disk 45. The same components as those shown in FIG. 20 are denoted by the same symbols, and thus a description thereof will be omitted.

The microcomputer 31 executes the predetermined control program to issue a command for operation to each section of the recording and playback apparatus based on a signal from a start/stop button 301 according to an operation of the user.

The drive 44 reads out a program stream in accordance with the MPEG2 technique from the disk 45 and stores the read-out program stream in accordance with the MPEG2 technique in the buffer memory 43. The demultiplexer 202 separates the MPEG2 video elementary stream as image data in accordance with the MPEG2 technique and audio data from the program stream in accordance with the MPEG2 technique stored in the buffer memory 43.

Under the control of the microcomputer 31, an I-picture selection and decoding section 302 selects an I (intra) picture from among the MPEG2 video elementary stream separated by the demultiplexer 202 and decodes the selected I picture. The I-picture selection and decoding section 302 supplies the decoded picture to a resolution conversion section 303.

As with the number-of-pixels conversion section 40, the resolution conversion section 303 converts the resolution of the decoded picture under the control of the microcomputer 31. For example, the resolution conversion section 303 converts the resolution of the extracted picture by thinning out pixels from the picture.

The resolution conversion section 303 supplies the image data whose number of pixels has been converted to a JPEG encoding section 304. Under the control of the microcomputer 31, the JPEG encoding section 304 encodes the image data supplied from the resolution conversion section 303 in accordance with the JPEG technique. The JPEG encoding section 304 supplies the image data encoded in accordance with the JPEG technique to a file-format conversion section 305 as thumbnail data.

The file-format conversion section 305 converts the file format of the thumbnail data into the PLF format, file format referred to from the file 101 in PLF format, static image package format, or location-related data file format referred to from the track management file 131. The file-format conversion section 305 supplies the thumbnail data with converted file format to the buffer memory 43.

Here, for all GOPs of moving image data for which a command for creating thumbnails has been issued, the file-format conversion section 305 may convert the file formats of all items of thumbnail data at a time into one file or a predetermined number of files for all items of thumbnail data after the thumbnail data has been supplied by the resolution conversion section 303.

The drive 44 records on the disk 45 the thumbnail data which has been converted into a predetermined file format and is stored in the buffer memory 43. If the file-format conversion section 305 converts the file formats of all items of thumbnail data at a time into one file or a predetermined number of files for all items of thumbnail data after the thumbnail data has been supplied by the resolution conversion section 303 for all GOPs of moving image data for which a command for creating thumbnails has been issued, the drive 44 records on the disk 45 the thumbnail data whose file formats have been converted all at a time.

Figure 36:
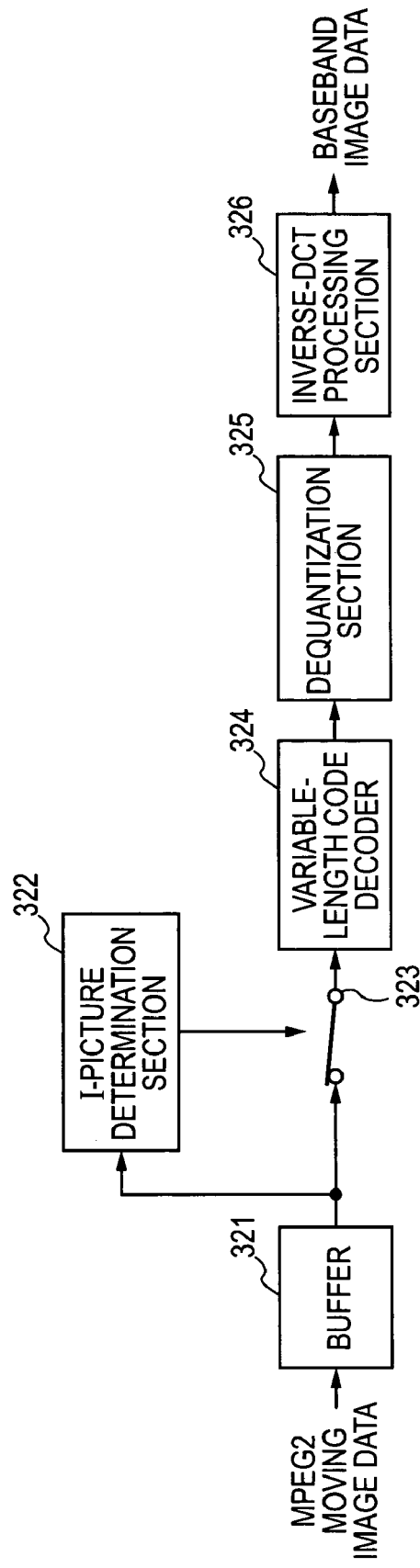
FIG. 36 is a block diagram depicting the structure of an I-picture selection and decoding section.

FIG. 36 is a block diagram depicting the structure of the I-picture selection and decoding section 302. A buffer 321 temporarily stores the moving image data in accordance with the MPEG2 technique, which is an MPEG2 video elementary stream, supplied from the demultiplexer 202. An I-picture determination section 322 determines whether each of the pictures constituting the moving image data in accordance with the MPEG2 technique stored in the buffer 321 is an I picture by, for example, referring to the picture coding type in the picture header.

A selector 323 supplies data of the picture stored in the buffer 321 to a variable-length code decoder 324 or controls the supply of the data of picture stored in the buffer 321 to the variable-length code decoder 324 based on a signal indicating whether the picture is an I picture supplied from the I-picture determination section 322. More specifically, if a signal indicating that the picture is an I picture is supplied from the I-picture determination section 322, the selector 323 supplies data of the picture, which is an I picture stored in the buffer 321, to the variable-length code decoder 324. If a signal indicating that the picture is not an I picture is supplied from the I-picture determination section 322, the selector 323 controls the supply of data of the picture, which is a B picture or a P picture stored in the buffer 321, to the variable-length code decoder 324.

The variable-length code decoder 324 decodes data of the I picture, which has been subjected to variable-length encoding and is supplied from the buffer 321 through the selector 323, and supplies the data of the decoded I picture to a dequantization section 325. The dequantization section 325 dequantizes the data of the I picture by multiplying a dequantization coefficient equal to a predetermined value for each coefficient included in the data of the decoded I picture. The dequantization section 325 supplies the data of the I picture obtained through dequantization, that is, DCT (Discrete Cosine Transform) coefficients, to an inverse-DCT processing section 326.

The inverse-DCT processing section 326 generates uncompressed image data, so-called baseband image data, by applying inverse-DCT conversion to the DCT coefficients supplied form the dequantization section 325 and outputs the baseband image data.

Figure 37:
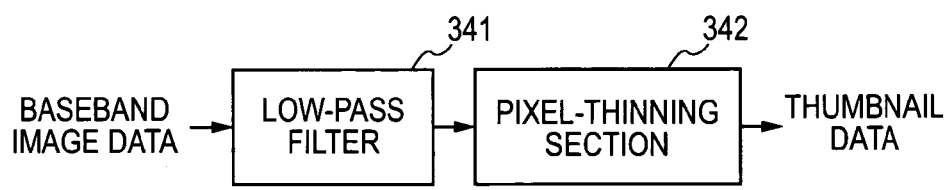
FIG. 37 is a block diagram depicting the structure of a resolution conversion section.

FIG. 37 is a block diagram depicting the structure of the resolution conversion section 303. A low-pass filter 341 removes high-frequency components (restricts the band) of the image from the baseband image data supplies from the I-picture selection and decoding section 302 and supplies the baseband image data whose high-frequency components of the image have been removed to a pixel-thinning section 342. For example, the low-pass filter 341 calculates the mean value of the pixel values of four pixels composed of two pixels in the vertical direction and two pixels in the horizontal direction and sets the calculated mean value to the pixel values of the four pixels to remove the high-frequency components of the image.

The pixel-thinning section 342 thins out pixels from the baseband image data whose high-frequency components of the image have been remove and outputs the baseband image data whose pixels have been thinned out as thumbnail data. For example, the pixel-thinning section 342 classifies the pixels of the baseband image data into sets of four pixels composed of two pixels in the vertical direction and two pixels in the horizontal direction and removes three pixels from each set of four pixels to thin out pixels from the baseband image data.

Figure 38:
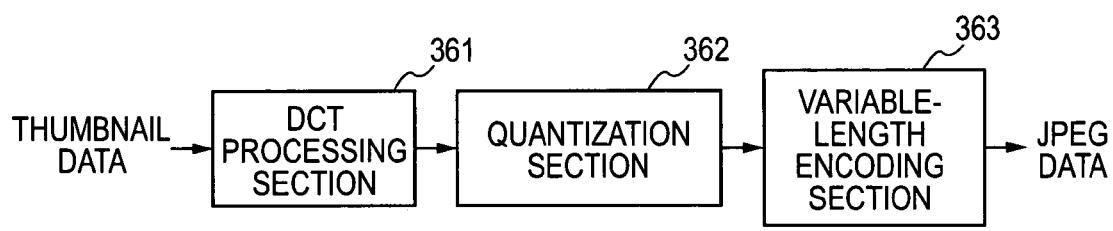
FIG. 38 is a block diagram depicting the structure of a JPEG encoding section.

FIG. 38 is a block diagram depicting the structure of the JPEG encoding section 304. A DCT processing section 361 DCT-converts the thumbnail data supplied from the resolution conversion section 303 and supplies the DCT coefficients obtained through DCT conversion to a quantization section 362. The quantization section 362 quantizes the DCT coefficients by dividing the DCT coefficients supplied from the DCT processing section 361 by a predetermined quantization coefficient and supplies the quantized DCT coefficients to a variable-length encoding section 363. The variable-length encoding section 363 generates thumbnail data compressed in accordance with the JPEG technique by encoding the quantized DCT coefficients into variable-length code and outputs the generated thumbnail data compressed in accordance with the JPEG technique.

Figure 39:
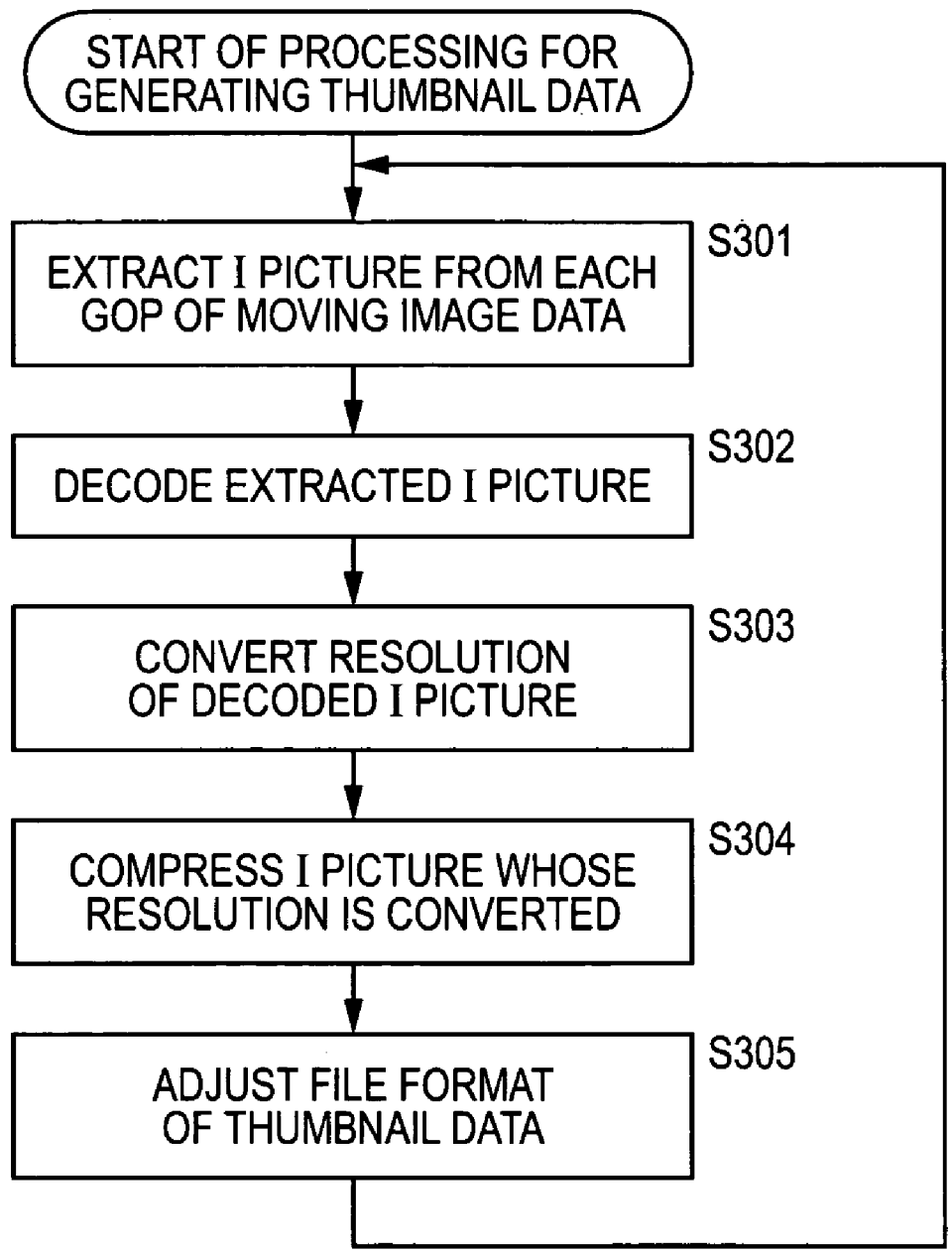
FIG. 39 is a flowchart illustrating the process of generating thumbnail data.

FIG. 39 is a flowchart illustrating the process of generating thumbnail data. In step S301, the I-picture selection and decoding section 302 extracts (selects) an I picture from each GOP of moving image data, which is an MPEG2 program stream, read out by the drive 44 from the disk 45. In step S302, the I-picture selection and decoding section 302 decodes the extracted I picture.

In step S303, the resolution conversion section 303 performs conversion to decrease the resolution of the decoded I picture. In step S304, the JPEG encoding section 304 compresses the I picture with converted resolution in accordance with the JPEG technique. In step S305, the file-format conversion section 305 adjusts the file format of the thumbnail data acquired by compressing the I picture in accordance with the JPEG technique, and the flow returns to step S301, where the above-described processing is repeated.

The thumbnail data can also be generated as a stream of I pictures.

Figure 40:
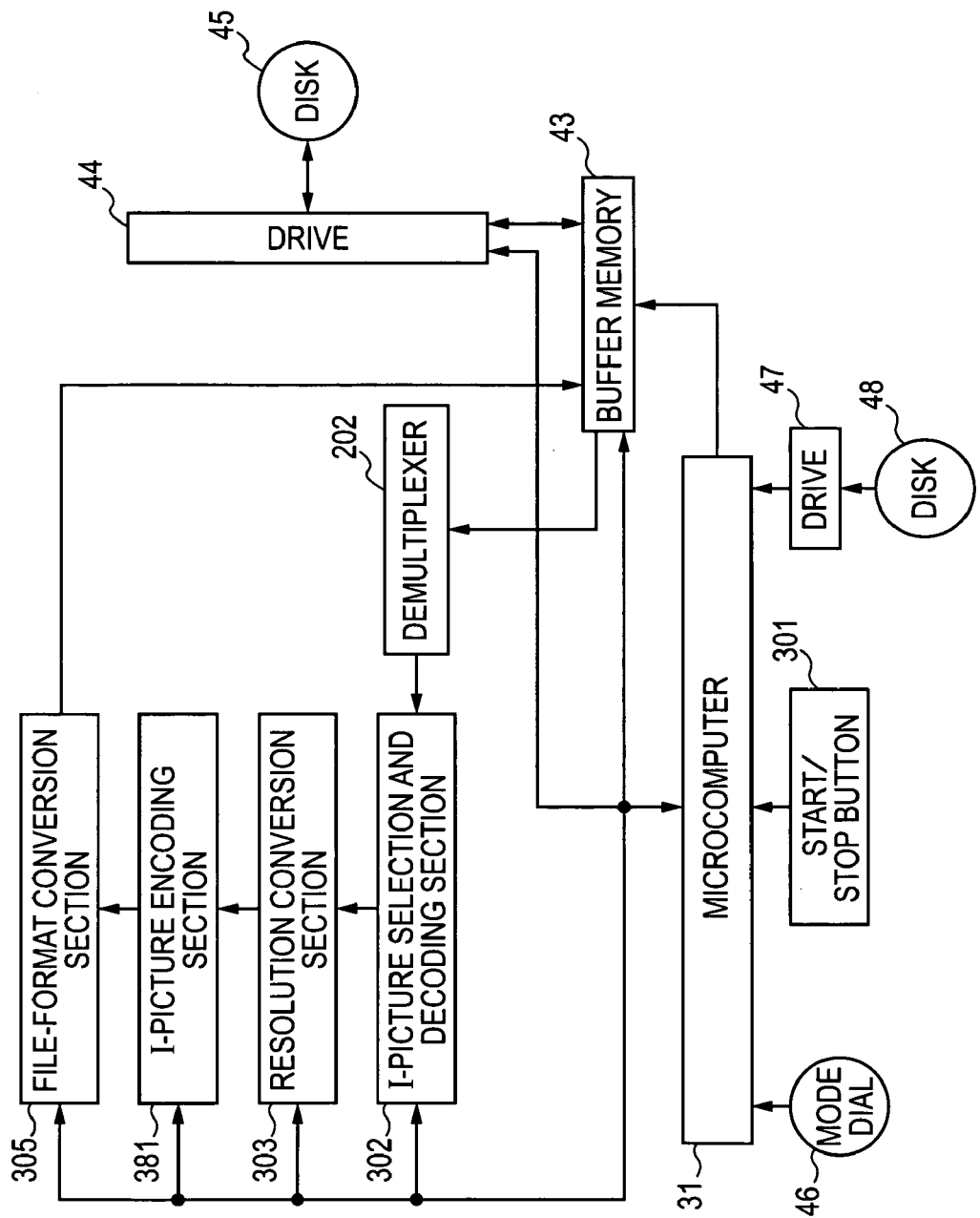
FIG. 40 is a block diagram depicting a structure of one embodiment of a recording and playback apparatus, according to the present invention, for reading out an MPEG2 program stream from a disk on which the MPEG2 program stream is recorded and generating thumbnails, as a stream of I pictures, corresponding to the MPEG2 program stream to record it on the disk.

FIG. 40 is a block diagram depicting a structure of one embodiment of a recording and playback apparatus, according to the present invention, for reading out an MPEG2 program stream from the disk 45 on which the MPEG2 program stream is recorded and generating thumbnails, as a stream of I pictures, corresponding to the MPEG2 program stream to record it on the disk 45. The same components as those shown in FIG. 35 are denoted by the same symbols, and thus a description thereof will be omitted.

An I-picture encoding section 381 compresses and encodes as an I picture the thumbnail data with converted resolution, which is baseband image data and supplied from the resolution conversion section 303. The I-picture encoding section 381 supplies the thumbnail data compressed and encoded as an I picture to the file-format conversion section 305.

Figure 41:
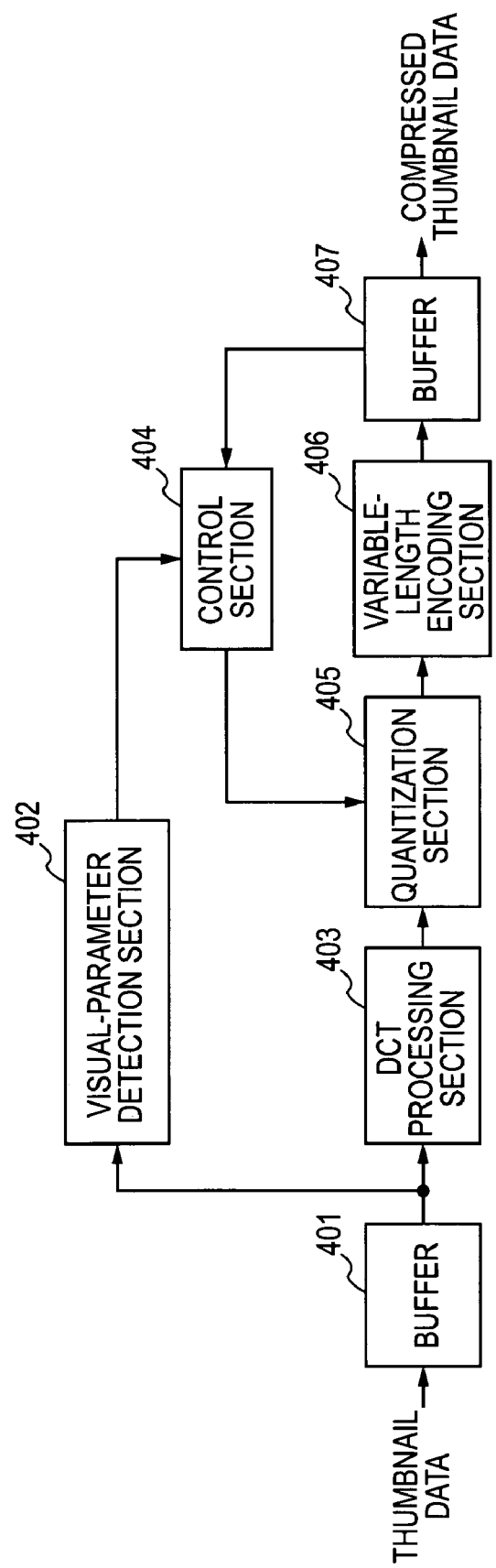
FIG. 41 is a block diagram depicting the structure of an I-picture encoding section.

FIG. 41 is a block diagram depicting the structure of the I-picture encoding section 381. A buffer 401 temporarily stores the thumbnail data with converted resolution, which is baseband image data and supplied from the resolution conversion section 303. The buffer 401 supplies the stored thumbnail data to a visual-parameter detection section 402 and a DCT processing section 403.

The visual-parameter detection section 402 detects a visual parameter indicating a feature of the image of the thumbnail data stored in the buffer 401 and supplies the detected visual parameter to a control section 404. The visual parameter can be, for example, an activity indicating a change of pixel value in the spatial direction, as specified in MPEG2 TM(Test Model) 5.

The DCT processing section 403 DCT-converts the thumbnail data supplied from the buffer 401 and supplies DCT coefficients obtained though DCT conversion to a quantization section 405.

The control section 404 determines a quantization value based on the visual parameter supplied from the visual-parameter detection section 402 and the amount of compressed thumbnail data stored in a buffer 407 and supplies the quantization value to the quantization section 405. For example, as specified in MPEG2 TM5, the control section 404 determines the quantization value based on the visual parameter such that the more high-frequency components, the more coarsely quantization is performed, and the less high-frequency components, the more finely quantization is performed. Furthermore, the control section 404 determines the quantization value based on the amount of compressed thumbnail data stored in the buffer 407 such that the data amount of thumbnail data compressed and encoded as an I picture does not exceed a predetermined upper limit.

The quantization section 405 quantizes the DCT coefficients by dividing the DCT coefficients supplied from the DCT processing section 403 by the quantization value supplied from the control section 404 and supplies the quantized DCT coefficients to a variable-length encoding section 406. The variable-length encoding section 406 generates thumbnail data compressed and encoded as an I picture by encoding the quantized DCT coefficients into variable-length code and supplies the generated thumbnail data compressed and encoded as an I picture to the buffer 407.

The buffer 407 temporarily stores the thumbnail data compressed and encoded as an I picture. The buffer 407 outputs the stored thumbnail data compressed and encoded as an I picture.

FIG. 42 is a flowchart illustrating the process of controlling the amount of code by the control section 404 for each I picture. In step S321, the control section 404 assigns the amount of code to the picture. For example, in step S321, the control section 404 assigns the amount of code to the picture taking into consideration the upper limit of the amount of code for the picture and a predetermined margin rather than the target value of the amount of code for the picture. More specifically, in step S321, the control section 404 assigns to the picture the amount of code of a value obtained by subtracting the margin from the upper limit of the amount of code.

This is done to guarantee the restrictions described in VBV for continuous playback of thumbnails, to be described later, because the amount of thumbnail data compressed and encoded as an I picture may results in exceeding the setting in step S321.

In step S322, the control section 404 assigns the amount of code to macroblocks based on the amount of code assigned to the picture so as to allocate the amount of code assigned to the picture to each macroblock.

In step S323, the control section 404 determines the final quantization value by using the visual parameter, and then processing ends.

As described above, the thumbnail data is compressed and encoded as an I picture so as to have an amount of data equal to or smaller than the predetermined upper limit value. By doing so, even when thumbnail data is subjected to special playback, such as fast-forward or rewind, the thumbnail can be played back and displayed quickly without causing an underflow in decoding.

This advantage will be described using a VBV (Video Buffering Verifier) model. The VBV is a model of a virtual decoder connected to the output of an encoder, as specified in ISO13818-2 Annex C. It specifies restrictions to a bit stream based on constraints to the amount of data stored in a VBV buffer included in this model. Although the VBV normally specifies restrictions to the decoder, the current description assumes restrictions to the encoding side.

FIG. 43 is a block diagram depicting the structure of a VBV model. An encoder 421 outputs code corresponding to the picture to a VBV buffer 422. The VBV buffer 422 temporarily stores the code supplied from the encoder 421 and outputs the stored code.

Here, it is assumed that the code is instantly transferred from the encoder 421 to the VBV buffer 422. It is also assumed that no code is output from the VBV buffer 422 if no code is stored in the VBV buffer 422, and code is transferred from the VBV buffer 422 at the maximum transfer rate if code is stored in the VBV buffer 422.

Figure 44:
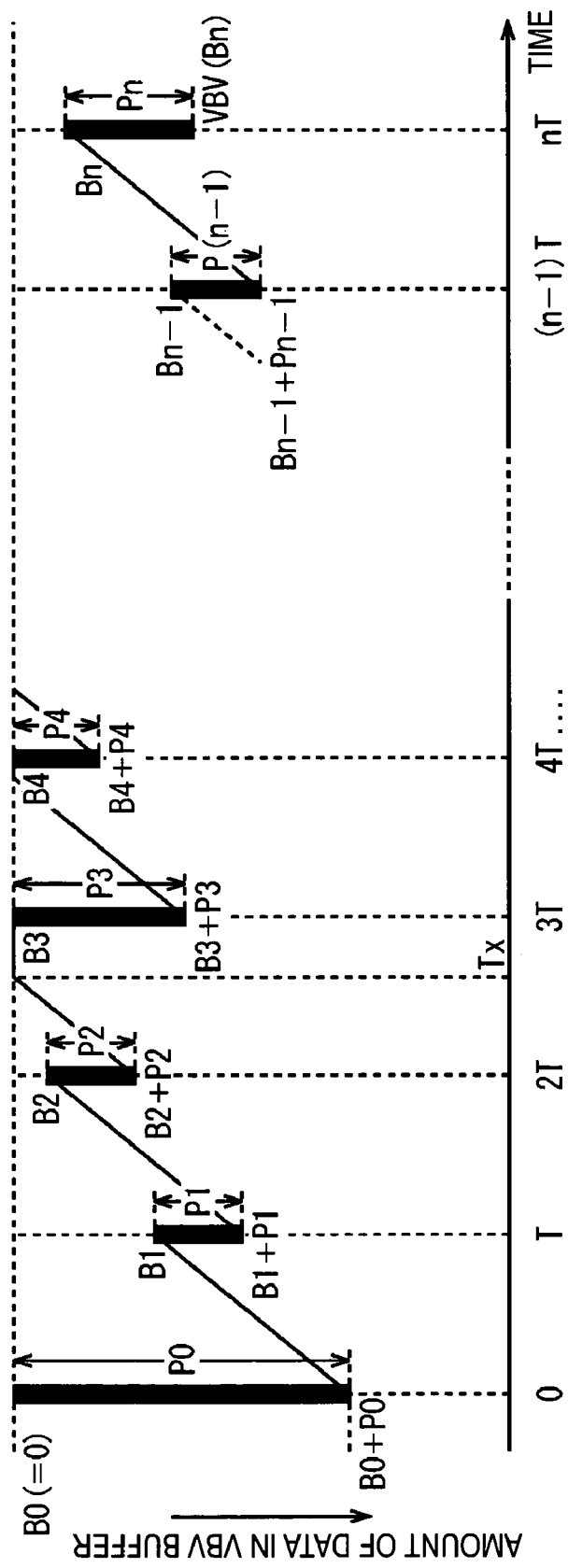
FIG. 44 is a diagram depicting the motion of a VBV model in a case where no restriction is applied to the amount of thumbnail data.

FIG. 44 is a diagram depicting the motion of a VBV model in a case where no restriction is applied to the amount of thumbnail data. In FIG. 44, the vertical axis represents the amount of data of code stored in the VBV buffer 422, and the horizontal axis represents time.

In FIG. 44, time T indicates the frame period [second], which is equal to the inverse of the frame rate.

At time t=0 when encoding processing is started from a state where the VBV buffer 422 is empty, code with a data amount P0 is transferred from the encoder 421 to the VBV buffer 422. Accordingly, the data amount of code stored in the VBV buffer 422 becomes P0 at time t=0. Because the code is output from the VBV buffer 422 at the maximum transfer rate, the data amount of code stored in the VBV buffer 422 decreases over time, and the data amount of code stored in the VBV buffer 422 becomes B1 at time t=T. At the same time, since code with a data amount P1 smaller than P0 is transferred from the encoder 421 to the VBV buffer 422 at time t=T, the data amount of code stored in the VBV buffer 422 instantly increases up to B1+P1.

Similarly, the data amount of code stored in the VBV buffer 422 becomes B2 at time t=2T. At the same time, since code with a data amount P2 substantially the same as P1 is transferred from the encoder 421 to the VBV buffer 422 at time t=T, the data amount of code stored in the VBV buffer 422 instantly increases up to B2+P2.

At time t=Tx, the data amount of code stored in the VBV buffer 422 becomes zero. When the data amount of code stored in the VBV buffer 422 becomes zero, the VBV buffer 422 outputs no code.

Since code with a data amount P3 smaller than P0 but larger than P1 is transferred from the encoder 421 to the VBV buffer 422 at time t=3T, the data amount of code stored in the VBV buffer 422 instantly increases up to P3. At time t=4T, the data amount of code stored in the VBV buffer 422 becomes zero, and at the same time, since code with a data amount P4 substantially the same as P1 is transferred from the encoder 421 to the VBV buffer 422 at time t=T, the data amount of code stored in the VBV buffer 422 instantly increases up to P4.

As described above, if the amount of code for one picture output from the encoder 421 changes, an underflow or an overflow may occur.

For example, code with a data amount P4 substantially the same as P1 is transferred from the encoder 421 to the VBV buffer 422 at time t=T and time t=2T, an overflow occurs.

On the encoding side, an overflow is not allowed to occur because an overflow causes the code to drop, whereas an underflow is allowed to occur because writing can be awaited if an underflow occurs.

For this reason, an overflow needs to be prevented from occurring by monitoring the amount of data encoded in encoding and feedback-controlling the encoding processing by the use of a parameter for changing the amount of code.

Here, a case is assumed where code with a data amount that can be output at the maximum transfer rate is always transferred from the encoder 421 to the VBV buffer 422 during a frame period T. This corresponds to, for example, a case where, in step S321, the control section 404 assigns the amount of code to the picture by setting the amount of data that can be output at the maximum transfer rate during the frame period T as the upper limit of the amount of code for the picture.

Maximum permissible amount of code fb [bit/frame], which is the amount of data allowed for a thumbnail per frame (picture), can be calculated as Rmax/frame_rate, where Rmax [bit/sec] is the maximum transfer rate of code output from the VBV buffer 422 and frame_rate [number of frames/sec] is the frame rate. It is noted that frame_rate differs depending on the standards of television broadcasting, such as the NTSC (National Television System Committee) standards and the PAL (Phase Alternating (by) Line) standards.

Figure 45:
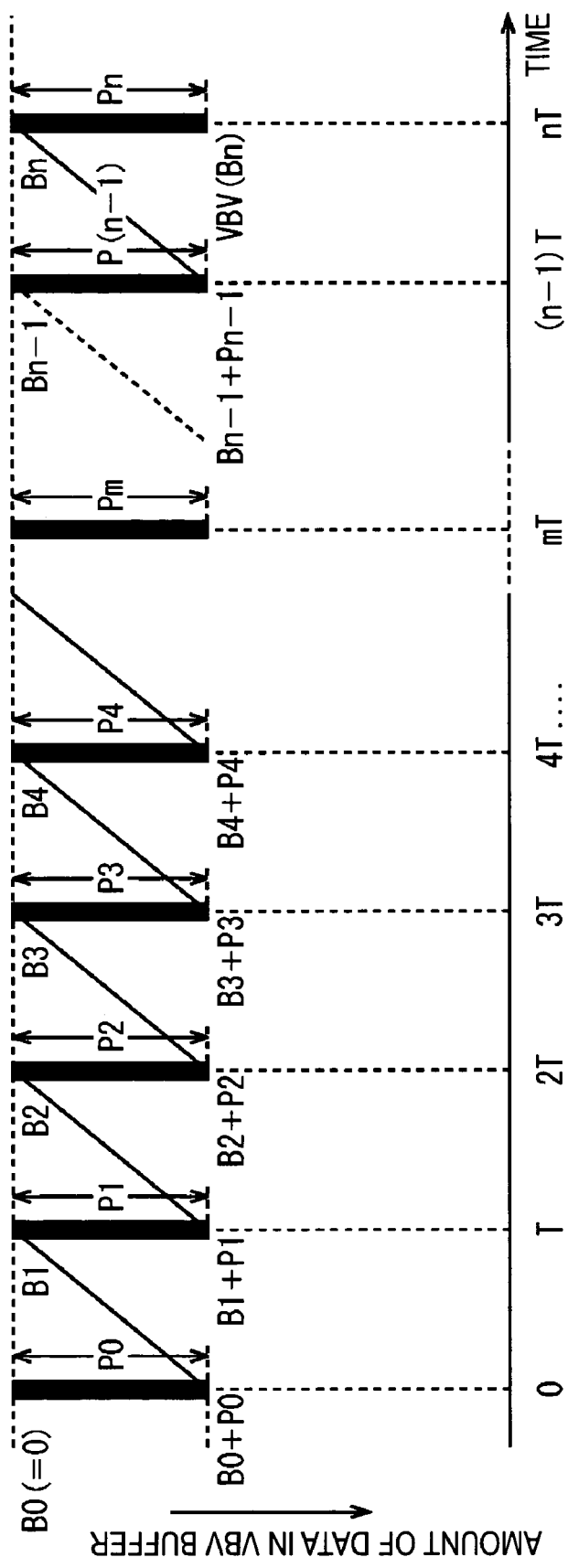
FIG. 45 is a diagram depicting the motion of a VBV model in a case where the amount of thumbnail data is restricted.

FIG. 45 is a diagram depicting the motion of a VBV model in a case where the data amount of each thumbnail is equal to the maximum permissible amount of code fb calculated as described above. In FIG. 45, the vertical axis represents the amount of data of code stored in the VBV buffer 422, and the horizontal axis represents time.

In FIG. 45, time T indicates the frame period [second], which is equal to the inverse of the frame rate.

At time t=0 when encoding processing is started from a state where the VBV buffer 422 is empty, code with a data amount P0 is transferred from the encoder 421 to the VBV buffer 422. Accordingly, the data amount of code stored in the VBV buffer 422 becomes P0 (=maximum permissible amount of code fb) at time t=0. Because the code is output from the VBV buffer 422 at the maximum transfer rate, the data amount of code stored in the VBV buffer 422 decreases over time, and the data amount of code stored in the VBV buffer becomes zero at time t=T. At the same time, since code with a data amount P1 equal to P0 is transferred from the encoder 421 to the VBV buffer 422 at time t=T, the data amount of code stored in the VBV buffer 422 instantly increases up to P1.

Because the code is output from the VBV buffer 422 at the maximum transfer rate, the data amount of code stored in the VBV buffer 422 decreases over time, and the data amount of code stored in the VBV buffer 422 becomes zero at time t=2T. At the same time, since code with a data amount P2 equal to P0 is transferred from the encoder 421 to the VBV buffer 422 at time t=2T, the data amount of code stored in the VBV buffer 422 instantly increases up to P2.

Similarly, the data amount of code stored in the VBV buffer 422 becomes zero during time t=3T to time t=nT. At the same time, since code with a data amount equal to P0 is transferred from the encoder 421 to the VBV buffer 422, the data amount of code stored in the VBV buffer 422 instantly increases up to the amount equal to P0.

In short, at a time when transfer from the encoder 421 to the VBV buffer 422 occurs, the data amount of code stored in the VBV buffer 422 becomes maximum, which is equal to the maximum permissible amount of code fb.

In the recording and playback apparatus whose structure is shown in FIG. 40, the amount of thumbnail data is restricted to be equal to or below the maximum permissible amount of code fb, and therefore, an overflow occurs less easily than with the structure shown in FIG. 45. In other words, FIG. 45 shows a state where the occupancy of the buffer is highest.

A VBV for performing variable-rate playback of thumbnails will be described in connection with the playback side. In variable rate playback, arbitrary thumbnails (pictures) are played back in arbitrary order. Therefore, if the amount of data of each thumbnail changes, playback of thumbnails with a large amount of data may be requested sequentially. In this case, the occupancy of the VBV buffer may decrease to such a level that the VBV buffer becomes empty, thus causing an underflow. Consequently, the playback of thumbnails delays, causing display of thumbnails not be switched as instructed by the user.

By limiting the data amount of all thumbnails equal to or below the maximum permissible amount of code fb, the occupancy of the VBV buffer does not fall below a certain level, whichever thumbnails are played back in whatever order, thus preventing an underflow. Consequently, it is ensured that display of thumbnails is switched as instructed by the user.

Figure 46:
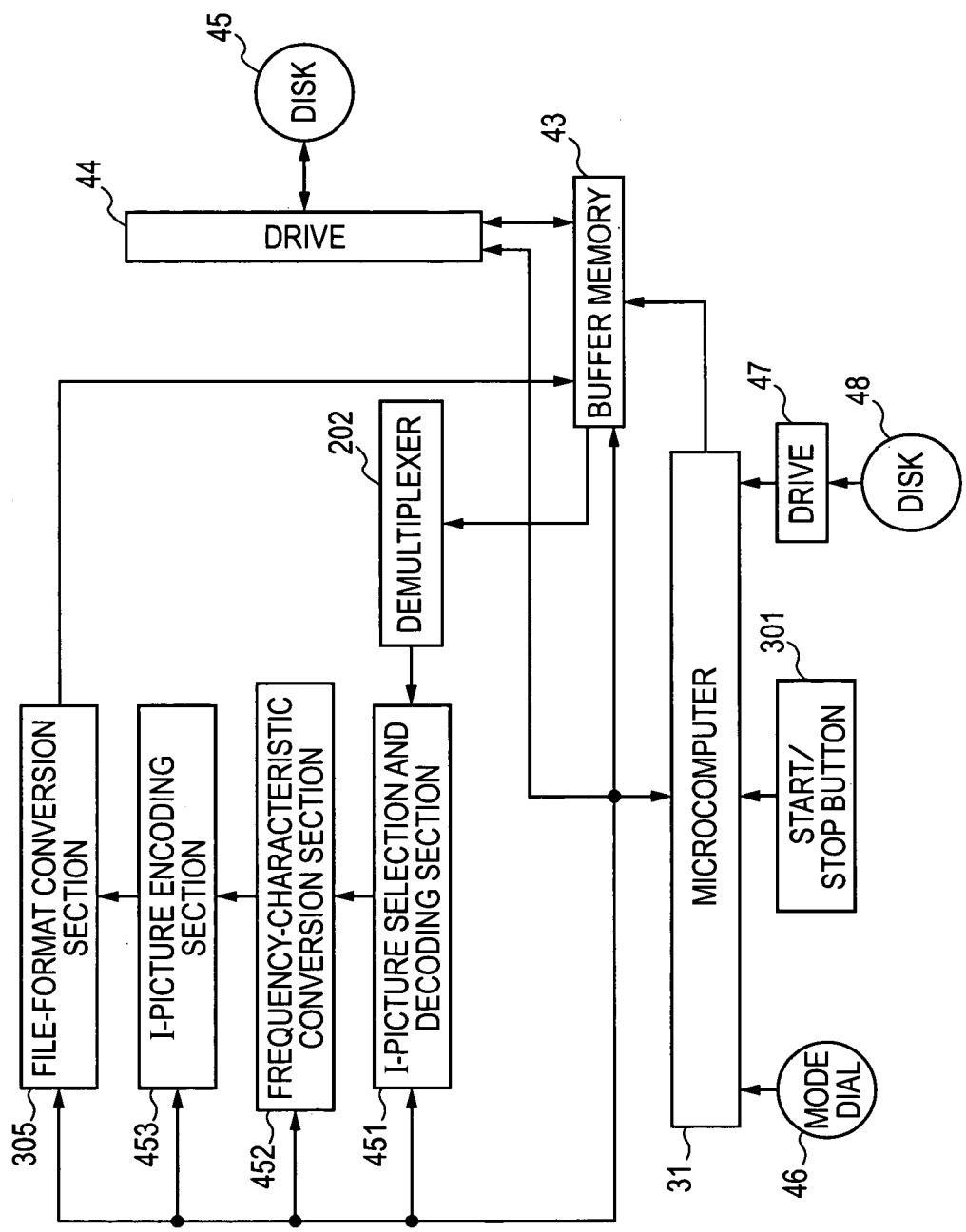
FIG. 46 is a block diagram depicting another structure of one embodiment of a recording and playback apparatus, according to the present invention, for reading out an MPEG2 program stream from a disk on which the MPEG2 program stream is recorded and generating thumbnails, as a stream of I pictures, corresponding to the MPEG2 program stream to record it on the disk.

FIG. 46 is a block diagram depicting another structure of one embodiment of a recording and playback apparatus, according to the present invention, for reading out an MPEG2 system stream from the disk 45 on which the MPEG2 system stream is recorded and generating thumbnails, as a stream of I pictures, corresponding to the MPEG2 system stream to record it on the disk 45. The same components as those shown in FIG. 40 are denoted by the same symbols, and thus a description thereof will be omitted.

Under the control of the microcomputer 31, an I-picture selection and decoding section 451 selects an I (intra) picture from among the MPEG2 video elementary stream separated by the demultiplexer 202 and decodes the selected I picture to DCT coefficients. The I-picture selection and decoding section 451 supplies the decoded DCT coefficients to a frequency-characteristic conversion section 452.

Under the control of the microcomputer 31, the frequency-characteristic conversion section 452 converts the frequency characteristic of the decoded DCT coefficients. For example, from among the DCT coefficients, the frequency-characteristic conversion section 452 converts the frequency characteristic of the DCT coefficients by removing or attenuating components corresponding to high frequencies of the image.

The frequency-characteristic conversion section 452 supplies the DCT coefficients whose frequency characteristic has been converted to an I-picture encoding section 453. An I-picture encoding section 453 compresses and encodes as an I picture the DCT coefficients with converted frequency characteristic supplied from the frequency-characteristic conversion section 452. The I-picture encoding section 453 supplies thumbnail data obtained by compressing and encoding the DCT coefficients as an I picture to a file-format conversion section 305.

Figure 47:
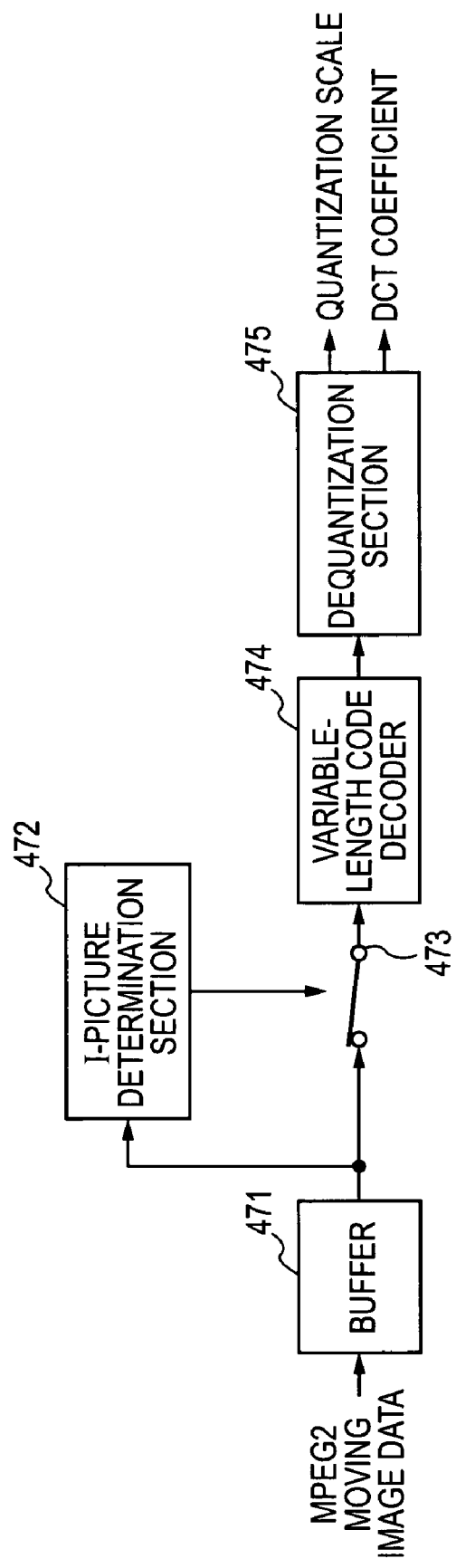
FIG. 47 is a block diagram depicting the structure of an I-picture selection and decoding section.

FIG. 47 is a block diagram depicting the structure of the I-picture selection and decoding section 451. A buffer 471 temporarily stores the moving image data in accordance with the MPEG2 technique, which is an MPEG2 video elementary stream, supplied from the demultiplexer 202. An I-picture determination section 472 determines whether each of the pictures constituting the moving image data in accordance with the MPEG2 technique stored in the buffer 471 is an I picture by, for example, referring to the picture coding type in the picture header.

A selector 473 supplies data of the picture stored in the buffer 471 to a variable-length code decoder 474 or controls the supply of the data of picture stored in the buffer 471 to the variable-length code decoder 474 based on a signal indicating whether the picture is an I picture supplied from the I-picture determination section 472. More specifically, if a signal indicating that the picture is an I picture is supplied from the I-picture determination section 472, the selector 473 supplies data of the picture, which is an I picture stored in the buffer 471, to the variable-length code decoder 474. If a signal indicating that the picture is not an I picture is supplied from the I-picture determination section 472, the selector 473 controls the supply of data of the picture, which is a B picture or a P picture stored in the buffer 471, to the variable-length code decoder 474.

The variable-length code decoder 474 decodes data of the I picture, which has been subjected to variable-length encoding and is supplied from the buffer 471 through the selector 473, and supplies the data of the decoded I picture to a dequantization section 475. The dequantization section 475 dequantizes the data of the I picture by multiplying a dequantization coefficient equal to a predetermined value for each coefficient included in the data of the decoded I picture. The dequantization section 475 outputs the data of the I picture obtained through dequantization, that is, DCT coefficients and a quantization scale.

Figure 48:
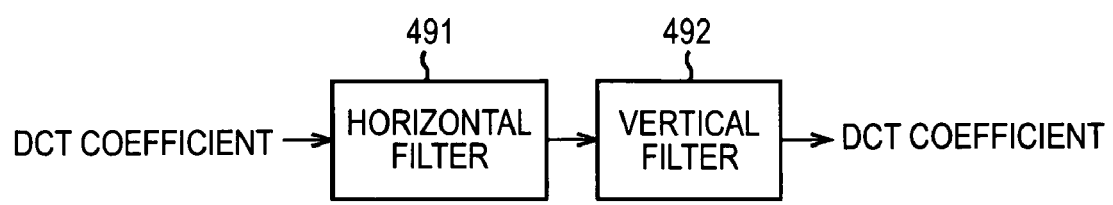
FIG. 48 is a block diagram depicting the structure of a frequency-characteristic conversion section.

FIG. 48 is a block diagram depicting the structure of the frequency-characteristic conversion section 452. A horizontal filter 491 removes or attenuates high-frequency components for DCT coefficients arranged in the horizontal direction from among the DCT coefficients.

Figure 49:
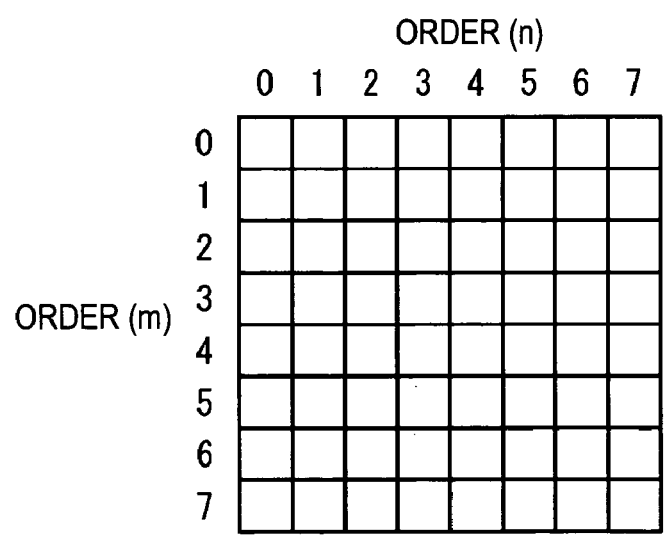
FIG. 49 is a diagram depicting DCT coefficients.

As shown in FIG. 49, DCT coefficients are arranged two dimensionally, where the order in the horizontal direction (n)

is 0 to 7 and the order in the vertical direction (m) is 0 to 7. DCT coefficients with higher orders in the horizontal direction (n) correspond to higher frequency components of the image. DCT coefficients with higher orders in the vertical direction (m) correspond to higher frequency components of the image.

Figure 50:
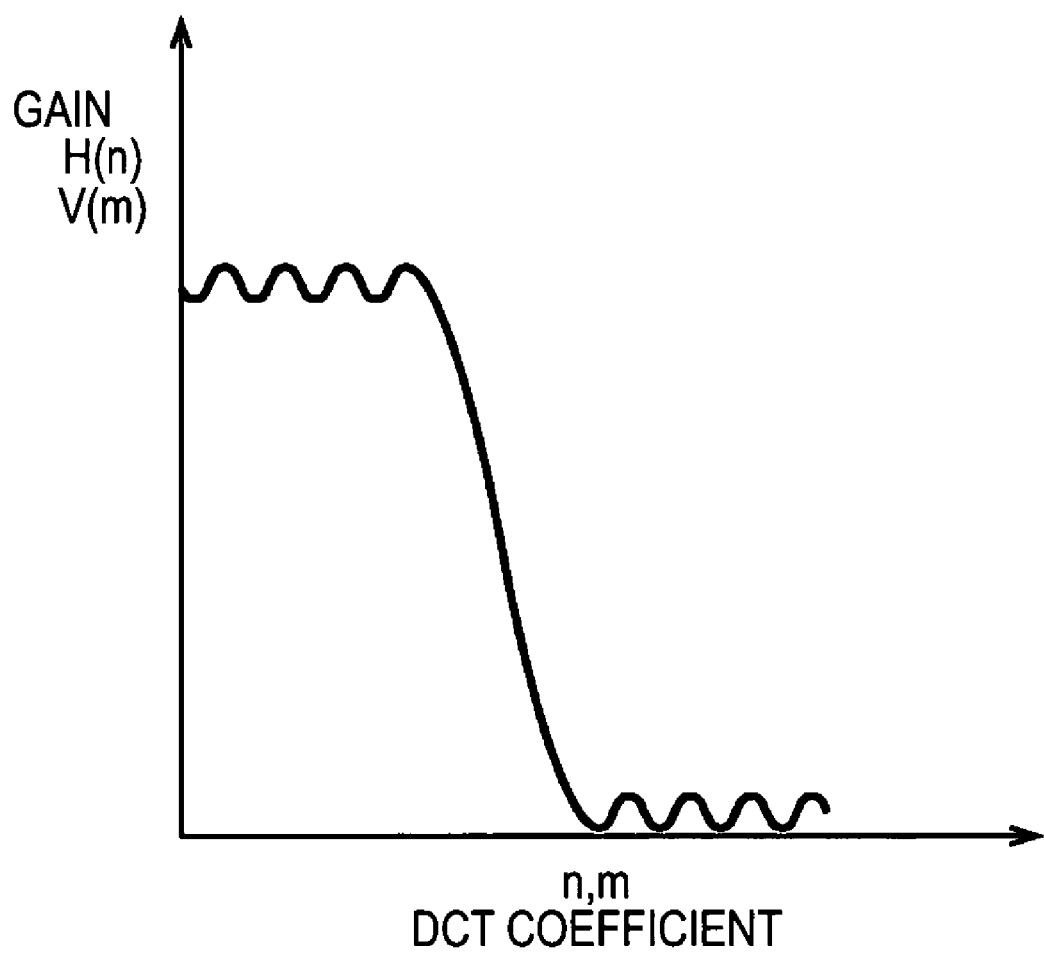
FIG. 50 is a diagram depicting a transfer function H(n) of a horizontal filter and a transfer function V(m) of a vertical filter.

FIG. 50 is a diagram depicting a transfer function H(n) of the horizontal filter 491 and a transfer function V(m) of a vertical filter 492. For example, the horizontal filter 491 sets DCT coefficients with higher orders (n) in the horizontal direction as 0 or decreases their values based on the transfer function H(n) shown in FIG. 50 to remove or attenuate high-frequency components for the DCT coefficients arranged in the horizontal direction from among the DCT coefficients.

For the DCT coefficients arranged in the horizontal direction, the horizontal filter 491 supplies DCT coefficients whose high-frequency components have been removed or attenuated to the vertical filter 492.

The vertical filter 492 remove or attenuates high-frequency components for DCT coefficients arranged in the vertical direction from among the DCT coefficients supplied from the horizontal filter 491 and outputs them. For example, the vertical filter 492 sets DCT coefficients with higher orders (m) in the vertical direction, supplied from the horizontal filter 491, as 0 or decreases their values based on the transfer function V(m) shown in FIG. 50 to remove or attenuate high-frequency components for the DCT coefficients arranged in the vertical direction from among the DCT coefficients.

More specifically, DCT coefficients d'(n,m) calculated as d(n,m)×H(n)×V(m) are output from the frequency-characteristic conversion section 452 whose structure is shown in FIG. 48, where d(n,m) means DCT coefficients input to the frequency-characteristic conversion section 452. Because DCT coefficients are values in the frequency domain, filtering processing can be performed by multiplying the above-described transfer functions.

In other words, restrictions in the frequency domain of the image can be applied to a block composed of eight pixels in the vertical direction and eight pixels in the horizontal direction by multiplying 8×8 DCT coefficients by the above-described transfer function H(n) and transfer function V(m).

The quantization scale output from the I-picture selection and decoding section 451 passes through the frequency-characteristic conversion section 452 as-is and is input to the I-picture encoding section 453.

Figure 51:
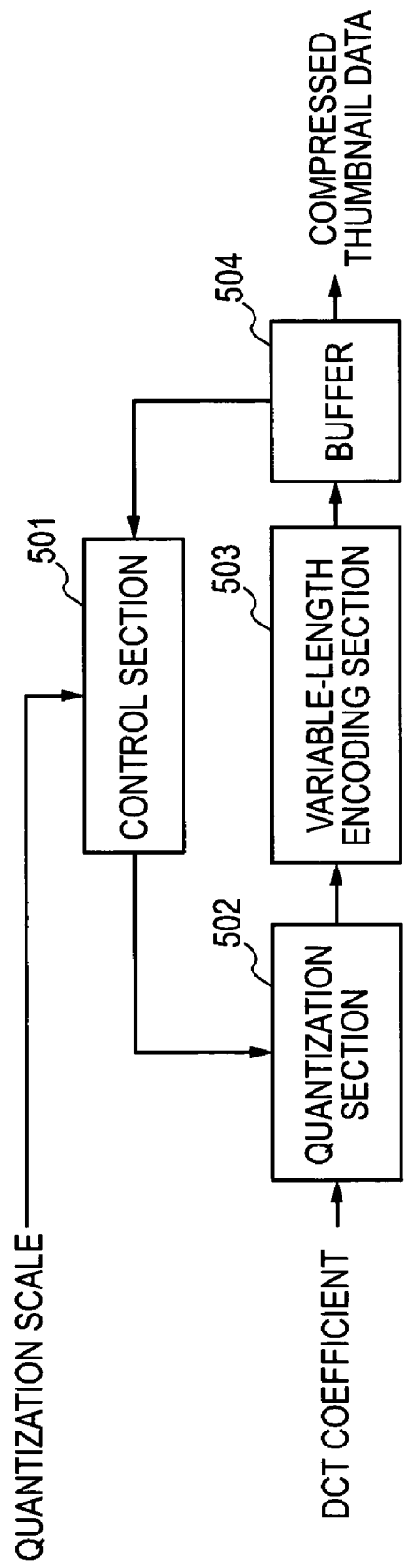
FIG. 51 is a block diagram depicting the structure of an I-picture encoding section.

FIG. 51 is a block diagram depicting the structure of the I-picture encoding section 453. A control section 501 determines a quantization value based on the quantization scale supplied from the I-picture selection and the decoding section 451 through the frequency-characteristic conversion section 452 and the amount of compressed thumbnail data stored in a buffer 504 and supplies the quantization value to a quantization section 502. For example, the control section 501 determines a quantization value based on the amount of compressed thumbnail data stored in the buffer 504 such that the data amount of thumbnail data compressed and encoded as an I picture does not exceed the predetermined upper limit.

The quantization section 502 quantizes DCT coefficients by dividing the DCT coefficients supplied from the frequency-characteristic conversion section 452 by the quantization value supplied from the control section 501 and supplies the quantized DCT coefficients to a variable-length encoding section 503. Since high-frequency components of the DCT coefficients input to the I-picture encoding section 453 have been removed or attenuated, the DCT coefficients are small values compared with DCT coefficients before they are subject to frequency characteristic conversion. Therefore, a larger number of DCT coefficients with a value of 0 exist for re-quantization by the quantization section 502, and the truncation order becomes small, accordingly.

The variable-length encoding section 503 generates thumbnail data compressed and encoded as an I picture by encoding the quantized DCT coefficients into variable-length code and supplies the generated thumbnail data compressed and encoded as ad I picture to the buffer 504.

The buffer 504 temporarily stores the thumbnail data compressed and encoded as an I picture. The buffer 504 outputs the stored thumbnail data compressed and encoded as an I picture.

Since high-frequency components of the DCT coefficients input to the I-picture encoding section 453 have been removed or attenuated, the I-picture encoding section 453 can output thumbnail data with a smaller amount of data.

Figure 52:
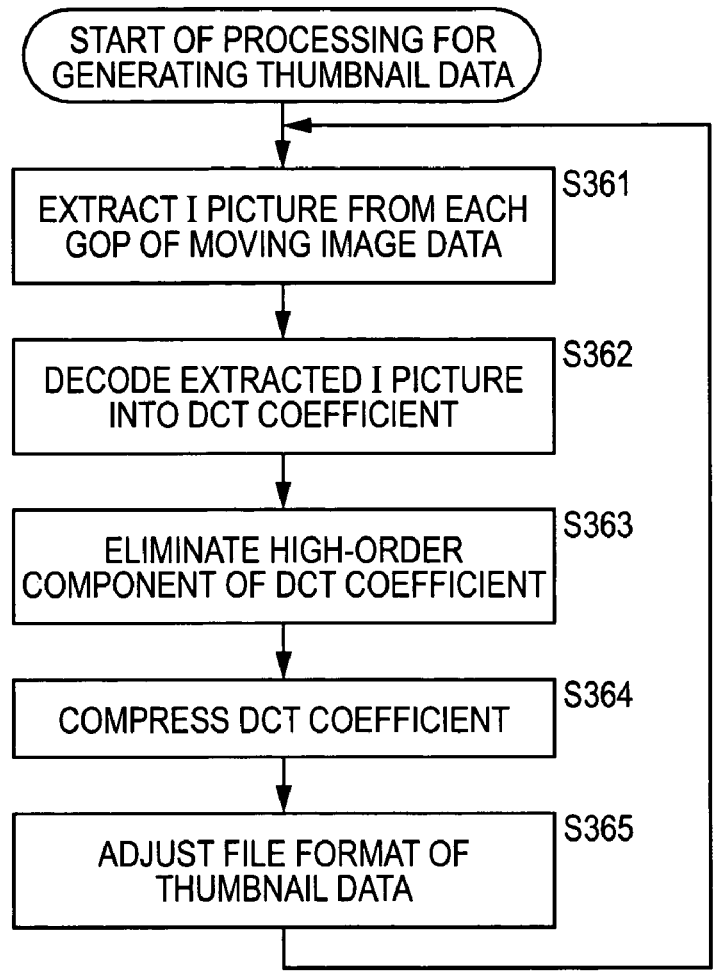
FIG. 52 is a flowchart illustrating another process of generating thumbnail data.

FIG. 52 is a flowchart illustrating another process of generating thumbnail data. In step S361, the I-picture selection and decoding section 451 extracts (selects) an I picture from each GOP of moving image data, which is an MPEG2 program stream, read out by the drive 44 from the disk 45. In step S362, the I-picture selection and decoding section 451 decodes the extracted I picture to DCT coefficients.

In step S363, the frequency-characteristic conversion section 452 removes high-order components of the decoded DCT coefficients to convert the frequency characteristic of the DCT coefficients. In step S364, the I-picture encoding section 453 compresses and encodes the DCT coefficients whose frequency characteristic has been converted as an I picture. In step S365, the file-format conversion section 305 adjusts the file format of the thumbnail data compressed and encoded as an I picture, and the flow returns to step S361, where the above-described processing is repeated.

Figure 53:
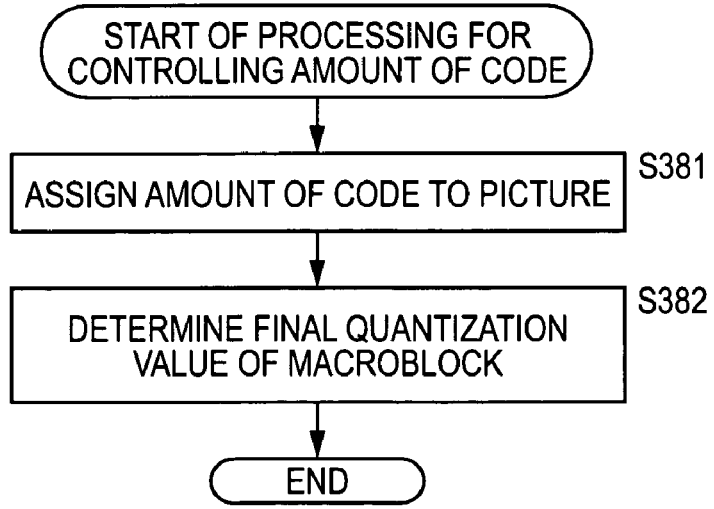
FIG. 53 is a flowchart illustrating another process of controlling the amount of code.

FIG. 53 is a flowchart illustrating the process of controlling the amount of code by the control section 501 for each I picture. In step S381, the control section 501 assigns the amount of code to the picture. For example, in step S381, the control section 501 assigns the amount of code to the picture taking into consideration the upper limit of the amount of code for the picture and a predetermined margin rather than the target value of the amount of code for the picture. More specifically, in step S381, the control section 501 assigns to the picture the amount of code of a value obtained by subtracting the margin from the upper limit of the amount of code.

This is done to guarantee the restrictions described in VBV for continuous playback of thumbnails, as described above, because the amount of thumbnail data compressed and encoded as an I picture may results in exceeding the setting in step S321.

In step S382, the control section 501 determines the final quantization value based on the amount of code assigned to the picture and assigns the amount of code to macroblocks, and then the processing ends.

Next, a recording and playback apparatus for reading an MPEG2 system stream from the disk 45 recording the MPEG2 system stream, reading thumbnail data from the disk 45 on which thumbnail data generated corresponding to the MPEG2 system stream is recorded, and playing back thumbnails will be described.

Figure 54:
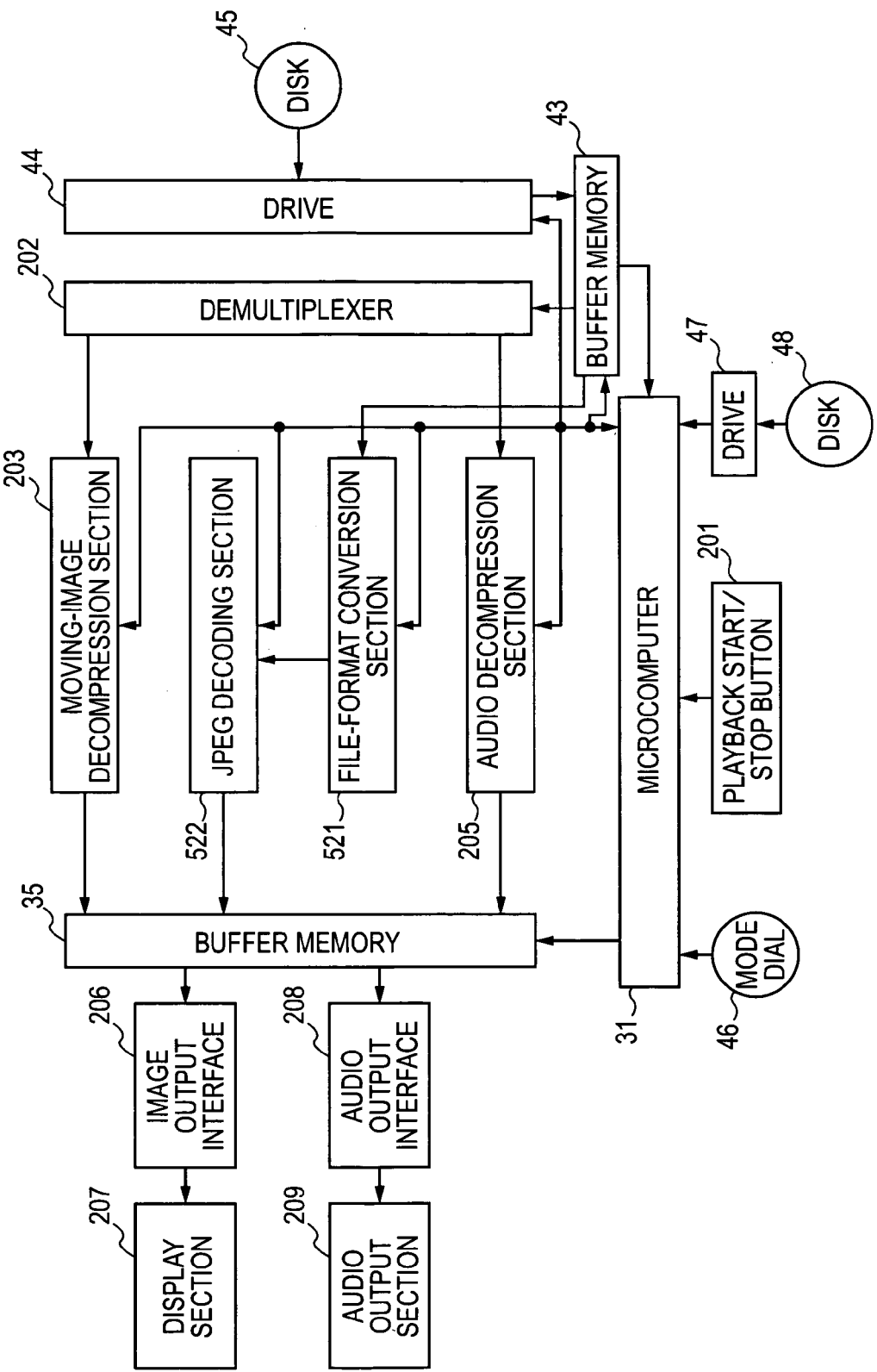
FIG. 54 is a block diagram depicting another structure of one embodiment of a playback block in a recording and playback apparatus, according to the present invention, for playing back and displaying thumbnails based on thumbnail data compressed and encoded in accordance with the JPEG technique.

FIG. 54 is a block diagram depicting another structure of one embodiment of a playback block in a recording and playback apparatus, according to the present invention, for playing back and displaying thumbnails based on the thumbnail data 81 compressed and encoded in accordance with the JPEG technique. The same components as those shown in FIG. 20 are denoted by the same symbols, and thus a description thereof will be omitted.

Under the control of the microcomputer 31, a file-format conversion section 521 reads out the thumbnail data 81 which has been read out by the drive 44 from the disk 45 into the buffer memory 43, where the file format of the thumbnail data 81 is a PLF format, a file format referred to from the file 101 in PLF format, a static image package format, a location-related data file format referred from the track management file 131, or a file format referred to from the location-related data file 141.

The file-format conversion section 521 converts the file format of the read-out thumbnail data 81 and supplies the thumbnail data 81 with converted file format to a JPEG decoding section 522. For example, the file-format conversion section 521 converts the file format of the thumbnail data 81 by extracting the thumbnail data 81 compressed and encoded in accordance with the JPEG technique from the thumbnail data 81 in a PLF format, a file format referred to from the file 101 in PLF format, a static image package format, a location-related data file format referred to from the track management file 131, or a file format referred to from the location-related data file 141.

Under the control of the microcomputer 31, the JPEG decoding section 522 decodes the thumbnail data 81 compressed and encoded in accordance with the JPEG technique, supplied from the file-format conversion section 521, and stores in the buffer memory 35 the thumbnail data 81, as a baseband image, obtained through decoding.

Figure 55:
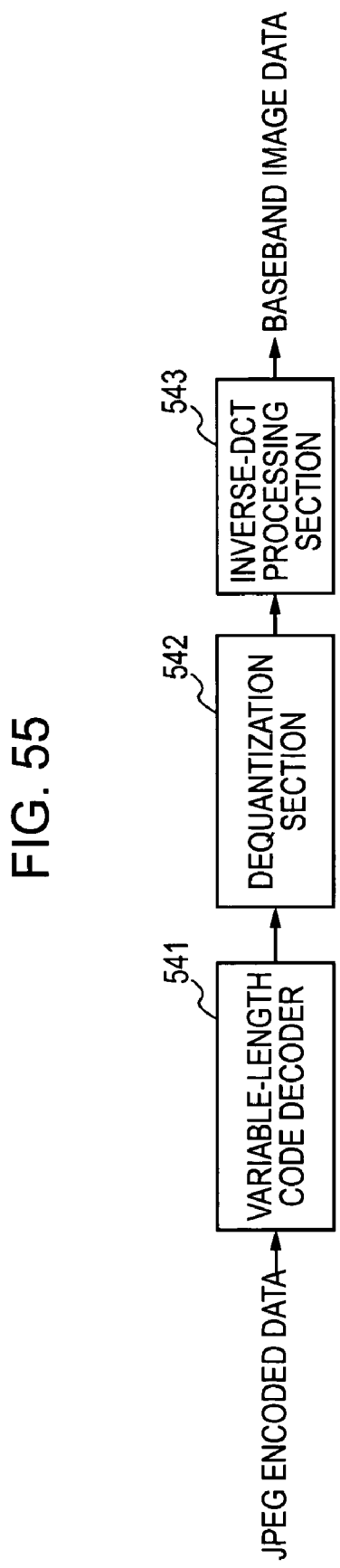
FIG. 55 is a block diagram depicting the structure of a JPEG decoding section.

FIG. 55 is a block diagram depicting the structure of the JPEG decoding section 522. A variable-length code decoder 541 decodes the thumbnail data 81 subjected to variable-length encoding, supplied from the file-format conversion section 521, and supplies the decoded thumbnail data 81 to a dequantization section 542. The dequantization section 542 dequantizes the thumbnail data 81 by multiplying a dequantization coefficient equal to a predetermined value for each coefficient included in the decoded thumbnail data 81. The dequantization section 542 supplies the thumbnail data 81 obtained through dequantization, that is, DCT coefficients, to an inverse-DCT processing section 543.

The inverse-DCT processing section 543 generates uncompressed image data, so-called baseband image data, by applying inverse-DCT conversion to the DCT coefficients supplied form the dequantization section 542 and outputs the baseband image data.

Figure 56:
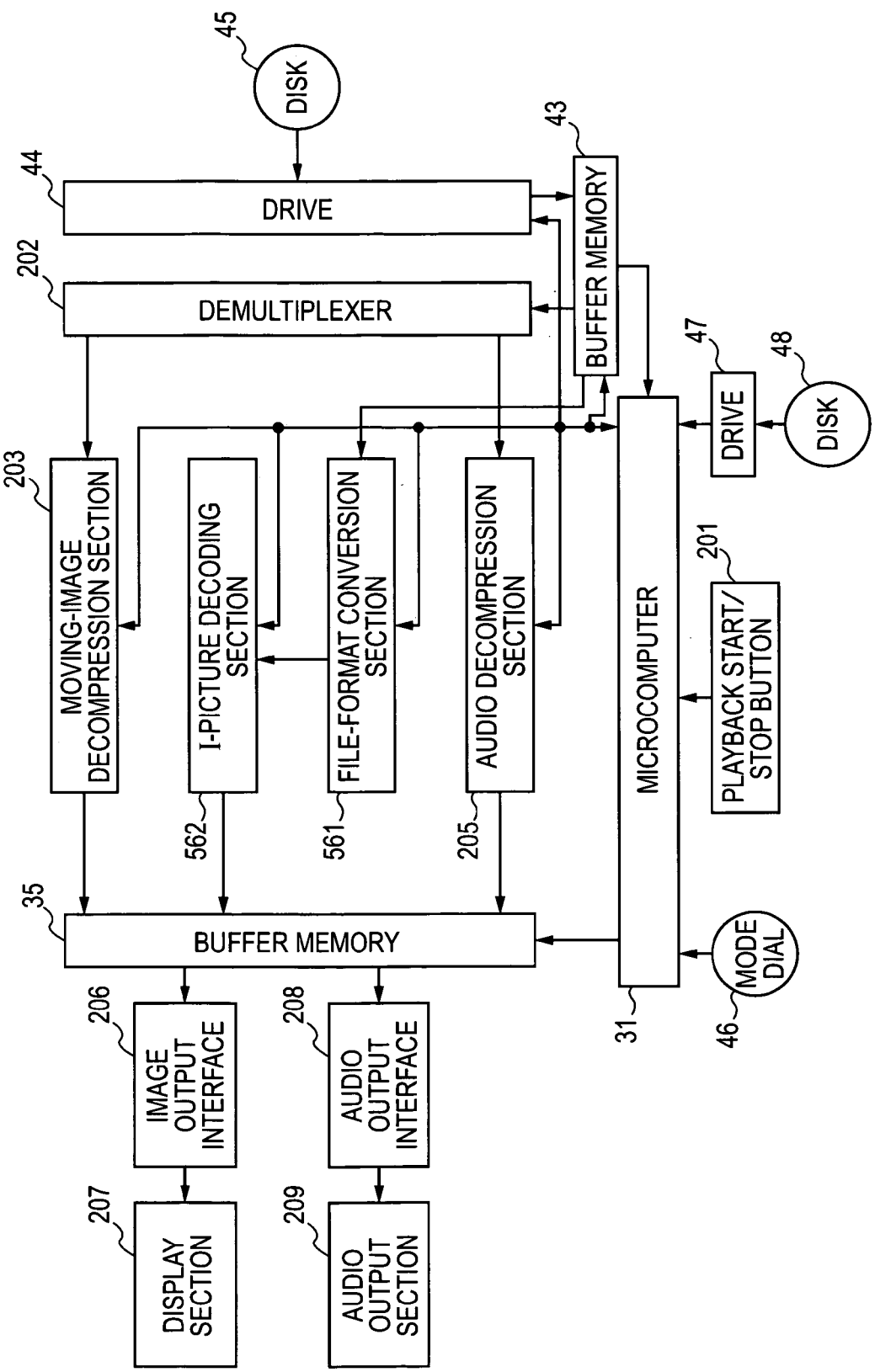
FIG. 56 is a block diagram depicting another structure of one embodiment of a playback block in a recording and playback apparatus, according to the present invention, for playing back and displaying thumbnails based on thumbnail data compressed and encoded as a stream of I pictures.

FIG. 56 is a block diagram depicting another structure of one embodiment of a playback block in a recording and playback apparatus, according to the present invention, for playing back and displaying thumbnails based on the thumbnail data 81 compressed and encoded as a stream of I pictures. The same components as those shown in FIG. 20 are denoted by the same symbols, and thus a description thereof will be omitted.

Under the control of the microcomputer 31, a file-format conversion section 561 reads out the thumbnail data 81 which has been read out by the drive 44 from the disk 45 into the buffer memory 43, where the file format of the thumbnail data 81 is a PLF format, a file format referred to from the file 101 in PLF format, a static image package format, a location-related data file format referred from the track management file 131, or a file format referred to from the location-related data file 141.

The file-format conversion section 561 converts the file format of the read-out thumbnail data 81 and supplies the thumbnail data 81 with converted file format to an I-picture decoding section 562. For example, the file-format conversion section 561 converts the file format of the thumbnail data 81 by extracting the thumbnail data 81 compressed and encoded as a stream of I pictures from the thumbnail data 81 in a PLF format, a file format referred to from the file 101 in PLF format, a static image package format, a location-related data file format referred to from the track management file 131, or a file format referred to from the location-related data file 141.

Under the control of the microcomputer 31, the I-picture decoding section 562 decodes the thumbnail data 81 compressed and encoded as a stream of I pictures, supplied from the file-format conversion section 561, and stores in the buffer memory 35 the thumbnail data 81, as a baseband image, obtained through decoding.

Figure 57:
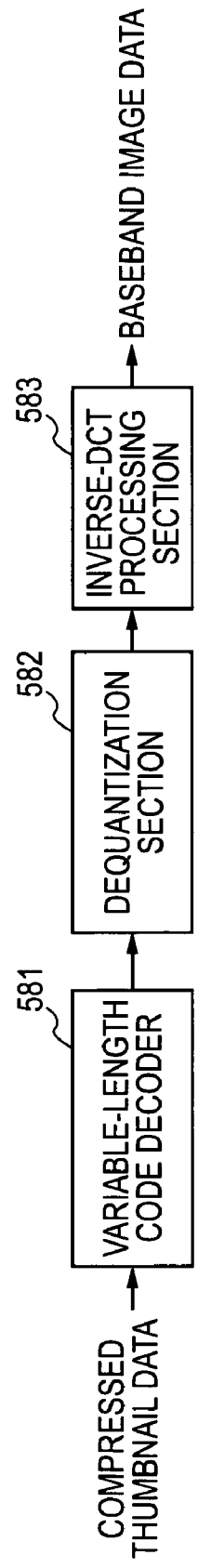
FIG. 57 is a block diagram depicting the structure of an I-picture decoding section.

FIG. 57 is a block diagram depicting the structure of the I-picture decoding section 562. A variable-length code decoder 581 decodes data of the I picture, which has been subjected to variable-length encoding and is supplied from the file-format conversion section 561, and supplies the data of the decoded I picture to a dequantization section 582. The dequantization section 582 dequantizes the data of the I picture by multiplying a dequantization coefficient equal to a predetermined value for each coefficient included in the data of the decoded I picture. The dequantization section 582 supplies the data of the I picture obtained through dequantization, that is, DCT coefficients, to an inverse-DCT processing section 583.

The inverse-DCT processing section 583 generates uncompressed image data, so-called baseband image data, by applying inverse-DCT conversion to the DCT coefficients supplied form the dequantization section 582 and outputs the baseband image data.

If the thumbnail data 81 is subjected to frequency characteristic conversion such that, for example, high-frequency components of the image are removed and is compressed and encoded as a stream of I pictures, pixels of thumbnails may be thinned out for display.

Figure 58:
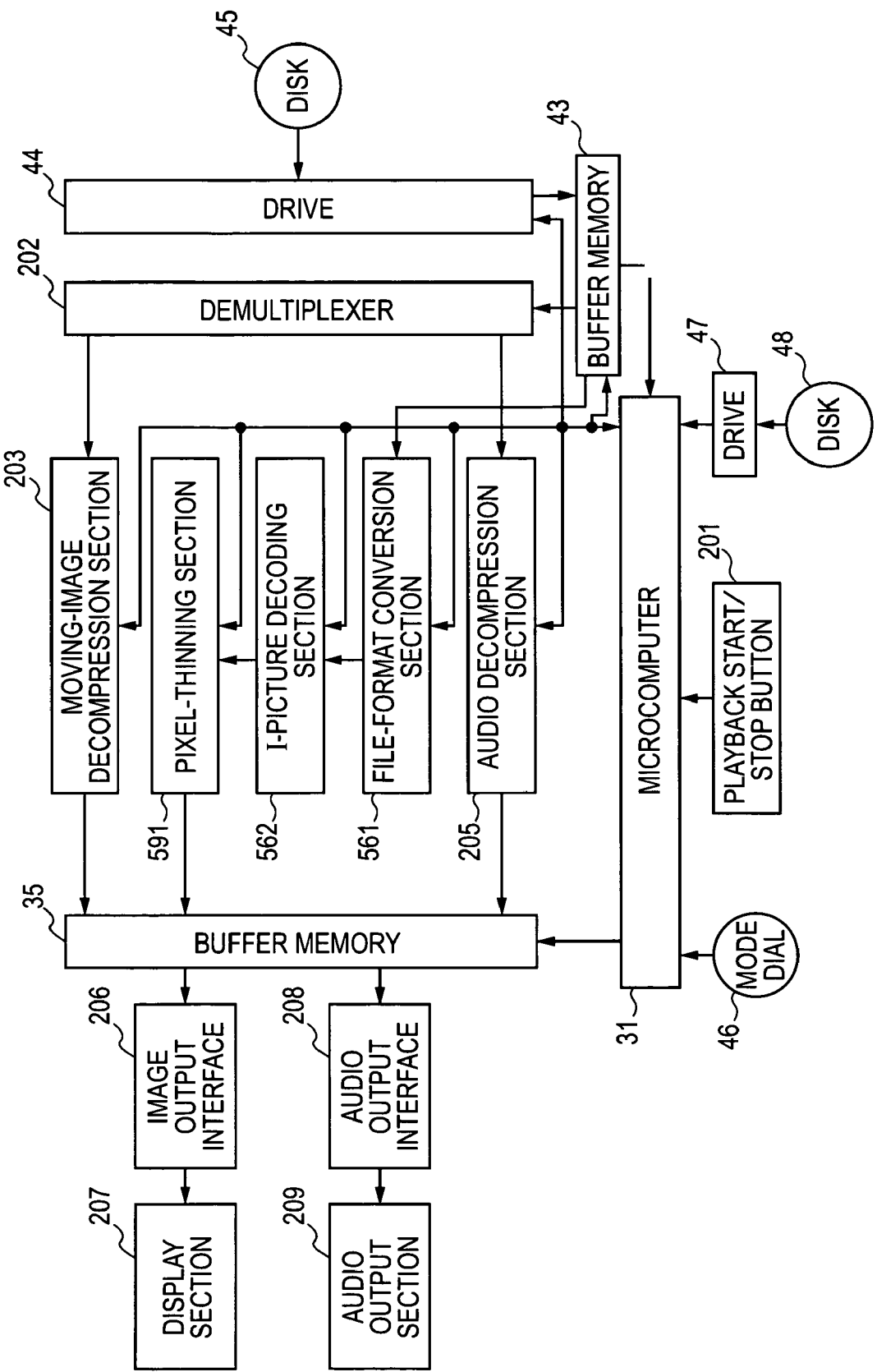
FIG. 58 is a block diagram depicting still another structure of one embodiment of a playback block in a recording and playback apparatus, according to the present invention, for playing back and displaying thumbnails based on thumbnail data compressed and encoded as a stream of I pictures.

FIG. 58 is a block diagram depicting still another structure of one embodiment of a playback block in a recording and playback apparatus, according to the present invention, for playing back and displaying thumbnails based on the thumbnail data 81 compressed and encoded as a stream of I pictures. The same components as those shown in FIG. 56 are denoted by the same symbols, and thus a description thereof will be omitted.

A pixel-thinning section 591 thins out pixels at predetermined positions from among pixels of the thumbnail data 81, as baseband image data, supplied from an I-picture decoding section 562 and stores the thumbnail data 81 whose pixels have been thinned out in the buffer memory 35. For example, the pixel-thinning section 591 classifies the pixels of the thumbnail data 81 into sets of four pixels composed of two pixels in the vertical direction and two pixels in the horizontal direction and removes three pixels from each set of four pixels to thin out pixels from the thumbnail data 81.

If the thumbnail data 81 is subjected to frequency characteristic conversion such that high-frequency components of the image are removed and is compressed and encoded as a stream of I pictures, the image size is not reduced. Thus, the pixel-thinning section 591 can perform thinning to reduce the image size.

If there is no problem of aliasing in the thumbnail data 81 whose frequency characteristic has been converted such that high-frequency components of the image are removed, the pixel-thinning section 591 can simply thin out pixels. If there is a problem of aliasing, the pixel-thinning section 591 should preferably restrict the band of image data through a low-pass filter before thinning out pixels.

If a picture according to a moving image is generated as described above, the picture according to the moving image can be recorded on a data recording medium. Furthermore, if one picture is extracted from a unit in which a moving image is encoded where the unit is composed of a constant number of pictures; the amount of information of the extracted picture is reduced; the picture whose amount of information has been reduced is encoded by a predetermined encoding scheme; the encoded picture is associated with the unit from which the picture has been extracted; and recording of the picture associated with the unit onto a data recording medium on which the moving image is to be recorded is controlled, then the picture associated with the unit can be quickly played back when the moving image is to be played back. As a result, the user can view the content at a desired point in time for playback of the moving image.

In addition, if the picture recorded on a data recording medium, i.e., the picture according to the moving image, is read out, the picture according to the moving image can be played back. Furthermore, if reading a picture from a data recording medium recording a moving image and the picture is controlled; wherein the picture is extracted from a unit in which the moving image is encoded, the unit including a constant number of pictures, the amount of information of the picture is reduced, the picture is encoded by a predetermined encoding scheme, the picture is associated with each unit, and the reading is based on an instruction from a user and a relationship with the unit of the moving image; the read-out picture is decoded; and display of the decoded picture is controlled, then the picture associated with the unit can be played back quickly. As a result, the user can view the content at a desired point in time for playback of the moving image.

A technique for compressing and encoding thumbnails is not limited to the JPEG technique or encoding as I pictures. Encoding schemes that can control the data amount of each thumbnail, such as the JPEG2000 and the motion JPEG, are acceptable. In addition, although the encoding scheme of a moving image is MPEG2 in the above description, the encoding scheme of a moving image is not limited to MPEG2. Other encoding schemes including MPEG4 and MPEG7 are also acceptable.

The sequence of processing described above can be implemented using not only hardware but also software. If the series of processing is to be carried out with software, a program constituting the software is installed from a recording medium into a computer built in dedicated hardware or into, for example, a general-purpose personal computer which can carry out various types of functions by installing various types of programs.

As shown in FIG. 3, FIG. 20, FIG. 35, FIG. 40, FIG. 46, FIG. 54, FIG. 56, or FIG. 58, this recording medium containing the program may be the disk 45 which is a package medium including a magnetic disk (including a flexible disk), an optical disk (including CD-ROM (Compact Disc-Read Only Memory) and DVD (Digital Versatile Disc), a magneto-optical disk (including MD (Mini-Disc)™), or a semiconductor memory if such a program is supplied separately from a user's computer. The recording medium may be a ROM (not shown) built into a microcomputer or a hard disk (not shown) in a computer if the program on the recording medium is supplied preinstalled on the computer.

The program that carries out the above-described sequence of processing may be installed in a computer through an interface, such as a router or a modem, as required and through a wired or wireless communication medium, such as a local area network, the Internet, or digital satellite broadcasting.

In the present invention, the steps of the program recorded on the recording medium may or may not be followed time-sequentially in order of described steps. Furthermore, the steps may be followed in parallel or independently from one another.

The invention claimed is:

1. A hardware recording apparatus comprising:
   extraction means for extracting an image from a unit in which a constant number of moving images are included;
   reduction means for reducing the amount of information of the extracted image;
   encoding means for encoding the extracted image with reduced amount of information by a predetermined encoding scheme;
   association means for associating the encoded image with the unit from which the image is extracted by the extraction means; and
   recording control means for controlling recording of the encoded image associated with the unit and controlling recording of moving images onto a data recording medium,
   wherein the recording control means is configured to:
      control storing of moving images data in a first buffer and storing of encoded images data in a second buffer;
      determine an amount of moving images data stored in the first buffer;
      control recording of moving images data in a first contiguous area of the data recording medium when the amount of moving images data stored in the first buffer is no less than a first predetermined threshold, wherein the recording of the moving images data in the first contiguous area is in parallel to the storing of encoded images data in the second buffer;
      after the moving images data recorded in the first contiguous area reaches a predetermined limit associated with the first contiguous area, stop the recording of the moving images data in the first contiguous area and determine an amount of encoded images data stored in the second buffer; and
      control recording of encoded images data in a second contiguous area of the data recording medium when the amount of encoded images data stored in the second buffer is no less than a second predetermined threshold, wherein the recording of the encoded images data in the second contiguous area is in parallel to the storing of moving images data in the first buffer.

2. The recording apparatus according to claim 1, wherein the association means is a track associated with a track of the moving image and associates the encoded image with the unit by arranging the encoded image in a track in a predetermined file format.

3. The recording apparatus according to claim 1, wherein the association means associates the encoded image with the unit by associating a range of time for playback of the unit of the moving image with the encoded image.

4. The recording apparatus according to claim 1, wherein the encoding means encodes the image by a compression and encoding scheme for a static image.

5. The recording apparatus according to claim 1, wherein the encoding means encodes the image by a compression and encoding scheme for a moving image such that decoding is possible only with the image.

6. The recording apparatus according to claim 1, wherein the reduction means reduces the amount of information of the image by thinning out pixels of the image.

7. The recording apparatus according to claim 1, wherein the reduction means reduces the amount of information of the image by removing a high-frequency component of the image.

8. A recording method comprising:
an extraction step of extracting an image from a unit in which a constant number of moving images are included;
a reduction step of reducing the amount of information of the extracted image;
an encoding step of encoding the extracted image with reduced amount of information by a predetermined encoding scheme;
an association step of associating the encoded image with the unit from which the image is extracted in the extraction step; and
a recording control step of controlling recording of the encoded image associated with the unit and controlling recording of moving images onto a data recording medium,
wherein the recording control step comprises:
controlling storing of moving images data in a first buffer and storing of encoded images data in a second buffer
determining an amount of moving images data stored in the first buffer;
controlling recording of moving images data in a first contiguous area of the data recording medium when the amount of moving images data stored in the first buffer is no less than a first predetermined threshold, wherein the recording of the moving images data in the first contiguous area is in parallel to the storing of encoded images data in the second buffer;
after the moving images data recorded in the first contiguous area reaches a predetermined limit associated with the first contiguous area, stopping the recording of the moving images data in the first contiguous area and determining an amount of encoded images data stored in the second buffer; and
controlling recording of the encoded images data in a second contiguous area of the data recording medium when the amount of encoded images data stored in the second buffer is no less than a second predetermined threshold, wherein the recording of the encoded images data in the second contiguous area is in parallel to the storing of moving images data in the first buffer.

9. A non-transitory recording medium storing a program causing a computer to perform recording processing comprising:
an extraction step of extracting an image from a unit in which a constant number of moving images are included;
a reduction step of reducing the amount of information of the extracted image;
an encoding step of encoding the extracted image with reduced amount of information by a predetermined encoding scheme;
an association step of associating the encoded image with the unit from which the image is extracted in the extraction step; and
a recording control step of controlling recording of the encoded image associated with the unit and controlling recording of moving images onto a data recording medium,
wherein the recording control step comprises:
controlling storing of moving images data in a first buffer and storing of encoded images data in a second buffer
determining an amount of moving images data stored in the first buffer;
controlling recording of moving images data in a first contiguous area of the data recording medium when the amount of moving images data stored in the first buffer is no less than a first predetermined threshold, wherein the recording of the moving images data in the first contiguous area is in parallel to the storing of encoded images data in the second buffer;
after the moving images data recorded in the first contiguous area reaches a predetermined limit associated with the first contiguous area, stopping the recording of the moving images data in the first contiguous area and determining an amount of encoded images data stored in the second buffer; and
controlling recording of the encoded images data in a second contiguous area of the data recording medium when the amount of encoded images data stored in the second buffer is no less than a second predetermined threshold, wherein the recording of the encoded images data in the second contiguous area is in parallel to the storing of moving images data in the first buffer.

10. A hardware playback apparatus comprising:
reading control means for controlling reading an image from a data recording medium recording moving images and the image, the image being extracted from a unit in which a constant number of moving images are included, the amount of information of the image being reduced, the image being encoded by a predetermined encoding scheme, the image being associated with the unit, moving images data being stored in a first buffer and encoded images data being stored in a second buffer, the moving images data being recorded onto the data recording medium when an amount of moving images data stored in the first buffer is determined to be no less than a first predetermined threshold such that the moving images data are recorded in a first contiguous area of the data recording medium in parallel to the storing of encoded images data in the second buffer, the encoded images data being recorded in a second contiguous area of the data recording medium in parallel to the storing of moving images data in the first buffer and after the moving images data recorded in the first contiguous area reaches a predetermined limit associated with the first contiguous area and the recording of the moving images data in the first contiguous area stops, and when an amount of encoded images data stored in the second buffer is determined to be no less than a second predetermined threshold, and the reading being based on an instruction from a user and a relationship with the unit;
decoding means for decoding the image; and
display control means for controlling display of the decoded image.

11. The playback apparatus according to claim 10, wherein the reading control means controls reading the image from the data recording medium so as to read only the image if the user directs a fast-forward operation or a rewind operation.

12. The playback apparatus according to claim 10, wherein the decoding means decodes the image encoded by a compression and encoding scheme for a static image.

13. The playback apparatus according to claim 10, wherein the decoding means decodes the image encoded by a compression and encoding scheme for the moving image such that decoding is possible only with the image.

14. A playback method comprising:
a reading control step of controlling reading an image from a data recording medium recording moving images and the image, the image being extracted from a unit in which a constant number of moving images are included, the amount of information of the image being reduced, the image being encoded by a predetermined encoding scheme, the image being associated with the unit, moving images data being stored in a first buffer and encoded images data being stored in a second buffer, the moving images data being recorded onto the data recording medium when an amount of moving images data stored in the first buffer is determined to be no less than a first predetermined threshold such that the moving images data are recorded in a first contiguous area of the data recording medium in parallel to the storing of encoded images data in the second buffer, the encoded images data being recorded in a second contiguous area of the data recording medium in parallel to the storing of moving images data in the first buffer and after the moving images data recorded in the first contiguous area reaches a predetermined limit associated with the first contiguous area and the recording of the moving images data in the first contiguous area stops, and when an amount of encoded images data stored in the second buffer is determined to be no less than a second predetermined threshold, and the reading being based on an instruction from a user and a relationship with the unit;

a decoding step of decoding the image; and a display control step of controlling display of the decoded image.

15. A non-transitory recording medium storing a program causing a computer to perform playback processing comprising:

a reading control step of controlling reading an image from a data recording medium recording moving images and the image, the image being extracted from a unit in which a constant number of moving images are included, the amount of information of the image being reduced, the image being encoded by a predetermined encoding scheme, the image being associated with the unit, moving images data being stored in a first buffer and encoded images data being stored in a second buffer, the moving images data being recorded onto the data recording medium when an amount of moving images data stored in the first buffer is determined to be no less than a first predetermined threshold such that the moving images data are recorded in a first contiguous area of the data recording medium in parallel to the storing of encoded images data in the second buffer, the encoded images data being recorded in a second contiguous area of the data recording medium in parallel to the storing of moving images data in the first buffer and after the moving images data recorded in the first contiguous area reaches a predetermined limit associated with the first contiguous area and the recording of the moving images data in the first contiguous area stops, and when an amount of encoded images data stored in the second buffer is determined to be no less than a second predetermined threshold, and the reading being based on an instruction from a user and a relationship with the unit;

a decoding step of decoding the image; and a display control step of controlling display of the decoded image.

* * * * *